United States Patent
Obuchi et al.

(10) Patent No.: US 6,320,852 B1
(45) Date of Patent: *Nov. 20, 2001

(54) BASE STATION HOST APPARATUS USED IN MOBILE COMMUNICATION SYSTEM WHICH EMPLOYS A SITE DIVERSITY RECEIVING METHOD AND A SIGNAL PROCESSING METHOD

(75) Inventors: Kazuhisa Obuchi; Takaharu Nakamura; Kazuo Kawabata; Hiroaki Iwamoto; Yoshiharu Tajima; Kenji Suda; Tetsuya Yano, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,175

(22) Filed: Mar. 2, 1998

(30) Foreign Application Priority Data

Mar. 5, 1997 (JP) .................................................. 9-050794

(51) Int. Cl.[7] ..................................................... G08C 15/00
(52) U.S. Cl. .......................... 370/328; 370/230; 370/324; 370/529; 371/40.2; 371/41; 371/43.1
(58) Field of Search .................................... 370/230, 324, 370/349, 401, 529, 328, 338; 371/41, 5.1, 40.2, 43.1; 375/200, 216, 240; 455/553

(56) References Cited

U.S. PATENT DOCUMENTS

| | | | | |
|---|---|---|---|---|
| 5,561,686 | * | 10/1996 | Kobayashi et al. | 375/200 |
| 5,564,077 | * | 10/1996 | Obayashi et al. | 455/553 |
| 5,729,557 | * | 3/1998 | Gardner et al. | 371/41 |
| 5,949,796 | * | 9/1999 | Kumar | 370/529 |
| 6,031,871 | * | 2/2000 | Schouhamer Immink | 375/240 |

FOREIGN PATENT DOCUMENTS 9064806  3/1997  (JP) ................................. H04B/7/26

OTHER PUBLICATIONS

"Effects of Site Diversity for DS/CDMA Cellular Systems" by E. Nakano, et al. of NTT Mobile Communications Network Inc., Technical Report of IEICE, AP94–76, RCS94–100(1994–10) pp. 69–74.

"Effects of Inter–Sector Maximal Ratio Combining for DS–CDMA Cellular Systems," by E. Nakano, et al. of NTT Mobile Communications Network Inc., Technical Report of IEICE. RCS94–149 (1995–02) pp. 7–12.

"Method for Generalizing the Viterbi Algorithm and Devices for Executing the Method," Japanese Patent No. 2533219, Resistration Date: Jun. 27, 1996; This patent corresponds to USPN:5,181,209.

* cited by examiner

Primary Examiner—Douglas Olms
Assistant Examiner—Shick Hom
(74) Attorney, Agent, or Firm—Helfgott & Karas, P.C.

(57) ABSTRACT

A technique used in a mobile communications system. A mobile terminal station transmits a signal subjected to an error-correction encoding processing. Each of a plurality of base stations receives the signal transmitted from the mobile terminal station via the wireless line, performs an error-correction decoding processing for the received signal, and transmits an error-correction decoded signal to a base-station host apparatus via the wired line. The base-station host apparatus performs an error-correction encoding processing for each of the signals received from the base stations, composes the thus error-correction encoded signals into one signal, and performs an error-correction decoding processing for the composed signal. The technique can improve the error rate of a received signal without increasing the amount of signal data flowing between the base stations and the base-station host apparatus.

34 Claims, 28 Drawing Sheets

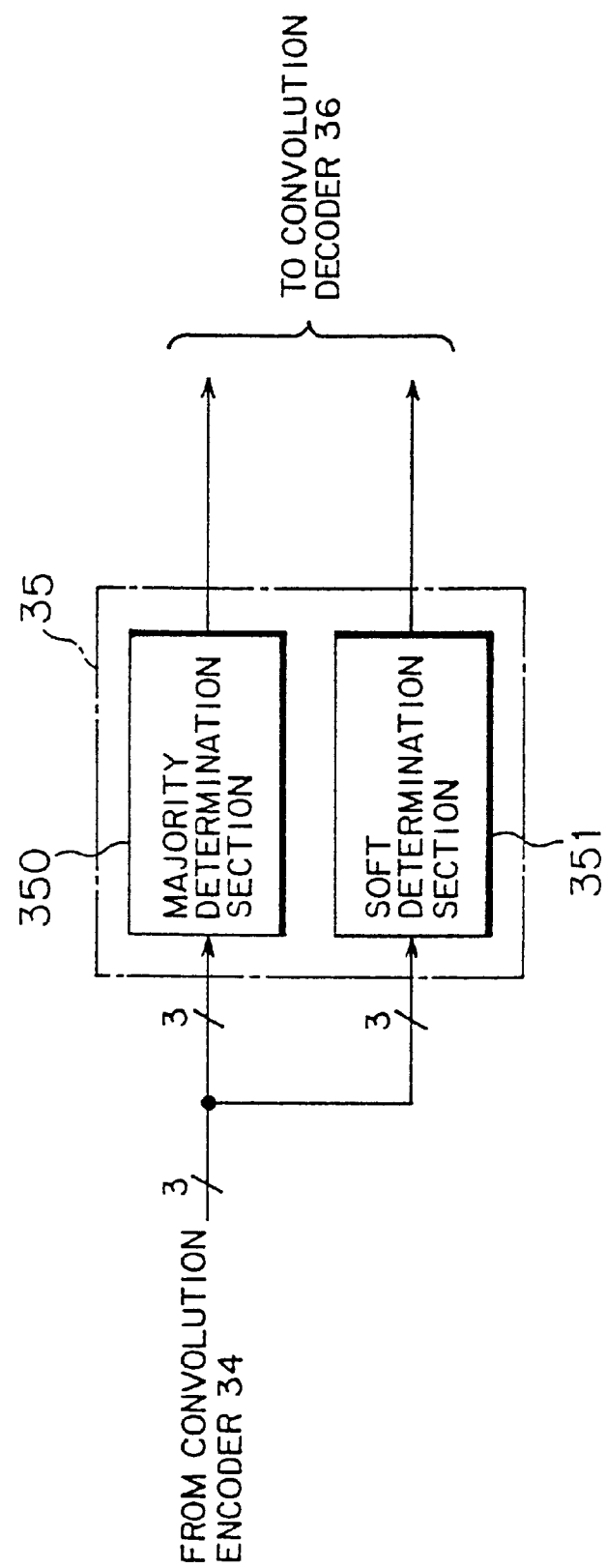

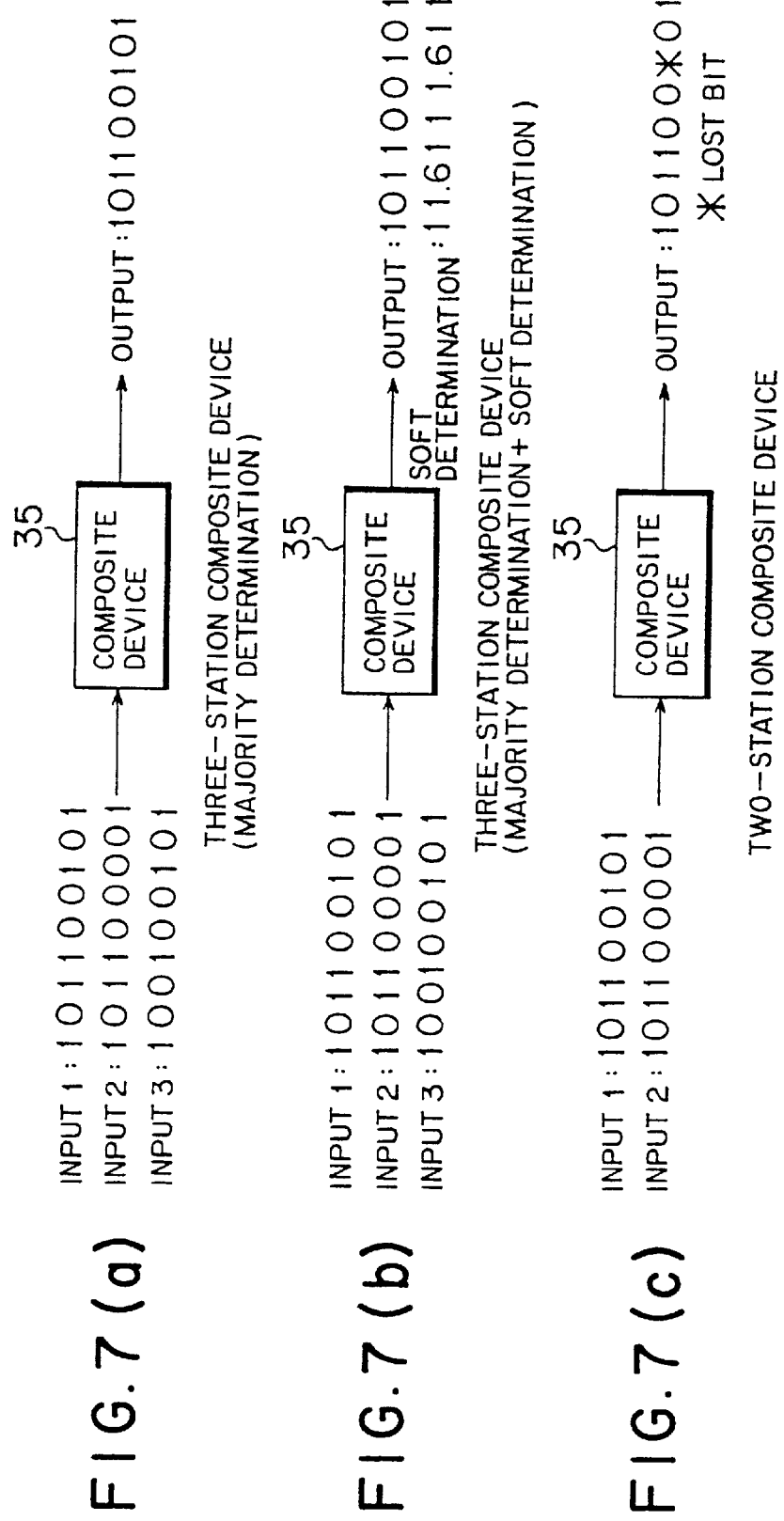

FIG.9

| INFORMATION LENGTH | | 100 BITS / FRAME |
|---|---|---|
| ERROR-CORRECTION ENCODING METHOD | | CONVOLUTION ENCODING ( R= 1/2 , K= 6 ) |
| RADIO SECTION | FRAME LENGTH | 210 BITS |
| | MODULATION / DEMODULATION METHOD | DIFFERENTIAL ENCODING QPSK, DELAY DETECTION |
| | TRANSMISSION LINE ERROR | AWGN |
| WIRE SECTION | FRAME LENGTH | 100 BITS |
| | TRANSMISSION LINE ERROR | NONE |

BASE STATION HOST APPARATUS USED IN MOBILE COMMUNICATION SYSTEM WHICH EMPLOYS A SITE DIVERSITY RECEIVING METHOD AND A SIGNAL PROCESSING METHOD

BACKGROUND OF THE INVENTION (1) Field of the Invention

The present invention relates to a site diversity receiving method for use-with a mobile communications system and to a base-station host apparatus used in a mobile communications system employing the site diversity receiving method. More particularly, the present invention relates to a site diversity receiving method for use with a mobile communications system and to a base-station host apparatus used in a mobile communications system employing the site diversity receiving method, both of which are suitable for use with a mobile communications system such as an automobile cellular phone system or a portable telephone system.

(2) Description of the Related Art

In a mobile communications system, such as an automobile cellular phone system or a portable phone system, since a terminal station usually carries out communication while in a moving state, a propagation environment between the base station and the terminal station changes constantly. For example, the propagation environment changes due to fading or the like during a short period of time, deteriorating the quality of communication between the base station and the terminal station.

A representative countermeasure against such a phenomenon is a space diversity method in which the quality of a received signal is improved by composing into one signal (or selection of one of) a plurality of signals received from one base station via several different propagation paths.

However, from the viewpoint of a comparatively long period of time, the space diversity method cannot be expected to yield the effect of improving the quality of a received signal if the terminal station enters the shadow area produced by an obstacle such as a building and it becomes difficult for the terminal station to transmit/receive a signal to or from one base station. For these reasons, the space diversity method cannot be said to be an effective countermeasure. In view of the foregoing, a site diversity method has recently been increasingly adopted in the field of mobile communications system, which method permits the terminal station to simultaneously transmit or receive a signal to or from a plurality of base stations.

More specifically, under the site diversity method, a plurality of base stations receive a signal (or data) from one terminal station, and the data received by the respective base stations are processed and transmitted to an exchange (a higher-level apparatus in comparison with the base station and hereinafter often referred to as a base-station host apparatus). In the exchange, the received plurality sets of received data are selected or composed into one signal.

FIG. 26 is a schematic representation showing the concept of the site diversity method by which communication is established between a terminal station and a plurality of base stations. In FIG. 26, reference numerals 101 and 102 designate base stations; 103 a building (or an obstacle) existing in a communications area of the base station 101; and 104 a terminal station.

For example, if the terminal station 104 enters a shadow area produced by the building 103 while it is in the course of communicating with the base station 101, the presence of the building 103 makes it difficult for the terminal station 104 to smoothly transmit or receive a signal to or from the base station 101. However, the site diversity method permits the base station 102 adjacent to the base station 101 to also receive a signal from the terminal station 104. Consequently, in place of the base station 101, the base station 102 can communicate with the terminal station 104. As a result, the terminal station 104 can realize high-quality communication without being affected by the propagation environment (such as the presence of the building 103).

Further, under the site diversity method, since a plurality of base stations receive a signal from the terminal station 104, the minimum transmission level (or power) of the terminal station 104 required by the network to maintain the quality of communication is reduced, enabling a reduction in the power consumed by the terminal station 104. Moreover, if the site diversity method is applied to a mobile communications system employing a CDMA (Code Division Multiple Access) method, there can be expected a reduction in interference power, which in turn allows the capacity of a subscriber's line to increase. In short, the application of the site diversity method to the CDMA method is very effective.

FIG. 27 is a block diagram showing one example of a mobile communications system to which the CDMA method and the site diversity method are applied. The mobile communications system 110 shown in FIG. 27 comprises a terminal station 111, base stations 112-1 to 112-n ("n" is a natural number), and an exchange 113.

In general, a wireless line of low quality (i.e., one which may be susceptible to circuit failures) is used for communication established between the terminal station 111 and the base stations 112-1 to 112-n, whereas a wired line of high quality (i.e., substantially without circuit failures) is used for communication established between the base stations 112-1 to 112-n and the exchange 113. Because of this fact, such a communications system adopts a technique called error correcting code (ECC) in order to improve the quality of the circuit between the terminal 111 and the base stations 112-1 to 112-n. The following techniques can be conceived as the error correcting code technique.

(1) Technique 1

As shown in FIG. 28, the terminal station 111 is provided with an error correcting encoder (ENC) 111$a$, and the base stations 112-1 to 112-n are respectively provided with error correcting decoders (DECs) 112$a$-1 to 112$a$-n. Further, the exchange 113 is provided with a selection section 123$a$ for the purpose of making a selection from the signals decoded by the DECs 112$a$-1 to 112$a$-n of the base stations 112-1 to 112-n.

In the mobile communications system 110 shown in FIG. 28, the signal subjected to error-correction encoding processing performed by the ENC 111$a$ of the terminal 111 is received by the respective base stations 112-1 to 112-n via the wireless line. The signals are subjected to error-correction decoding processing performed by the DECs 112$a$-1 to 112$a$-n of the base stations 112-1 to 112-n. The thus-decoded signals are transmitted to the exchange 113 via the wire circuit. In the exchange 113, a decoded signal (with minimum deterioration) is selected from the received and decoded signals as a received signal.

Although in the foregoing description any one of the decoded signals sent from the respective DECs 112$a$-1 to 112$a$-n is selected, there may be a case where the exchange 113 is provided with a composing section in place of the selection section 113$a$, and the decoded signals from the error correcting decoders 112a-1 to 112a-n are composed into one signal.

(2) Technique 2

As shown in FIG. 29, the terminal station 111 is provided with the ENC 111a, and the exchange 113 is provided with a composing section 125a and an error correcting decoder (DEC) 125b.

In the mobile communications system 110 shown in FIG. 29, the base stations 112-1 to 112-n receive a signal from the ENC 111a of the terminal station 111 via the wireless line, and the thus-received signals are transmitted to the exchange 113 from the base stations 112-1 to 112-n via a wire circuit without being subjected to the error-correction decoding processing. In the exchange 113, the signals (error-correction coded signals) received from the base stations 112-1 to 112-n are composed into one signal. The thus-composed signal is then subjected to error-correction decoding processing performed by the DEC 125b. Although the signals from the respective base stations 112-1 to 112-n are composed into one signal by the composing section 125a of the exchange 113, any one signal may be selected from the signals.

The base stations 112-1 to 112-n employed by technique 2 are also capable of acquiring soft determination information such as a receiving level when receiving the signal from the terminal station 111 and of sending the soft determination information to the exchange 113 together with the received signals. In such a case, the exchange 113 can merge into one signal (or select one signal from) the signals received from the base stations 112-1 to 112-n by utilization of the soft determination information, enabling improvement in the quality of the received signal.

However, according to the foregoing technique 1 (i.e., in the mobile communications system 110 shown in FIG. 28), the signal subjected to error-correction encoding processing performed by the ENC 111a of the terminal station 111 is subjected to error-correction decoding processing performed by the base stations 112-1 to 112-n. The thus-decoded signals are subjected to selection (or composed into one signal) by the exchange 113. For example, if the decoded signals include many errors, it is impossible to obtain superior-quality data even by making a selection from the decoded signals (or by composing the signals into one signal), thereby trading off the effect expected from employment of the site diversity method and the error correcting encoding method.

More specifically, the error correcting decoding method has a great effect of improving the quality of a signal having few errors. In contrast, the method is characterized by the feature that it will increase errors if the signal includes an extremely large number of errors. If all the decoded signals include many errors, the exchange 113 eventually selects a signal that includes many errors. Further, in a case where the exchange 113 composes into one signal the signals decoded by the DECs 112a-1 to 112a-n, if some of the decoded signals include many errors, the quality of the superior-quality signals is deteriorated by the signals that include many errors. Therefore, there is a strong likelihood that only those signals that include many errors will be obtained as a composed signal.

In contrast, according to technique 2 (or in the CDMA communications system 110 shown in FIG. 29), since the signal is decoded by the exchange 113 after the plurality of sets of data have been composed into one data item, the amount of signal data flowing through a wire circuit connecting the base stations 112-1 to 112-n to the exchange 113 is increased. For example, if an encoding rate used for the error correcting encoding processing is set to ½, the amount of signal data flowing between the base stations 112-1 to 112-n and the exchange 113 becomes twice as large as that required by technique 1.

Accordingly, in comparison with at least technique 1, technique 2 has a disadvantage of increasing the capacity of the wire circuit connecting between the base stations 112-1 to 112-n and the exchange 113 and hence adding considerably to the cost.

Further, according to technique 2, the error-correction coded signals received from the base stations 112-1 to 112-n are composed into one signal (or a signal is selected from the signals) by utilization of soft determination information, enabling an improvement in the error rate of the received signal data. In this case, the amount of signal data flowing between the base stations 112-1 to 112-n and the exchange 113 is increased.

For example, in a case where the soft determination information is added to the received signals without changing the encoding rate (i.e., with the current encoding rate of ½), eight bits of soft determination information are added per bit to the received signal. In this case, the amount of signal data flowing between the base stations 112-1 to 112-n and the exchange 113 is increased to eight times that required by technique 1. In any event, technique 2 is impractical from the viewpoint of cost.

SUMMARY OF THE INVENTION

The present invention has been contrived to address the seemingly conflicting goals of preventing an increase in the amount of signal data flowing between the base station and the base-station host apparatus and making optimum use of advantageous results yielded by the site diversity method and those yielded by the error correction encoding method. An object of the present invention is to provide a site diversity receiving method for use in a mobile communications system, as well as a base-station host apparatus for use in a mobile communications system that adopts the site diversity receiving method, in which error-correction encoding processing, composing processing, and decoding processing are performed within the base-station host apparatus, whereby the error rate of a received signal is improved without an increase in the amount of signal data flowing between the base station and the base-station host apparatus.

To these ends, according to a first aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, wherein the mobile terminal station transmits a signal subjected to an error-correction encoding processing; each of the plurality of base stations receives the signal transmitted from the mobile terminal station via the wired line, performs error-correction decoding processing for the received signal, and transmits an error-correction decoded signal to the base-station host apparatus via the wired line; and the base-station host apparatus performs an error-correction encoding processing for each of the signals received from the base stations, composes the thus error-correction encoded signals into one signal, and performs an error-correction decoding processing for the composed signal.

According to a second aspect of the present invention, there is provided a base-station host apparatus for use in a mobile communications system which employs the site diversity receiving method, wherein a signal subjected to the error-correction encoding processing and transmitted from the mobile terminal station is received by a plurality of base stations, where the signals are further subjected to an error-correction decoding processing, and wherein the error-correction decoded signals are received by the base-station host apparatus, the base-station host apparatus comprising: an error-correction encoding section which performs an error-correction encoding processing for the error-correction decoded signals output from the respective base stations and outputs the error-correction encoded signals; a composing section which composes the error-correction encoded signals into one signal; and an error-correction decoding section which performs an error-correction decoding processing for the composed signal output from the composing section.

Accordingly, the present invention allows the base-station host apparatus to perform a re-encoding processing and a composing processing for the signals error-correction-decoded by the base stations. Therefore, the error rate of the received signal can be improved, through use of the site diversity method with no accompanying increase in the amount of signal data flowing between the base stations and the base-station host apparatus, thereby contributing to a significant improvement in the transmission capability of the mobile communications system.

Preferably, in the base-station host apparatus for use in a mobile communications system which employs a site diversity receiving method, the composing section is arranged so as to output the results of soft determination along with the composed signal, and the error-correction decoding section is arranged so as to subject the composed signal to a soft determination decoding processing through use of the composed signal and the results of soft determination.

According to the present invention, since the composing section is capable of performing a soft determination operation, even the error-correction decoding section is capable of performing an error-correction decoding processing through use of the results of soft determination. As a result, the degree of reliability of the composed signal can be improved, thereby enabling the quality of the received signal to be improved.

According to a third aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, wherein the mobile terminal station transmits a signal which has been subjected to an error-detection encoding processing and an error-correction encoding processing; each of the plurality of base stations receives the signal transmitted from the mobile terminal station via the wireless line, performs an error-correction decoding processing and an error detection processing for the thus-received signals, and transmits a signal subjected to the error-correction decoding processing and results of the error detection to the base-station host apparatus via the wired line; and the base-station host apparatus operates based on the results of error detection received from the base stations such that if it is determined that error presence information is transmitted from all of the base stations, the base-station host apparatus performs an error-correction encoding processing for each of the signals received from the base stations, composes the error-correction encoded signals into one signal, and subjects the composed signal to an error-correction decoding processing.

According to a fourth aspect of the present invention, there is provided a base-station host apparatus for use in a mobile communications system which employs the site diversity receiving method, wherein a signal subjected to an error detection processing and an error-correction encoding processing and transmitted from the mobile terminal station is received by a plurality of base stations, where the signals are further subjected to an error-correction decoding processing and an error detection processing, and wherein the base-station host apparatus receives error presence/absence information obtained as a result of the error detection processings performed by the plurality of base stations, the base-station host apparatus comprising: an error determination section which performs an error determination processing upon receipt of the error presence/absence information from each of the base stations; an error-correction encoding section which performs an error-correction encoding processing for the error-correction decoded signals output from the respective base stations and outputs the error-correction encoded signals; a composing section which composes into one signal the error-correction encoded signals received from the error-correction encoding section; an error-correction decoding section which performs an error-correction decoding processing for the composed signal output from the composing section; and a gate section which outputs the signal received from the error-correction decoding section as a received output if the error determination section determines that error presence information is sent from all of the base stations.

Preferably, in the base-station host apparatus used in the mobile communications system that employs the site diversity receiving method according to the present invention, the gate section is configured as a selection section. If the error determination section determines that error presence information is sent from all of the base stations, the gate section selects an output from the error-correction decoding section. In contrast, if the error determination section determines that error presence information is not sent from all of the base stations, the gate section selects the error-correction decoded signal output from each of the base stations.

According to the present invention, addition of the error presence/absence information to the signals transmitted from the mobile terminal station results in advantageous results similar to those mentioned previously and in execution of processing according to the result of detection of data errors. Accordingly, data having few errors can be selected. Even in this case, the transmission capability of the mobile communications system is improved.

According to a fifth aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, in which the mobile terminal station transmits a signal which has been subjected to an error-detection encoding processing and an error-correction encoding processing; each of the plurality of base stations receives the signal transmitted from the mobile terminal station via the wireless line, performs an error-correction decoding processing for the thus-received signals, and transmits a signal that has been subjected to the error-correction decoding processing to the base-station host apparatus via the wired line; and the base-station host apparatus performs error detection for the signal received from each of the base stations and operates based on results of the error detection such that if it is determined that error presence information is transmitted from all of the base stations, the base-station host apparatus performs an error-correction encoding processing for each of the signals received from the base stations, composes the error-correction encoded signals into one signal, and subjects the composed signal to an error-correction decoding processing.

According to a sixth aspect of the present invention, there is provided a base-station host apparatus for use in a mobile communications system which employs the site diversity receiving method, wherein a signal subjected to an error-detection encoding processing and an error-correction encoding processing and transmitted from the mobile terminal station is received by a plurality of base stations, where the signals are further subjected to an error-correction decoding processing, and wherein the base-station host apparatus receives the error-correction decoded signals from the plurality of base stations, the base-station host apparatus comprising: an error detection section which subjects to error detection the error-correction decoded signal received from each of the base station; an error determination section which performs an error determination operation upon receipt of the error presence/absence information from the error detection section; an error-correction encoding section which performs an error-correction encoding processing for the error-correction decoded signals output from the respective base stations and outputs the error-correction encoded signals; a composing section which composes into one signal the error-correction encoded signals received from the error-correction encoding section; an error-correction decoding section which performs an error-correction decoding processing for the composed signal output from the composing section; and a gate section which outputs the signal received from the error-correction decoding section as a received output if the error determination section determines that error presence information is sent from all of the base stations.

Preferably, in the base-station host apparatus used in the mobile communications system that employs the site diversity receiving method according to the present invention, the gate section is configured as a selection section. If the error determination section determines that error presence information is sent from all of the base stations, the gate section selects an output from the error-correction decoding section. In contrast, if the error determination section determines that error presence information is not sent from all of the base stations, the gate section selects the error-correction decoded signal output from each of the base stations.

According to the present invention, advantageous results similar to those mentioned previously are obtained. In addition, since the base-station host apparatus is capable of detecting (or determining) errors in input data, there can also be detected errors in the wireless line established between the terminal station and the base stations, as well as errors it a wire circuit established between the base stations and the base-station host apparatus. As a result, a more accurate signal can be output. The present invention has the advantage of improvement in the quality of the signal received by the base-station host apparatus.

According to a seventh aspect of the present invention, there is provided a base-station host apparatus for use in a mobile communications system which employs the site diversity receiving method, wherein a signal subjected to an error-detection encoding processing and an error-correction encoding processing and transmitted from the mobile terminal station is received by a plurality of base stations, where the signals are further subjected to an error-correction decoding processing, and wherein the base-station host apparatus receives the error-correction decoded signals from the plurality of base stations, the base-station host apparatus comprising: a first composing section which composes into one signal the error-correction decoded signals received from the base stations; an error detection section which performs error detection for the thus-composed signal; an error-correction encoding section which performs an error-correction encoding processing for the error-correction decoded signals output from the respective base stations and outputs the error-correction encoded signals; a second composing section which composes into one signal the error-correction encoded signals received from the error-correction encoding section; an error-correction decoding section which performs an error-correction decoding processing for the composed signal output from the second composing section; and a gate section which outputs the signal received from the error-correction decoding section as a received output if the error determination section determines that the composed signal includes error presence information.

Preferably, in the base-station host apparatus used in the mobile communications system that employs the site diversity receiving method according to the present invention, the gate section is configured as a selection section. If the error detection section detects that the composed signal includes error presence information, the gate section selects an output from the error-correction decoding section. In contrast, if the error detection section does not detect that the composed signal includes error presence information, the gate section selects the error-correction decoded signal output from each of the base stations.

According to the present invention, advantageous results similar to those mentioned previously are obtained. In addition, since the composed signal that includes the sets of error presence/absence information received from all the base stations is collectively subjected to error detection, a signal having better quality can be obtained. Further, processing can be performed according to the state of detection of errors in data, and hence data having few errors can be selected. Even in this case, the transmission processing performed in the mobile communications system is improved.

Since the error detection section can be shared between the base stations without the need for providing an error detection section specifically for each base station, the circuit configuration of the error detection section can be miniaturized. Accordingly, the cost required for the error detection section can be reduced, which in turn contributes to cost cutting of the overall mobile communications system.

According to an eighth aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, in which the mobile terminal station transmits a signal which has been subjected to an error-detection encoding processing and an error-correction encoding processing performed; each of the plurality of base stations receives the signal transmitted from the mobile terminal station via the wireless line, performs an error-correction decoding processing for the thus-received signal, transmits a signal that has been subjected to the error-correction decoding processing to the base-station host apparatus via the wired line; and the base-station host apparatus performs an error-correction encoding processing for the signal received from each of the base stations, composes the error-correction encoded signals into one signal, performs an error-correction decoding processing for the thus-composed signal in order to produce an error-correction decoded signal, performs error detection for the error-correction decoded signal, and outputs the error-correction decoded signal as a received signal in a case where no errors are detected from the results of error detection.

According to a ninth aspect of the present invention, there is provided a base-station host apparatus for use in a mobile communications system which employs the site diversity receiving method, wherein a signal subjected to an error detection processing and an error-correction encoding processing and transmitted from the mobile terminal station is received by a plurality of base stations, where the signals are further subjected to an error-correction decoding processing, and wherein the base-station host apparatus receives the error-correction decoded signals from the plurality of base stations, the base-station host apparatus comprising: an error-correction encoding section which performs an error-correction encoding processing for the error-correction decoded signals received from the respective base stations; a composing section which composes the error-correction encoded signals into one signal; an error-correction decoding section which performs an error-correction decoding processing for the thus-composed signal; an error detection section which performs error detection for the error-correction decoded signal received from the error-correction decoding section; and a gate section which outputs the signal received from the error-correction decoding section as a received output if the error detection section detects no errors.

Preferably, in the base-station host apparatus used in the mobile communications system that employs the site diversity receiving method according to the present invention, the gate section is configured as a selection section. If the error detection section detects no errors, the gate section selects an output from the error-correction decoding section. In contrast, if the error detection section detects errors, the gate section selects the error-correction decoded signal output from each of the base stations.

According to the present invention, since the error detection section of the base-station host apparatus detects errors in an error-correction decoded signal output from the error-correction decoding section, there can be detected errors in the data whose error rate is improved. Even in this case, the error detection section can be shared between the base stations without provision of the error detection section to each of the base stations. Therefore, the cost required for the error detection section can be reduced, which in turn contributes to cutting of the cost of the overall mobile transmission system.

Preferably, the base-station host apparatus—which is used in the mobile communications system employing the site diversity receiving method according to the present invention—as a composing section which composes into one signal the error-correction decoding signals received from the respective base stations. Further, the gate section is configured as a selection section. If the error detection section detects no errors, the gate section selects an output from the error-correction decoding section. In contrast, if the error detection section detects errors, the gate section selects the error-correction decoded signal output from each of the base stations.

According to the present invention, since the error detection section of the base-station host apparatus detects errors in the error-correction decoded signal output from the error-correction decoding section, there are obtained advantageous results similar to those mentioned previously. In addition, since the composing section composes into one signal the error-correction decoded signals received from the respective base stations, the mobile communications system has the advantage of being able to output data that are improved in comparison with the data output from a mobile communications system which uses a convolution decoded signal output from one base station.

According to a tenth aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, in which the mobile terminal station transmits a signal which has been subjected to the error-correction encoding processing; each of the plurality of base stations receives the signal transmitted from the mobile terminal station via the wireless line, performs an error-correction decoding processing for the thus-received signal, and transmits a signal that has been subjected to the error-correction decoding processing to the base-station host apparatus via the wired line; and the base-station host apparatus performs an error-correction encoding processing for the signal received from each of the base stations, composes the error-correction encoded signals into one signal in such a way as to reflect an error rate obtained from the signals output from the base stations, and performs an error-correction decoding processing for the thus-composed signal.

According to an eleventh aspect of the present invention, there is provided a base-station host apparatus for use in a mobile communications system which employs the site diversity receiving method, wherein a signal subjected to the error-correction encoding processing performed by the mobile terminal station is received by a plurality of base stations, where the signals are further subjected to an error-correction decoding processing, and wherein the base-station host apparatus receives the error-correction decoded signals from the plurality of base stations, the base-station host apparatus comprising: an error rate measurement section which measures the error rate of the error-correction decoded signal output from each of the base stations; an error-correction encoding section which performs an error-correction encoding processing for the error-correction decoded signals received from the respective base stations; a composing section which composes into one signal the error-correction encoded signals in such a way as to reflect the error rate measured by the error rate measurement section; and an error-correction decoding section which performs an error-correction decoding processing for the thus-composed signal.

According to the present invention, since the signals received from the base stations can be composed into one signal while an error rate is assigned as a weight to the signal received from the base station, advantageous results similar to those mentioned previously are obtained. More accurate data can be obtained, and hence the performance of the base-station host apparatus can be improved even in this case.

According to a twelfth aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, in which the mobile terminal station transmits a signal which has been subjected to the error-correction encoding processing; each of the plurality of base stations receives the signal transmitted from the mobile terminal station via the wireless line, performs a frame reliability detection processing, performs an error-correction decoding processing for the thus-received signal, and transmits a signal that has been subjected to the frame reliability detecting processing and the error-correction decoding processing to the base-station host apparatus via the wired line; and the base-station host apparatus performs an error-correction encoding processing for the signal received from each of the base stations, composes the error-correction encoded signals into one signal in such a way as to reflect the frame reliability information received from the respective base stations, and performs an error-correction decoding processing for the thus-composed signal.

According to a thirteenth aspect of the present invention, there is provided a base-station host apparatus for use in a mobile communications system which employs the site diversity receiving method, wherein a signal subjected to the error-correction encoding processing and transmitted from the mobile terminal station is received by a plurality of base stations, where frame reliability information regarding the received signal is extracted and the received signal is subjected to an error-correction decoding processing, and wherein the base-station host apparatus receives the error-correction decoded signals and the frame reliability information from the plurality of base stations, the base-station host apparatus comprising: a frame reliability information receiving section which receives frame reliability information from each of the base stations; an error-correction encoding section which performs an error-correction encoding processing for the error-correction decoded signals received from the respective base stations; a composing section which composes into one signal the error-correction encoded signals output from the error-correction encoding section in such a way as to reflect the frame reliability information received by the frame reliability information receiving section; and an error-correction decoding section which performs an error-correction decoding processing for the thus-composed signal.

According to the present invention, since the reliability extraction section can perform re-encoding-and-composing processing through use of the reliability information of each frame, error-eliminated high-accuracy data can be obtained.

According to a fourteenth aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, in which the mobile terminal station transmits a signal which has been subjected to the error-correction encoding processing; each of the plurality of base stations receives the signal transmitted from the mobile terminal station via the wireless line, performs a frame reliability detecting processing for the thus-received signal, performs an error-correction decoding processing for the signal through use of the result of detection of reliability, to thereby produce an error-correction decoded signal and a soft determination outputs, and transmits the error-correction decoded signal and the soft determination output to the base-station host apparatus via the wired line; and the base-station host apparatus performs an error-correction encoding processing for the signals received from the base stations through use of the soft determination output information in order to produce error-correction encoded signals with soft determination outputs, composes the error-correction encoded signals into one signal by utilization of the soft determination outputs produced by the error-correction encoding processing, and performs an error-correction decoding processing for the thus-composed signal.

According to a fifteenth aspect of the present invention, there is provided a base-station host apparatus for use in a mobile communications system which employs the site diversity receiving method, wherein a signal subjected to the error-correction encoding processing and transmitted from the mobile terminal station is received by a plurality of base stations, where the signals are further subjected to an error-correction decoding processing in order to produce error-correction decoded signals with soft determination outputs, and wherein the base-station host apparatus receives the error-correction decoded signals with the soft determination outputs from the plurality of base stations, the base-station host apparatus comprising: an error-correction encoding section which performs an error-correction encoding processing for the error-correction decoded signals received from the respective base stations through use of the soft determination output information in order to produce error-correction encoded signals with soft determination outputs; a composing section which composes into one signal the error-correction encoded signals output from the error-correction encoding section by utilization of the soft determination outputs produced by the error-correction encoding processing; and an error-correction decoding section which performs an error-correction decoding processing for the thus-composed signal.

According to the present invention, there are obtained advantageous results similar to those mentioned previously. Further, the reliability information extraction section can perform re-encoding-and-composing processing, through use of the reliability information of each bit. Therefore, even in this case, there can be obtained error-eliminated high-accuracy data.

According to a sixteenth aspect of the present invention, there is provided a site diversity receiving method for use in a mobile communications system that includes a mobile terminal station, a plurality of base stations connected to the mobile terminal station via a wireless line, and a base-station host apparatus connected to the base stations via a wired line, in which the mobile terminal station transmits a signal which has been subjected to an error-detection encoding processing and an error-correction encoding processing; each of the plurality of base stations receives the signal transmitted from the mobile terminal station via the wireless line, performs an error-correction decoding processing for the thus-received signal, and transmits a signal that has been subjected to the error-correction decoding processing to the base-station host apparatus via the wired line; and the base-station host apparatus performs an error detection processing for the signal received from each of the base stations, and operates such that if there is not found an error in the signals received from all of the base stations, the base-station host apparatus outputs the signals received from the respective base stations as received signals, and if there is found an error in the signals received from the base stations, the base-station host apparatus composes the signals received from the base stations into one signal and detects an error in the composed signal, that if there is not found an error in the composed signal, the base-station host apparatus outputs the composed signal as a received signal, and if there is found an error in the composed signal, the base-station host apparatus performs an error-correction encoding processing for the signals received from the base station, composes the error-correction encoded signals into one signal, performs an error-correction decoding processing for the composed signal, and detects an error in the error-correction decoded signal, and that if there is not found an error in the error-correction decoded signal, the base-station host apparatus outputs the error-correction decoded signal as a received signal.

The site diversity receiving method for use in the mobile communications system according to the present invention is characterized by the feature that if an error in the error-correction decoded signal is detected by the base-station host apparatus, the signals received from the base stations or the composed signal is output as a received signal.

According to a seventeenth aspect of the present invention, there is provided a base-station host apparatus for use in a mobile communications system which employs the site diversity receiving method, wherein a signal subjected to an error-detection encoding processing and an error-correction encoding processing and transmitted from the mobile terminal station is received by a plurality of base stations, where the signals are further subjected to an error-correction decoding processing, and wherein the base-station host apparatus receives the error-correction decoded signals from the plurality of base stations, the base-station host apparatus comprising: a first composing section which composes into one signal the error-correction decoded signals received from the base stations; an error correction encoding section which performs an error-correction encoding processing for the error-correction decoded signals received from the base stations to thereby output error-correction encoded signals; a second composing section which composes into one signal the error-correction encoded signals received from the error-correction encoding section; an error-correction decoding section which performs an error-correction decoding processing for the composed signal output from the second composing section; a signal selection section which selects any one from the signals received from the base stations, the composed signal output from the first composing section, and the signal output from the error-correction decoding section; a first error detection section which detects an error in the error-correction decoded signal received from each of the base stations; a second error detection section which detects an error in the composed signal output from the first composing section; a third error detection section which detects an error in the signal output from the error-correction decoding section; and a control section which receives the results of detection from the first, second, and third error detection sections. the control section making a determination as to whether or not there is found an error in the signal received from each of the base stations, through use of the detection result received from the first error detection section. If no errors are detected from the signals received from the base stations, the control section causes the signal selection section to output the signals received from the base stations as a received signal. If there are found errors in all the signals received from the base stations, the control section makes a determination as to whether or not there is found an error in the composed signal output, through use of the detection result received from the second error detection section. If no errors are detected from the composed signal, the control section causes the signal selection section to output the composed signal as a received signal. If there is found an error in the composed signal, the control section makes a determination as to whether or not there is found an error in the signal output from the error-correction decoding section, through use of the detection result received from the third error detection section. If no errors are detected from the signal output from the error-correction decoding section, the control section causes the signal selection section to output the error-correction decoded signal as a received signal.

Preferably, in the base-station host apparatus used in the mobile communications system that employs the site diversity receiving method according to the present invention, the third error detection section has a control section which controls the signal selection section in such a way that the signal selection section outputs the composed signal or the signals received from the base stations as a received signal if an error is detected from the error-correction decoded signal.

According to the present invention, since the error detection sections (i.e., the first, second, and third error detection sections) are provided in a plurality of locations which require the error detection section, data can be readily changed according to the result of detection of an error in the received signal, and best data can be efficiently selected. Consequently, the present invention has the advantage of yielding significant improvement in the processing capability of the overall mobile communications system.

According to an eighteenth aspect of the present invention, there is provided a reception signal processing method performed in a base-station host apparatus of a mobile communication system employing a site diversity receiving method, said reception signal processing method comprising: a receiving step for receiving an error-correction decoded signal from each of a plurality of base stations which receive a transmission signal from a mobile terminal station, said mobile terminal transmitting a signal subjected to an error-correction encoding processing as the transmission signal, and each of said base stations performing an error-correction decoding processing for the transmission signal to obtain the error-correction decoded signal; an error-correction encoding processing step for performing an error correction encoding processing for each of the signals received from the respective base stations in said receiving step; a composing step for composing the signals subjected to the error-correction encoding processing to obtain a composed signal; and an error-correction decoding processing for performing an error-correction decoding processing for the composed signal.

Accordingly, the present invention allows the base-station host apparatus to perform a re-encoding processing and a composing processing for the signals error-correction-decoded by the base stations. Therefore, the error rate of the received signal can be improved, through use of the site diversity method with no accompanying increase in the amount of signal data flowing between the base stations and the base-station host apparatus, thereby contributing to a significant improvement in the transmission capability of the mobile communications system.

According to a nineteenth aspect of the present invention, there is provided a reception signal processing method performed in a base-station host apparatus of a mobile communication system employing a site diversity receiving method, said reception signal processing method comprising: a receiving step for receiving an error-correction decoded signal and error presence information from each of a plurality of base stations which receive a transmission signal from a mobile terminal station, said mobile terminal transmitting a signal subjected to an error-detection encoding processing and an error-correction encoding processing as the transmission signal, and each of said base stations performing an error-correction decoding processing for the transmission signal to obtain the error-correction decoded signal and also performing an error detection processing to output the error presence information when an error is detected; a judging step for making judgment as to whether or not all of the respective base stations output the error presence information; an error-correction encoding processing step for performing an error correction encoding processing for each of the signals received from the respective base stations when it is judged in the judging step that all of the respective base stations output the error presence information; a composing step for composing the signals subjected to the error-correction encoding processing to obtain a composed signal; and an error-correction decoding processing for performing an error-correction decoding processing for the composed signal.

According to the present invention, addition of the error presence/absence information to the signals transmitted from the mobile terminal station results in advantageous results similar to those mentioned previously and in execution of processing according to the result of detection of data errors. Accordingly, data having few errors can be selected. Even in this case, the transmission capability of the mobile communications system is improved.

According to a twentieth aspect of the present invention, there is provided a reception signal processing method performed in a base-station host apparatus of a mobile communication system employing a site diversity receiving method, said reception signal processing method comprising: a receiving step for receiving an error-correction decoded signal from each of a plurality of base stations which receive a transmission signal from a mobile terminal station, said mobile terminal transmitting a signal subjected to an error-detection encoding processing and an error-correction encoding processing as the transmission signal, and each of said base stations performing an error-correction decoding processing for the transmission signal to obtain the error-correction decoded signal; an error detecting step for performing an error detection processing for each of the signals received from the respective base stations in said receiving step; a judging step for making judgment as to whether or not each of the signals received from the respective base stations contains an error; an error-correction encoding processing step for performing an error correction encoding processing for each of the signals received from the respective base stations when it is judged in the judging step that each of the signals received from the respective base stations contains an error; a composing step for composing the signals subjected to the error-correction encoding processing to obtain a composed signal; and an error-correction decoding processing for performing an error-correction decoding processing for the composed signal.

According to the present invention, advantageous results similar to those mentioned previously are obtained. In addition, since the base-station host apparatus is capable of detecting (or determining) errors in input data, there can also be detected errors in the wireless line established between the terminal station and the base stations, as well as errors in a wire circuit established between the base stations and the base-station host apparatus. As a result, a more accurate signal can be output. The present invention has the advantage of improvement in the quality of the signal received by the base-station host apparatus.

According to a twenty-first aspect of the present invention, there is provided a reception signal processing method performed in a base-station host apparatus of a mobile communication system employing a site diversity receiving method, said reception signal processing method comprising: a receiving step for receiving an error-correction decoded signal from each of a plurality of base stations which receive a transmission signal from a mobile terminal station, said mobile terminal transmitting a signal subjected to an error-detection encoding processing and an error-correction encoding processing as the transmission signal, and each of said base stations performing an error-correction decoding processing for the transmission signal to obtain the error-correction decoded signal; an error-correction encoding processing step for performing an error correction encoding processing for each of the signals received from the respective base stations in said receiving step; a composing step for composing the signals subjected to the error-correction encoding processing to obtain a composed signal; and an error-correction decoding processing for performing an error-correction decoding processing for the composed signal; an error detecting step for performing an error detection processing for the signal subjected to the error-correction decoding processing; and an outputting step for outputting the signal subjected to the error-correction decoding processing as a received signal when it is judged in the judging step that the signal subjected to the error-correction decoding processing contains no error.

According to the present invention, since the error detection section of the base-station host apparatus detects errors in an error-correction decoded signal output from the error-correction decoding section, there can be detected errors in the data whose error rate is improved. Even in this case, the error detection section can be shared between the base stations without provision of the error detection section to each of the base stations. Therefore, the cost required for the error detection section can be reduced, which in turn contributes to cutting of the cost of the overall mobile transmission system.

According to a twenty-second aspect of the present invention, there is provided a reception signal processing method performed in a base-station host apparatus of a mobile communication system employing a site diversity receiving method, said reception signal processing method comprising: a receiving step for receiving an error-correction decoded signal from each of a plurality of base stations which receive a transmission signal from a mobile terminal station, said mobile terminal transmitting a signal subjected to an error-correction encoding processing as the transmission signal, and each of said base stations performing an error-correction decoding processing for the transmission signal to obtain the error-correction decoded signal; an error-correction encoding processing step for performing an error correction encoding processing for each of the signals received from the respective base stations in said receiving step; a composing step for composing the signals subjected to the error-correction encoding processing, while reflecting an error rate obtained from the signals from the respective base stations, in order to obtain a composed signal; and an error-correction decoding processing for performing an error-correction decoding processing for the composed signal.

According to the present invention, since the signals received from the base stations can be composed into one signal while an error rate is assigned as a weight to the signal received from the base station, advantageous results similar to those mentioned previously are obtained. More accurate data can be obtained, and hence the performance of the base-station host apparatus can be improved even in this case.

According to a twenty-third aspect of the present invention, there is provided a reception signal processing method performed in a base-station host apparatus of a mobile communication system employing a site diversity receiving method, said reception signal processing method comprising: a receiving step for receiving frame reliability information and an error-correction decoded signal from each of a plurality of base stations which receive a transmission signal from a mobile terminal station, said mobile terminal transmitting a signal subjected to an error-correction encoding processing as the transmission signal, and each of said base stations performing an error-correction decoding processing for the transmission signal to obtain the error-correction decoded signal and also detecting frame reliability to output the frame reliability information; an error-correction encoding processing step for performing an error correction encoding processing for each of the signals received from the respective base stations in said receiving step; a composing step for composing the signals subjected to the error-correction encoding processing, while reflecting the frame reliability information received from the respective base stations, in order to obtain a composed signal; and an error-correction decoding processing for performing an error-correction decoding processing for the composed signal.

According to the present invention, since the reliability extraction section can perform re-encoding-and-composing processing through use of the reliability information of each frame, error-eliminated high-accuracy data can be obtained.

According to a twenty-fourth aspect of the present invention, there is provided a reception signal processing method performed in a base-station host apparatus of a mobile communication system employing a site diversity receiving method, said reception signal processing method comprising: a receiving step for receiving an error-correction decoded signal, accompanied by soft determination output information, from each of a plurality of base stations which receive a transmission signal from a mobile terminal station, said mobile terminal transmitting a signal subjected to an error-correction encoding processing as the transmission signal, and each of said base stations performing an error-correction decoding processing, accompanied by soft determination output, for the transmission signal to obtain the error-correction decoded signal; an error-correction encoding processing step for performing an error correction encoding processing, accompanied by soft determination output, for each of the signals received from the respective base stations in said receiving step through use of the soft determination output information; a composing step for composing the signals subjected to the error-correction encoding processing, while utilizing the soft determination output outputted during the error correction encoding processing, in order to obtain a composed signal; and an error-correction decoding processing for performing an error-correction decoding processing for the composed signal.

According to the present invention, there are obtained advantageous results similar to those mentioned previously. Further, the reliability information extraction section can perform re-encoding-and-composing processing, through use of the reliability information of each bit. Therefore, even in this case, there can be obtained error-eliminated high-accuracy data.

According to a twenty-fifth aspect of the present invention, there is provided a reception signal processing method performed in a base-station host apparatus of a mobile communication system employing a site diversity receiving method, said reception signal processing method comprising: a receiving step for receiving an error-correction decoded signal and error presence information from each of a plurality of base stations which receive a transmission signal from a mobile terminal station, said mobile terminal transmitting a signal subjected to an error-detection encoding processing and an error-correction encoding processing as the transmission signal, and each of said base stations performing an error-correction decoding processing for the transmission signal to obtain the error-correction decoded signal; a first error detecting step for detecting an error from the signals received from the respective base stations in the receiving step; a first outputting step for outputting, as a received signal, the signal received from the respective base stations when no error is detected, in the first error detecting step, from any one of the signals received from the respective base stations; a first composing step for obtaining a composed signal by composing the signals received from the respective base stations when an error is detected, in the first error detecting step, from each of the signals received from the respective base stations; a second error detecting step for detecting an error from the composed signal obtained in the first composing step; a second outputting step for outputting, as a received signal, the composed signal when no error is detected, in the second error detecting step, from the composed signal; an error-correction encoding processing step for performing an error correction encoding processing for each of the signals received from the respective base stations when an error is detected, in the second error detecting step, from the composed signal; a second composing step for obtaining a composed signal by composing the signals subjected to the error correction encoding processing; an error-correction decoding processing for performing an error-correction decoding processing for the composed signal obtained in the second composing step; a third error detecting step for detecting an error from the signal subjected to the error-correction decoding processing; and a third outputting step for outputting, as a received signal, the signal subjected to the error-correction decoding processing when no error is detected, in the third error detecting step, from the signal subjected to the error-correction decoding processing.

Preferably, the composed signal obtained in the first composing step or the signal received from the base station is outputted as a received signal when an error is detected from the signal subjected to the error-correction decoding processing in the third error detecting step.

According to the present invention, since the error detection sections (i.e., the first, second, and third error detection sections) are provided in a plurality of locations which require the error detection section, data can be readily changed according to the result of detection of an error in the received signal, and best data can be efficiently selected. Consequently, the present invention has the advantage of yielding significant improvement in the processing capability of the overall mobile communications system.

BRIEF DESCRIPTION OF THE DRAWINGS

FIG. 6 is a block diagram showing a composing section of the exchange according to the first embodiment of the present invention;

FIGS. 7(a) to 7(c) are diagrammatic representations for explaining the operations of the composing section of the exchange according to the first embodiment of the present invention;

FIG. 9 is a table showing a specific example of specifications of the simulation performed in the first embodiment of the present invention;

DESCRIPTION OF THE PREFERRED EMBODIMENTS

(a) Description of a First Embodiment of the Invention

Figure 1:
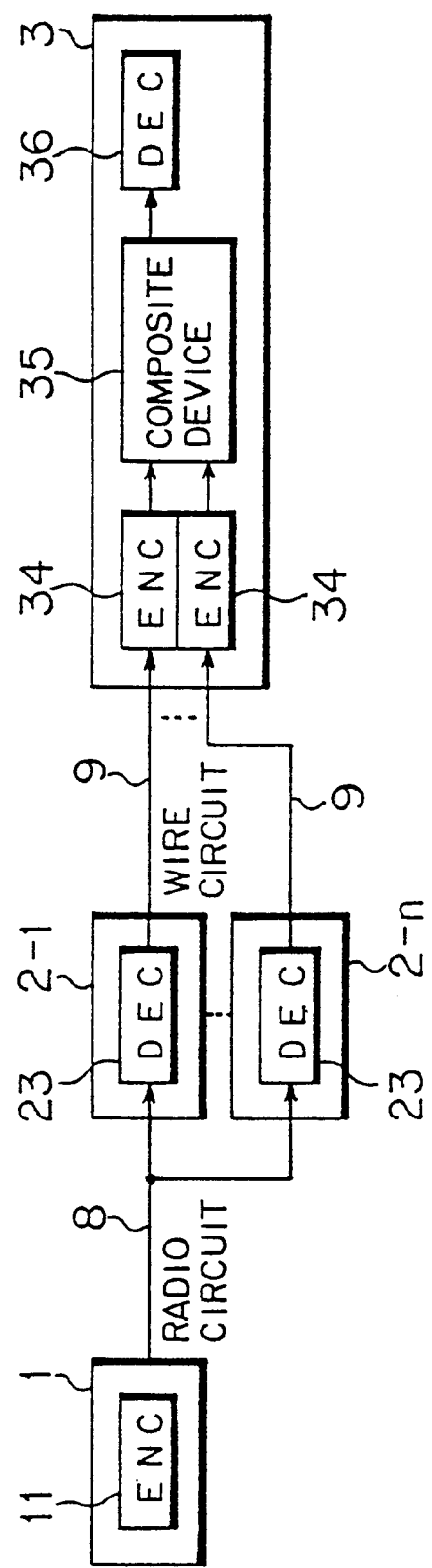
FIG. 1 is a block diagram showing the configuration of a mobile communications system according to a first embodiment of the present invention.
Figure 2:
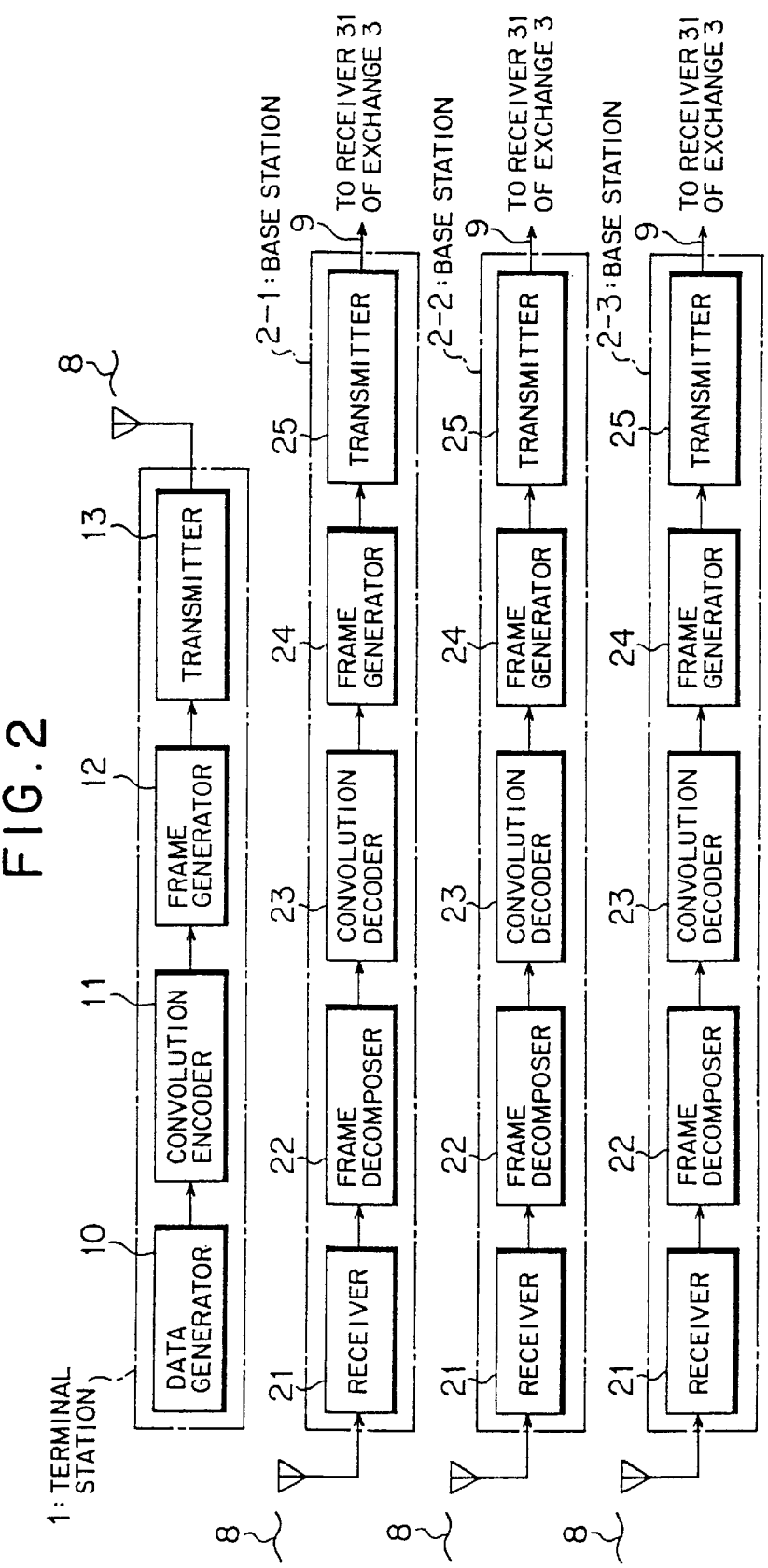
FIG. 2 is a block diagram showing the configuration of a mobile terminal station and a plurality of base stations of the mobile communications system according to the first embodiment of the present invention.

With reference to the accompanying drawings, a mobile communications system according to a first embodiment of the present invention will be described. As shown in FIG. 1, the mobile communications system comprises a terminal station (or a mobile terminal station) 1; a plurality of base stations 2-1 to 2-n (n is a natural number) which are connected to (or can communicate with) the terminal station (or a mobile terminal station) 1 via a wireless line 8; and an exchange 3 connected to each of the base stations 2-1 to 2-n via a wired line (or a transmission circuit) 9. FIG. 2 shows a case where three base stations 2-1 to 2-3 exist in the mobile communications system (i.e., wherein n=3). In principle, consideration will be hereinafter given to the case where n=3.

The exchange (a base-station host apparatus) 3 corresponds to a mobile exchange or a base station control station. In the first embodiment and throughout the following embodiments, these are generically called an exchange.

As shown in FIG. 2, the terminal station 1 has; e.g., a data generator 10, a convolution encoder 11, a frame generator 12, and a transmitter 13. The data generator 10 generates data to be transmitted within the terminal station 1, and the convolution encoder (ENC: Error Correcting Encoder) 11 subjects the data to be transmitted to convolution encoding processing (i.e., error-correction encoding processing). The data are subjected to convolution encoding processing according to the method designated beforehand in agreement with the base stations 2-1 to 2-3.

Figure 4:
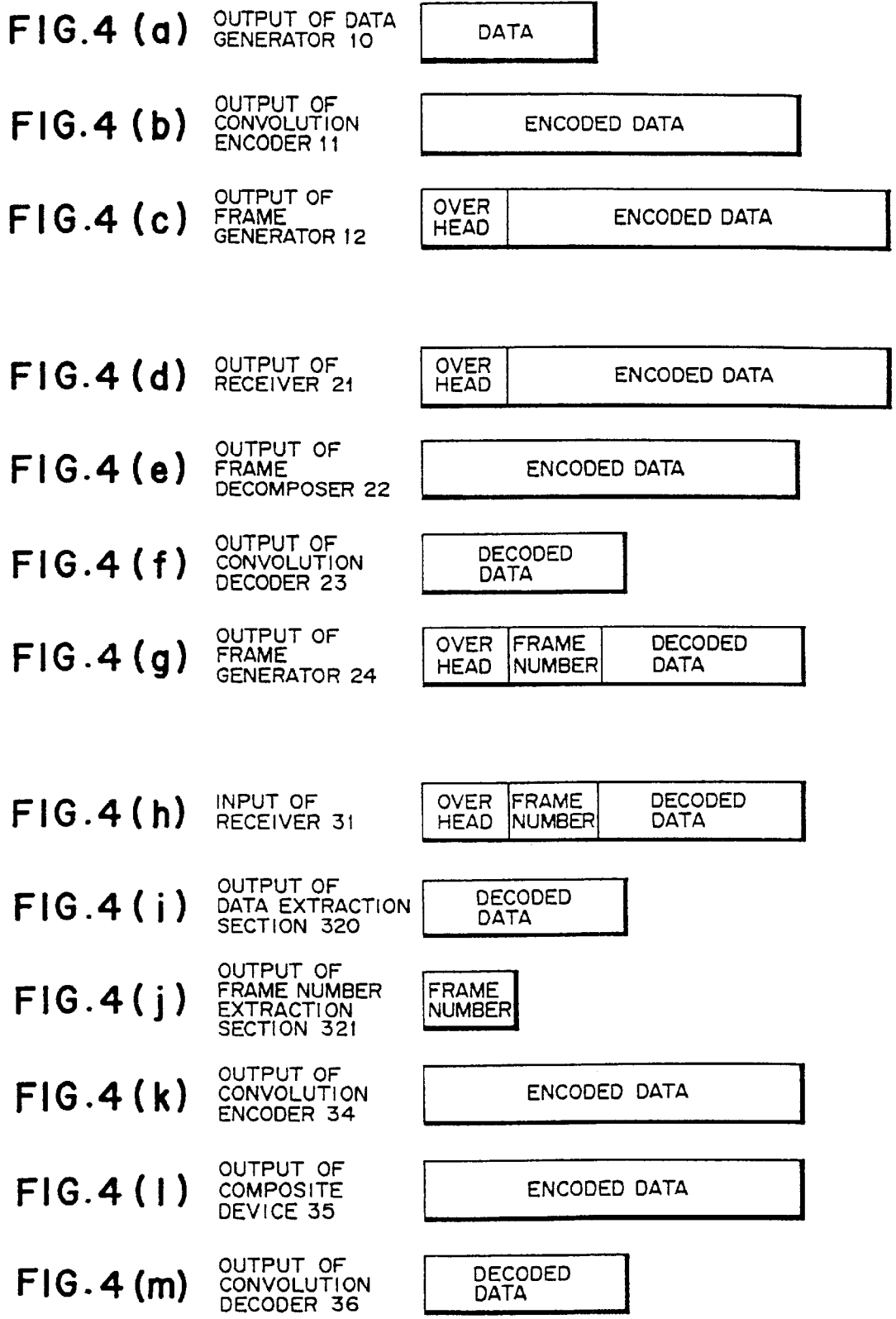
FIGS. 4(a) to 4(m) are schematic representations for explaining the transmission of data within the mobile communications system according to the first embodiment of the present invention.

More specifically, if the data generated by the data generator 10 are ("1," "1," "0," "0"), the convolution encoder subjects the data to convolution encoding process, to thereby obtain encoded data ("1," "1," "1," "0," "1," "0," "1," "1"). In short, as shown in FIG. 4(b), the amount of data generated by the data generator 10 such as that shown in FIG. 4(a) is doubled by the convolution encoder 11.

The frame generator 12 inserts the data encoded by the convolution encoder 11 into a predetermined frame format designated beforehand in agreement with the exchange 3. For example, as shown in FIG. 4(c), a predetermined frame format is formed by providing the data encoded by the convolution encoder 11 with an overhead. The transmitter 13 transmits the frame format formed by the frame generator 12 to the base stations 2-1 to 2-3 via the wireless line 8.

In contrast, the base stations 2-1 to 2-3 receive data from the terminal 1 and process the thus-received data for transmission to the exchange 3. As shown in FIG. 2, each of the base stations 2-1 to 2-3 comprises a receiver 21, a frame decomposer 22, a convolution decoder (DEC) 23, a frame generator 24, and a transmitter 25.

The receiver 21 receives an output (having a predetermined frame format) from the terminal station 1. For example, as shown in FIG. 4(d), the frame format having an overhead is output to a frame decomposer 22 in a subsequent stage.

For example, as shown in FIG. 4(e), the frame decomposer 22 extracts encoded data by removal of the overhead from the received frame format. The convolution decoder (DEC) 23 subjects the data to convolution decoding processing (i.e., error-correction decoding processing) according to the method designated beforehand in agreement with the terminal station 1 (i.e., by the method corresponding to the convolution encoding method used by the terminal station 1).

Further, the frame generator 24 inserts the data decoded (the result of decoding; see FIG. 4(f)) by the convolution decoder 23 into a predetermined frame format (e.g., a frame format used for the purpose of a wire circuit 9) designated beforehand in agreement with the exchange 3. For example, as shown in FIG. 4(g), an overhead and a frame number are added to the decoded data in the present embodiment, whereby a predetermined frame format is formed.

The transmitter 25 transmits the frame format formed by the frame generator 24 to the exchange 3 via the wire circuit 9.

More specifically, the base stations 2-1 to 2-3 receive the signal, which is sent from the terminal 20 station 1, via the wireless line 8. After having subjected the signals to convolution decoding processing, the base stations 2-1 to 2-3 send the thus-convolution-decoded signals to the exchange 3 via the wire circuit 9.

Next, the exchange 3 receives the data from the respective base stations 2-1 to 2-3 and subjects the data to required processing. As mentioned previously, in the present embodiment, the signal convolution-encoded by the terminal 1 is received and convolution-decoded by each of the plurality of base stations 2-1 to 2-3, and the exchange 3 receives the thus-decoded signals.

Figure 3:
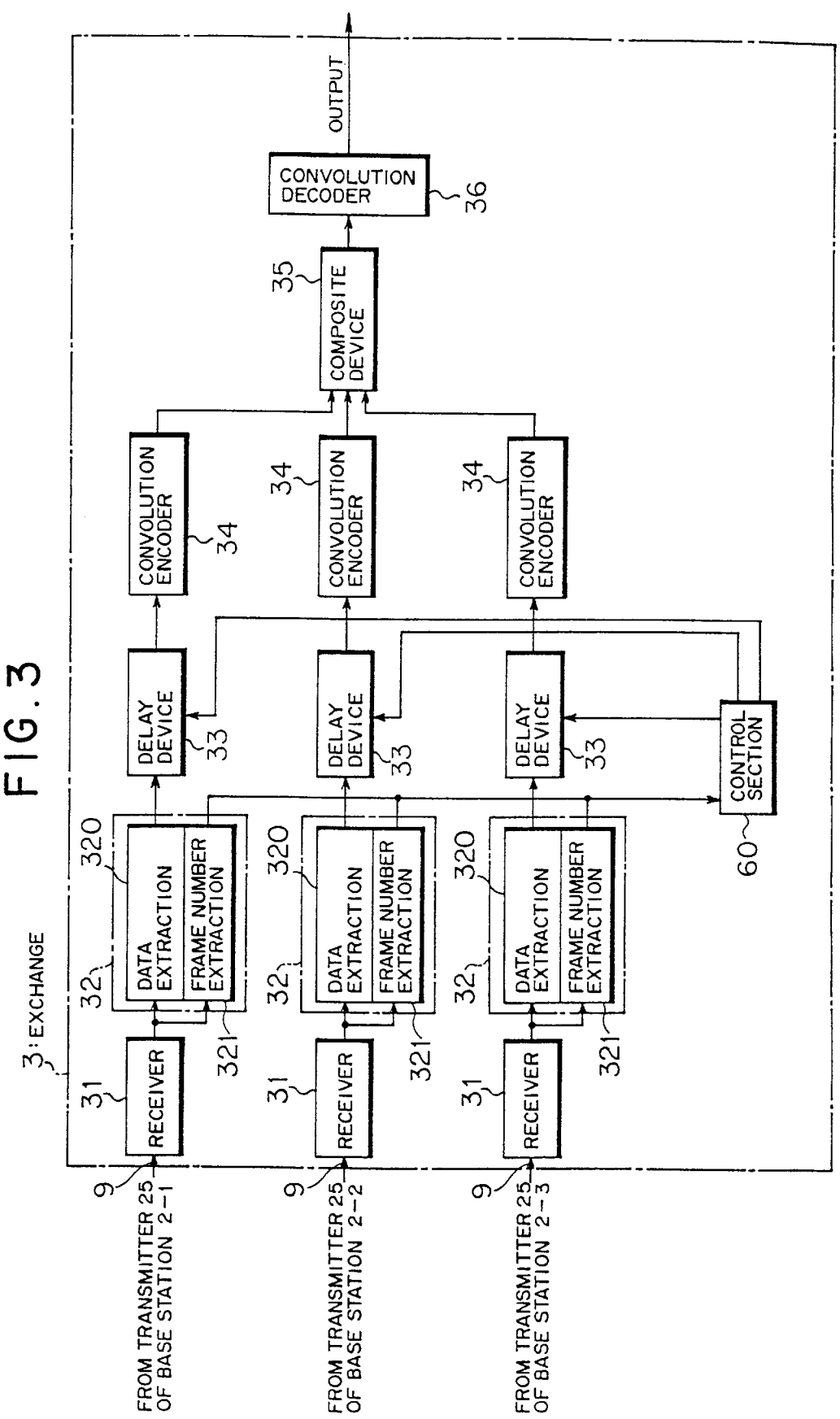
FIG. 3 is a block diagram showing the configuration of an exchange used in the mobile communications system employing a site diversity receiving method according to the first embodiment of the present invention.

As shown in FIG. 3, the exchange 3 comprises a receiver 31, a frame decomposer 32, a delay device 33, a convolution encoder (ENC) 34, a composite device 35, a convolution decoder (DEC) 36, and a control section 60. The receiver 31 receives the data (or the convolution decoded signals) from the base stations 2-1 to 2-3. As mentioned previously, the receiver 31 is designed so as to receive a frame format— which comprises decoded data provided with an overhead and a frame number-such as that shown in FIG. 4(h).

The frame decomposer 32 extracts the decoded data and the frame number from the frame format received by the receiver 31. To this end, the frame decomposer 32 is provided with a data extraction section 320 and a frame number extraction section 321. As shown in FIG. 4(i), the decoded data are extracted from the frame format, and the frame number extraction section 321 extracts (acquires) the frame number from the frame format. As a result of extraction of the frame number, the signals asynchronously sent from the base stations 2-1 to 2-3 are checked as to whether or not they have the same frame number, thereby ensuring synchronization of the signals.

Further, each of the delay devices 33 delays the decoded data output from the data extraction section 320 by a predetermined period of time in such a way that the decoded data sent to the convolution encoder 34 are assigned the same frame number, to thereby correct delays in the signals output from the base stations 2-1 to 2-3. The delay time of each delay device 33 is controlled by a control section 60 on the basis of the frame number.

The convolution encoder (ENC: error-correcting encoding section) 34 outputs the signal (see FIG. 4(k)) produced by subjecting to convolution encoding processing the convolution-decoded signals (i.e., error-correcting decoded signals) received from the respective base stations 2-1 to 2-3. More specifically, by means of the convolution encoder 34 the exchange 3 encodes the convolution-decoded signals received from the base stations 2-1 to 2-3.

Figure 5:
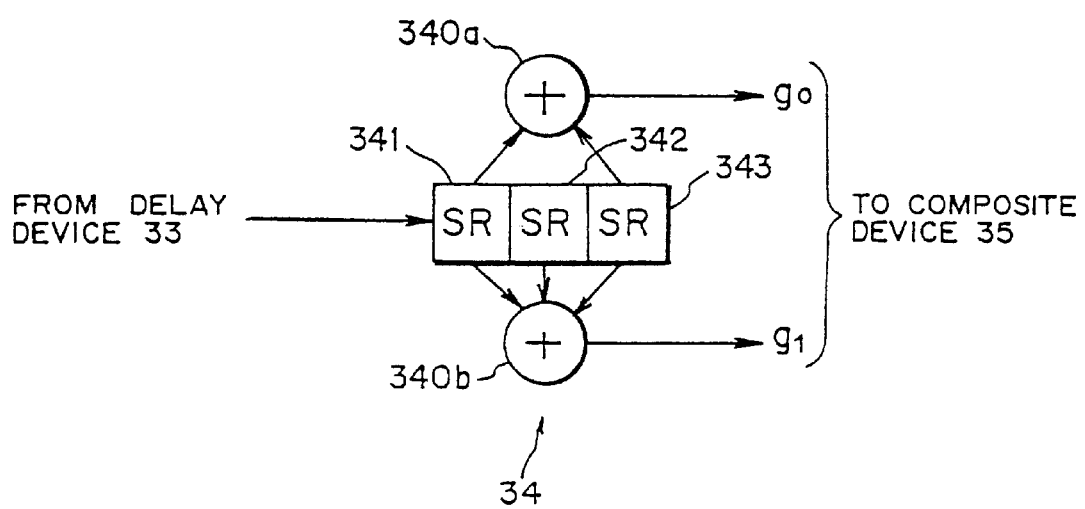
FIG. 5 is a block diagram showing one example of the error correcting encoding apparatus according to the first embodiment of the present invention.

For this reason, as shown in FIG. 5, the convolution encoder 34 comprises exclusive ORs 340a, 340b, and shift registers 341, 342, and 343. When an encoding rate (R)=½, and a confined length (k)=3 are set, the exclusive ORs 340a and 340b perform respective arithmetic operations $g_0=1+D^2$ and $g_1=1+D+D^2$, through use of the values "1," "D," and "$D^2$" preset in the shift registers 341, 342, and 343. As a result, two bits of encoded signal ($g_0$, $g_1$) are obtained with respect to an input of one bit of information.

In the present embodiment, the composite device (or composing section) 35 also subjects to composing processing the convolution-encoded signals from the convolution encoders 34. Further, the composite device 35 is arranged so as to be able to output the result of soft determination. In this case, the convolution-demodulator 36, which will be described later, becomes able to subject the composed signal to soft determination decoding processing, through use of the composed signal and the result of soft determination received from the composite device 35.

That is, as shown in FIG. 6, the composite device 35 is provided with a majority determination section 350 and a soft determination section 351.

The majority determination section 350 determines which number represents the majority of input signals and outputs a signal whose number of inputs is large. As shown in FIG. 7(a), the majority determination section 350 is arranged so as to output either 0 or 1 from the three input signals (input 1, input 2, and input 3), whichever number has a greater number of inputs (more specifically, if the three inputs are "1," "1," and "0," a value of "1" is output. In contrast, if the three inputs are "1," "0," and "0," a value of "0" is output).

In contrast, the soft determination section 351 determines which number represents the majority of input signals and outputs a value corresponding to the number of signals having a higher probability. For example, as shown in FIG. 7(b), if all the input signals are the same, a value of "1" is output. If two of the input signals are the same, a value of "0.6" is output. In short, the reliability of result of majority determination can be improved by virtue of the result of soft determination performed by the soft determination section 351.

In the case of composing of signals output from two base stations, if the input signals have different values (i.e., one signal has a value of 1 and the other signal has a value of 0) as shown in FIG. 7(c), the reliability of the result of majority determination is 50%. The determination result of the input signals is output as a lost bit "*."

Next, the convolution decoder (DEC: Error Correcting Decoding Section) 36 subjects a composed signal output from the composite device 35 to convolution decoding processing. In a case where the composite device 35 also outputs the result of soft determination, the composed signal is subjected to soft determination decoding processing by utilization of the result of soft determination.

The re-encoding of the decoded signals by the convolution encoders 34 is equivalent to bringing the signals back to a state during the course of the decoding process in which the received signals are decoded by the convolution decoders 23 in the base stations 2-1 to 2-3. Accordingly, an error is not enlarged by the re-encoding processing. In short, the encoded data output from each of the convolution encoders 34 return to their state before decoding by the convolution decoder 23. Consequently, in comparison with the case where the encoded data are decoded by the base stations 2-1 to 2-3, the characteristics of the received signal can be improved.

In the foregoing mobile communications system, the exchange 3 is provided with the convolution encoders 34, the composite devices 35, and the decoders 36. In such an exchange 34, the signals output from the respective base stations 2-1 to 2-3 are subjected to convolution encoding processing. The thus-convolution-encoded signals are subjected to synthetic processing and convolution decoding processing. A round of these operations: namely, convolution encoding processing→composite processing→convolution decoding processing, will be hereinafter simply referred to as re-encoding-and-composing processing.

With regard to the mobile communications system that has the aforementioned configuration and adopts the site diversity receiving method according to the first embodiment shown in FIG. 2, within the terminal station 1, the convolution encoder 11 subjects the data output from the data generator 10 to convolution encoding processing according to the method designated beforehand in agreement with the base stations 2-1 to 2-3. The encoded data subjected to convolution encoding processing are inserted into a predetermined frame format by the frame generator 12 and are sent from the transmitter 13 to the base stations 2-1 to 2-3 via the wireless line 8.

Subsequently, in each of the base stations 2-1 to 2-3, the receiver 21 receives a signal from the terminal station 1, and the frame decomposer 22 extracts the encoded data from the frame format. The convolution decoder 23 subjects the encoded data to convolution decoding processing, and the frame generator 24 inserts the thus-decoded data to the frame format designated beforehand in agreement with the exchange 3. The data inserted into the frame format are sent to the exchange 3 by the transmitter 25.

As shown in FIG. 3, in the exchange 3, the receiver 31 receives the signals (decoded data) sent from the base stations 2-1 to 2-3, and the frame decomposer 32 extracts decoded data and a frame number from the received and decoded data. The delay device 33 corrects a delay in each signal of decoded data, and the signals are output to the convolution encoder 34.

Each of the sets of decoded data is again subjected to convolution encoding processing performed by the convolution encoder 34, and the composite device 35 composes the convolution-encoded signals into one signal.

The majority determination processing and the soft determination processing performed in the composite device 35 (a device for composing outputs from three stations into one signal) will be described with reference to FIG. 8.

Figure 8A:
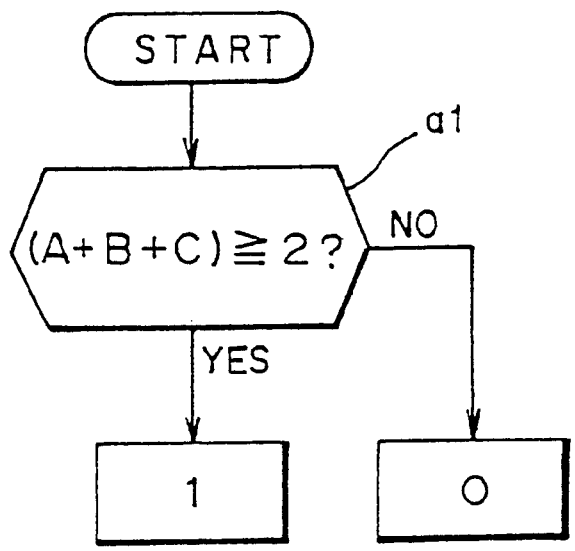
FIGS. 8(a) and 8(b) are flowcharts for explaining the operation of the composing section of the exchange according to the first embodiment of the present invention.

First, with regard to the majority determination processing, upon receipt of the convolution-encoded signals from the convolution encoder 34, the composite device 35 makes a determination as to whether or not the total number (A+B+C) of input signals (e.g., "A," "B," and "C") is greater than 2 (Step a1 shown in FIG. 8(a)). If the total number of the input signals is equal to or greater than 2 (i.e., at least two of the signals "A," "B," and "C" represent 1), a value of 1 is output to the convolution encoder 36 (YES in step a1 shown in FIG. 8(a)). In contrast, if the total number of the input signals is less than two (i.e., at least two of the signals "A," "B," and "C" represent 0), a value of 0 is output (NO in step a1 shown in FIG. 8(a)).

Figure 8B:
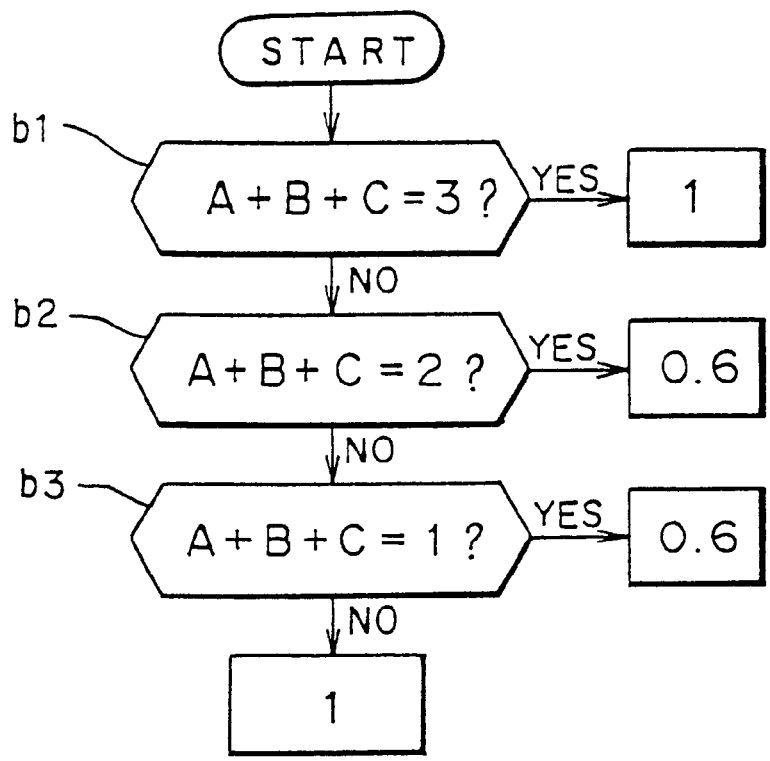

With regard to the soft determination performed by the composite device 35, upon receipt of the convolution-encoded signals from the convolution encoder 34, the composite device 35 makes a determination as to whether or not the total number of input signals (A+B+C) is three (A+B+C=3? in step b1 shown in FIG. 8(b)), and if so, a value of 1 is output. In contrast, if the total number of the input signals is not three (NO in step b1 shown in FIG. 8(b)), the composite device 35 makes a determination as to whether or not the total number of input signals is two (step b2).

If the total number of the input signals is two (YES in step b2 shown in FIG. 8(b)), a value of 0.6 is output. In contrast, if the total number is not two (NO in step b2 shown in FIG. 8(b)), the composite device 35 makes a further determination as to whether or not the total number of the input signals is one (step b3).

If the total number of the input signals is one (YES in step b3 shown in FIG. 8(b)), a value of 0.6 is output. In contrast, if the total number is not one (NO in step b3 shown in FIG. 8(b)), a value of 1 is output.

Subsequently, the convolution decoder 36 subjects to convolution decoding processing a signal (including a composed signal and the result of soft determination) output from the foregoing composite device 35 and outputs the thus-convolution-decoded signal as data.

An explanation will now be given of a specific example (simulations) for the purpose of verifying the operation of the exchange 3 used in the mobile communications system that employs the foregoing site diversity receiving method according to the aforementioned embodiment. The simulations are implemented on the basis of specifications such as those shown in FIG. 9.

Figure 10:
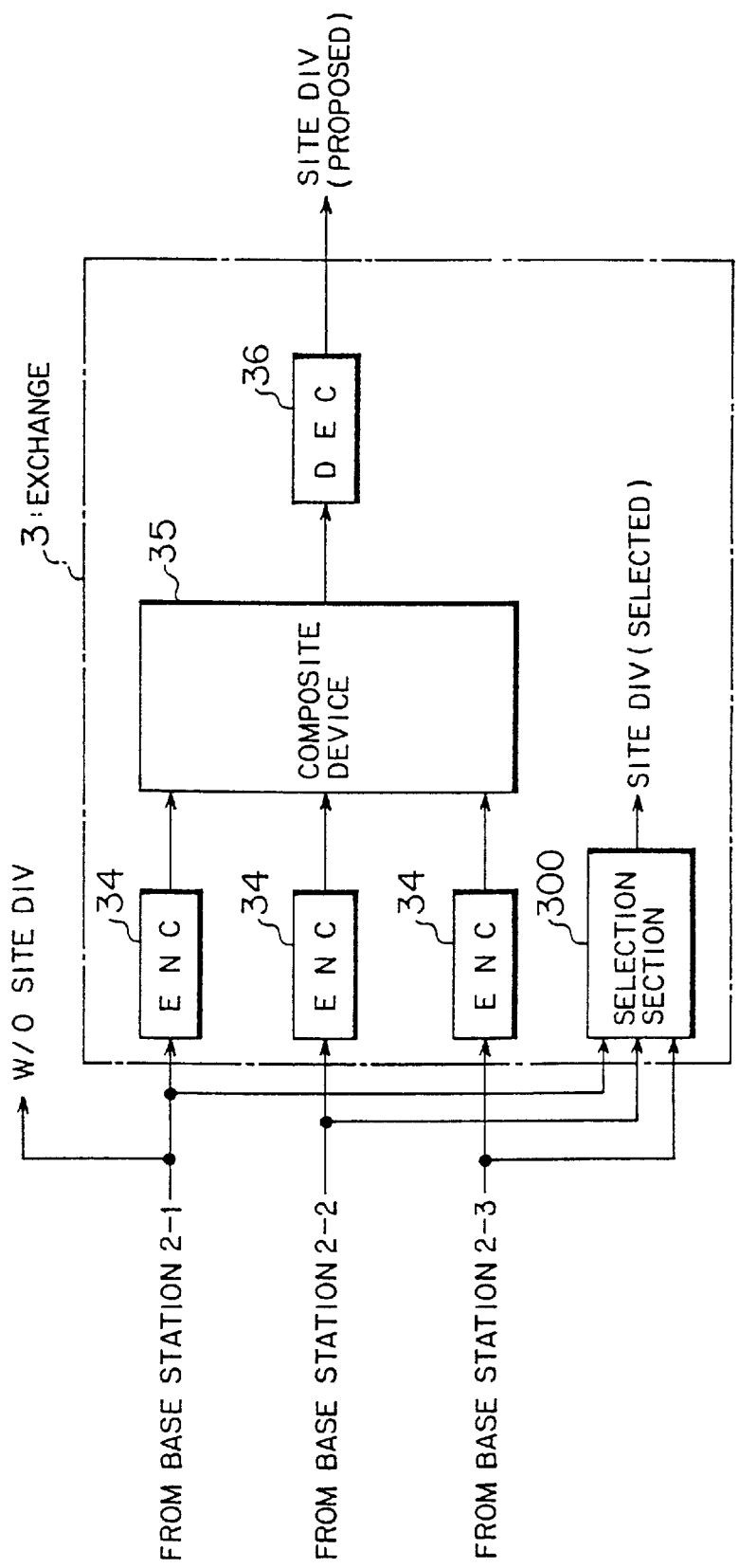
FIG. 10 is a block diagram showing the configuration of an exchange used in the simulation according to the first embodiment of the present invention.
Figure 28:
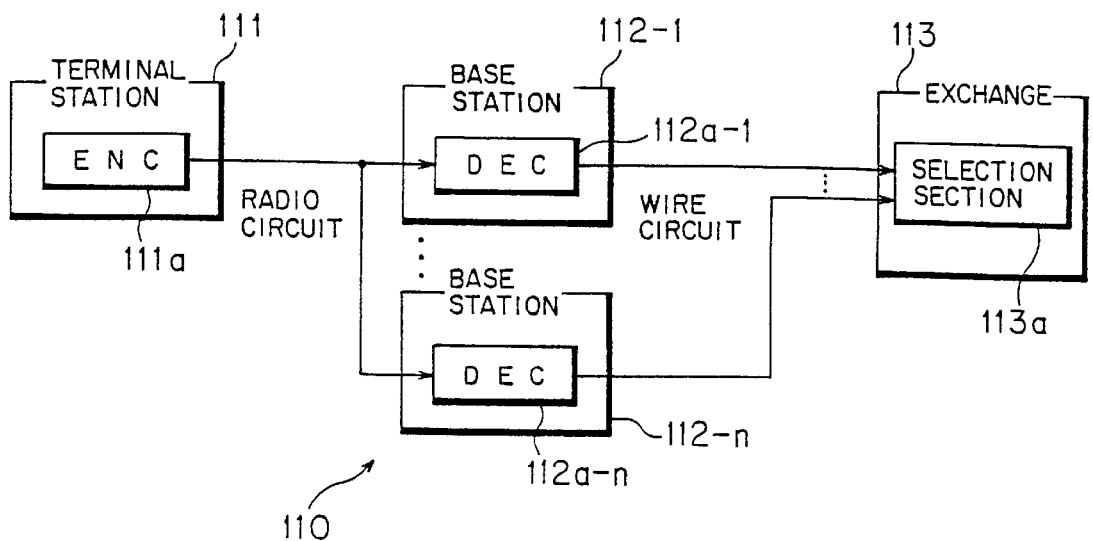
FIG. 28 is a block diagram showing another example of the mobile communications system to which a CDMA method and a site diversity method are applied.
Figure 29:
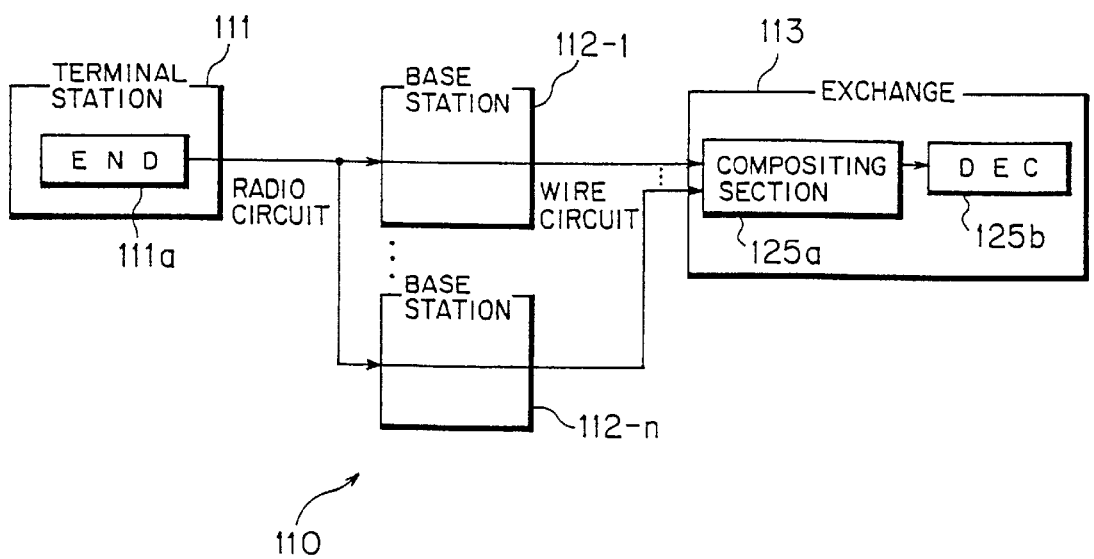
FIG. 29 is a block diagram showing still another example of the mobile communications system to which a CDMA method and a site diversity method are applied.

FIG. 10 is a block diagram showing the configuration of the exchange 3 used in the simulations. The exchange 3 comprises convolution encoders (ENC) 34, a composite device 35, a convolution decoder (DEC) 36, and a selection section 300. The selection section 300 makes a selection from the convolution-decoded signals output from the base stations 2-1 to 2-3 (i.e., the selection section corresponds to the selection section 113a shown in FIG. 28).

The simulations are performed to examine the three types of exchanges 3; namely, (1) an exchange which does not employ the site diversity method; (2) an exchange which makes a selection from the convolution-decoded signals output from the base stations 2-1 to 2-3; and (3) an exchange which subjects the convolution-decoded signals output from the base stations 2-1 to 2-3 to re-encoding-and-composing processing, as does the exchange in the present embodiment.

Figure 11:
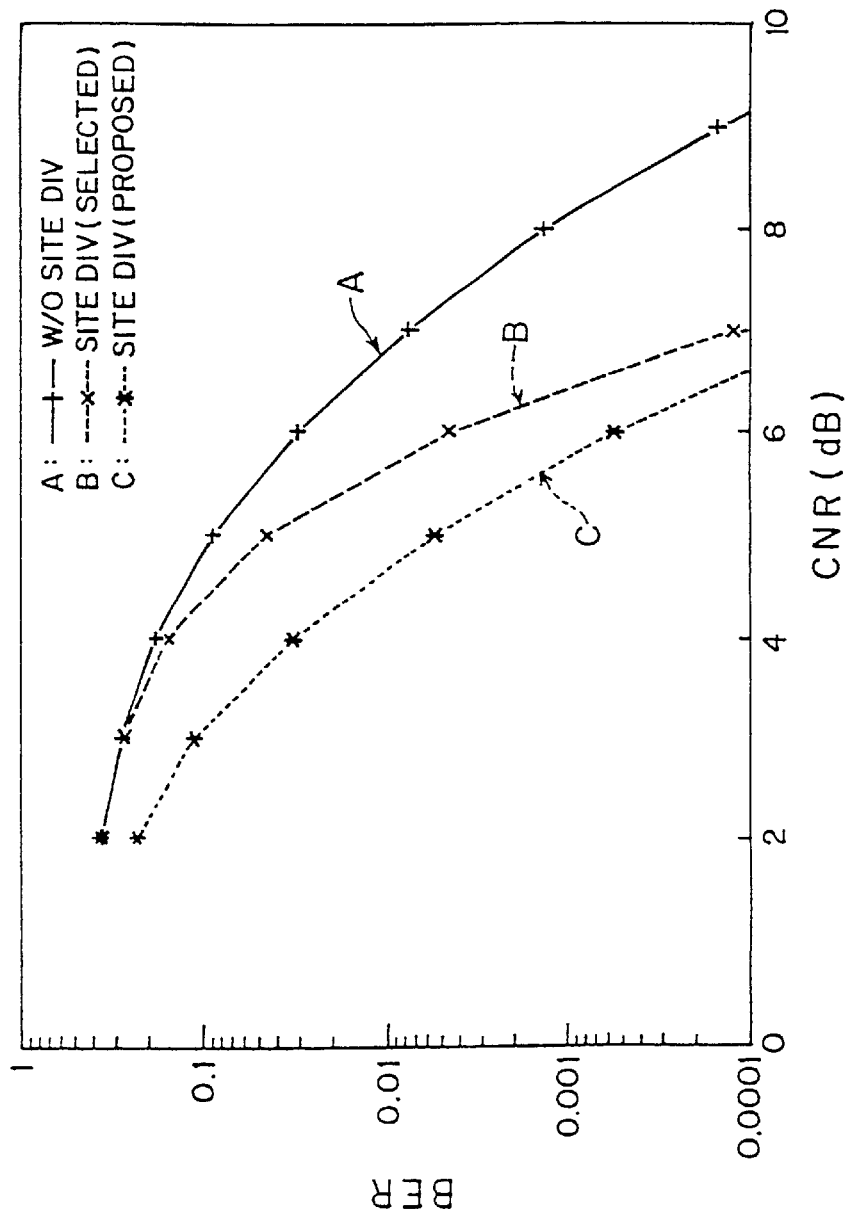
FIG. 11 is a plot showing one example of the simulation performed in the first embodiment of the present invention.

FIG. 11 is a plot showing the characteristics of a bit error rate (i.e., BER) calculated from the results of simulations. As shown in FIG. 11, it is obvious that the exchange which performs re-encoding-and-composing processing at BER= $10^{-3}$ [see arrow C shown in FIG. 11; Site Div (proposed)] produces a gain greater than that produced by the exchange which makes a selection from the output signals [see arrow B shown in FIG. 11; Site Div (selected)].

Figure 12:
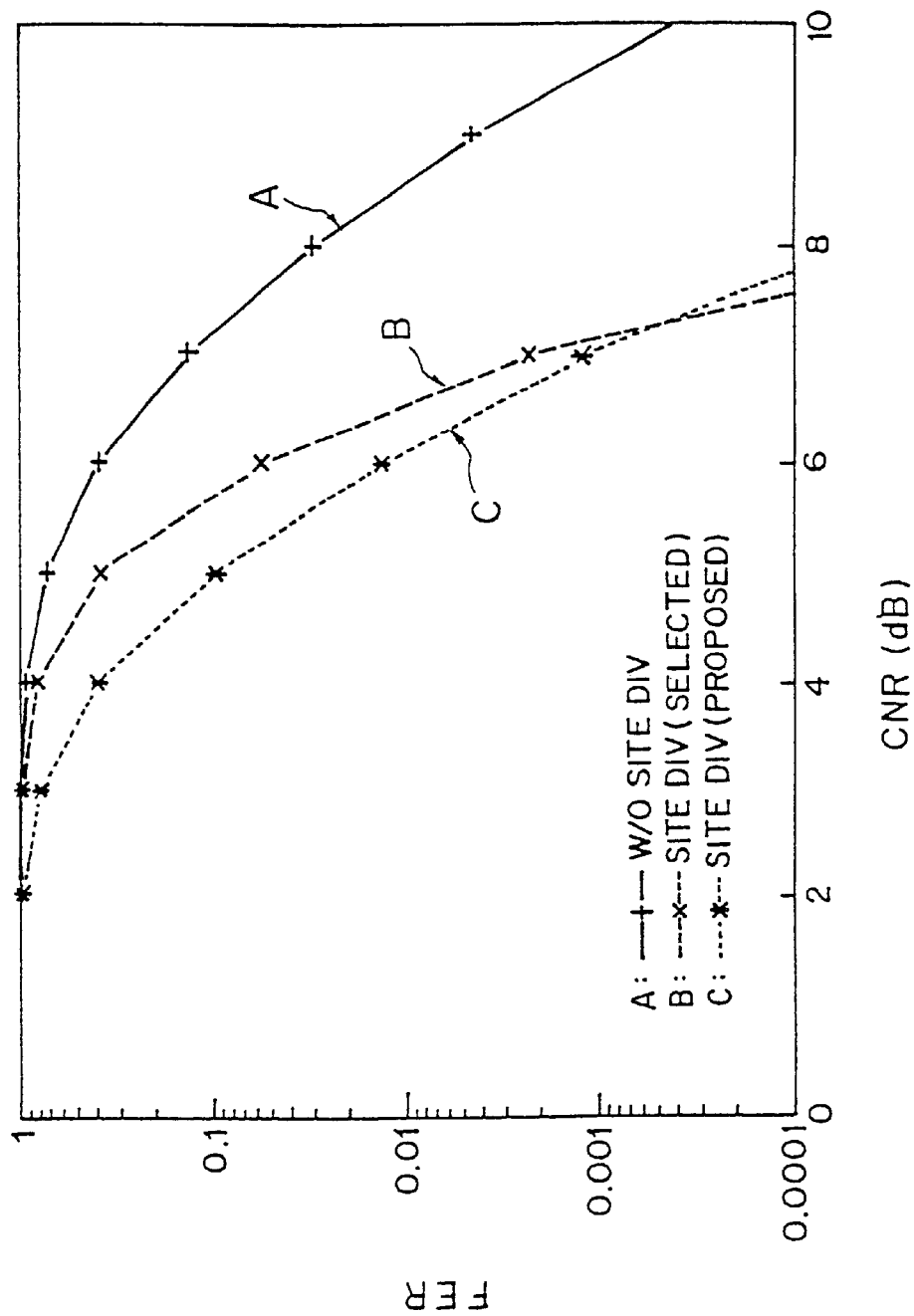
FIG. 12 is a plot showing one example of the simulation performed in the first embodiment of the present invention.

As shown in FIG. 11, the exchange that subjects the decoded signal to the re-encoding-and-composing processing accomplishes a significant improvement in bit error rate at the same gain in comparison with the exchange that does not employ the site diversity method (see arrow A shown in FIG. 11; W/O Site Div) or the exchange that makes a selection from the output signals. FIG. 12 shows the characteristics of the frame error rate (FER). Even in the case of the frame error rate shown in FIG. 12, the exchange that subjects the decoded signal to the re-encoding-and-composing processing has accomplished the most effective improvement in the characteristics of the frame error rate.

As described above, according to the first embodiment of the present invention, since the signals convolution-decoded by the base stations 2-1 to 2-3 can be subjected to re-encoding-and-composing processing within the exchange 3, the error rate can be improved without increasing the amount of signal data flowing between the base stations 2-1 to 2-3 and the exchange 3, through use of the site diversity method, thereby resulting in a considerable improvement in the transmission processing capability of the mobile communications system.

Further, according to the first embodiment, the composite device 35 can also perform soft determination processing, and hence the convolution decoder 36 can subject the decoded signals to convolution decoding processing that utilizes the result of soft determination. The reliability of the composed signal can be improved, enabling an improvement in the quality of a signal.

(b) Description of a Second Embodiment

Figure 13:
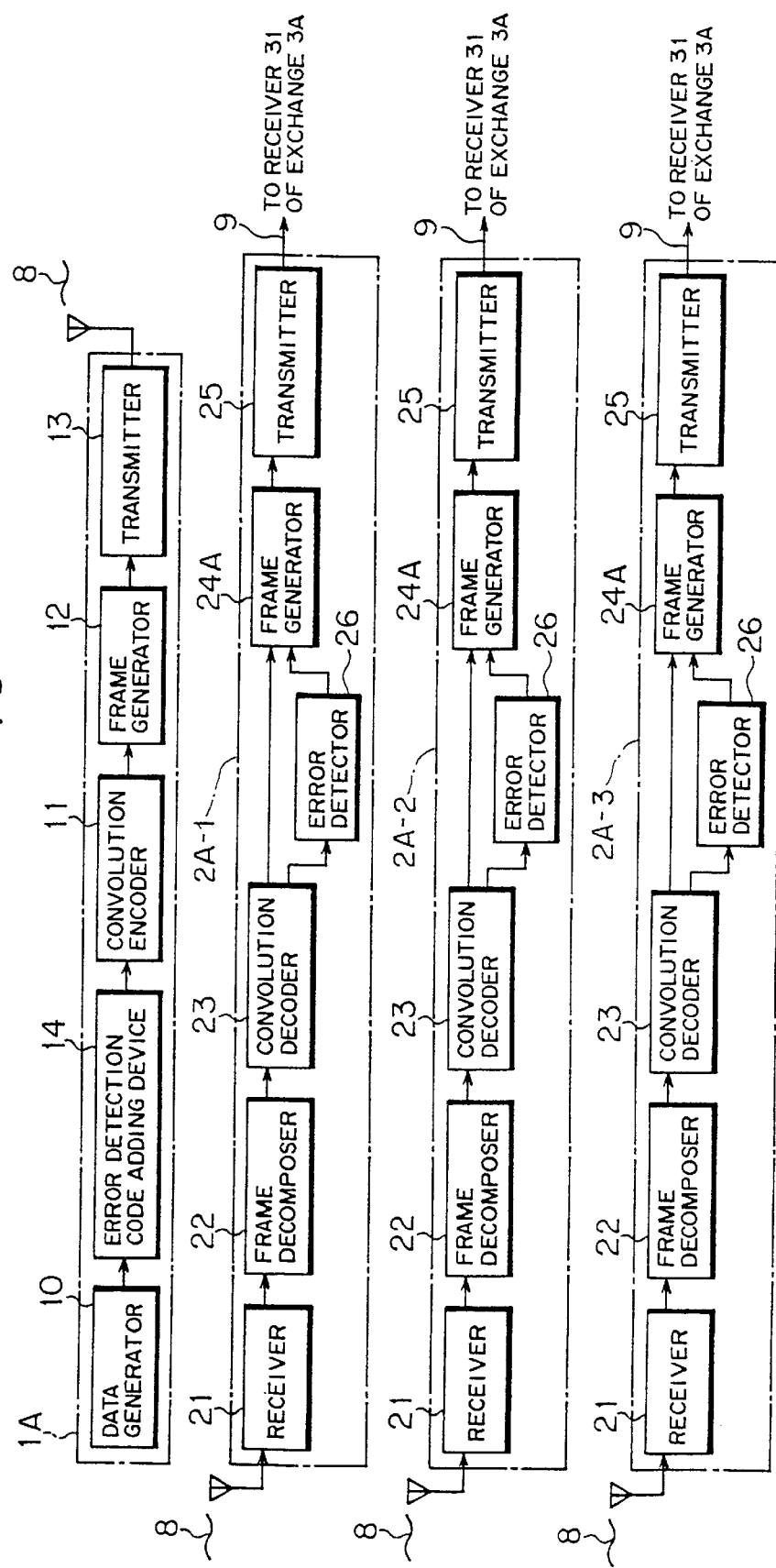
FIG. 13 is a block diagram showing the configuration of a mobile terminal and a plurality of base stations of a mobile communications system according to a second embodiment of the present invention.
Figure 14:
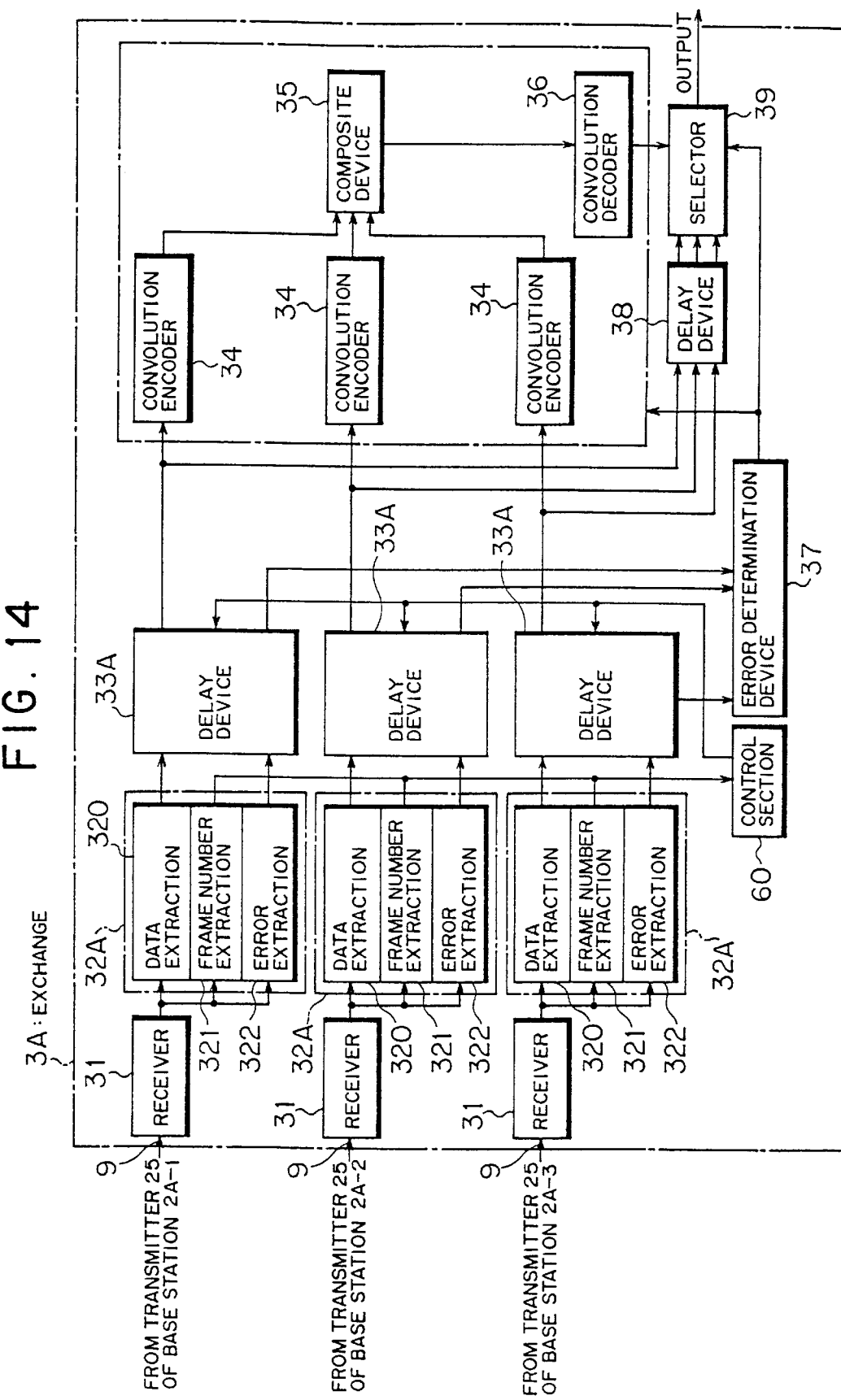
FIG. 14 is a block diagram showing the configuration of an exchange used in the mobile communications system employing a site diversity receiving method according to the second embodiment of the present invention.

FIG. 13 is a block diagram showing the configuration of a mobile terminal station and a plurality of base stations of a mobile communications system according to a second embodiment, and FIG. 14 is a block diagram showing the configuration of an exchange of the mobile communications system which adopts the site diversity receiving method according to the second embodiment. As shown FIGS. 13 and 14, the mobile communications system according to the second embodiment comprises a terminal station 1A, three base stations 2A-1 to 2A-3 (see FIG. 13), and an exchange 3A (see FIG. 14).

In FIGS. 13 and 14, the same reference numerals are assigned to the elements which correspond to those used in the first embodiment, and therefore their detailed descriptions will be omitted here for clarity. The same applies to other embodiments, which will be described in detail hereinbelow, and hence explanations of those elements assigned the same reference numerals will be omitted here for clarity.

The terminal station 1A has substantially the same configuration as that of the terminal station 1 in the foregoing first embodiment shown in FIG. 2. In the second embodiment, the terminal station 1A has an error detection code adding device 14 interposed between the data generator 10 and the convolution encoder 11, as well as the configuration shown in FIG. 2.

The error detection code adding device 14 is intended to add to the data produced by the data generator 10 information which allows each of the base stations 2A-1 to 2A-3 to detect whether or not errors are included in the data produced by the data generator 10 of the terminal station 1A (i.e., information used for the purpose of detecting errors). In the subsequent stage, the convolution encoder 11 subjects to convolution encoding processing the data having error detection code added.

Each of the base stations 2A-1 to 2A-3 shown in FIG. 13 comprises a receiver 21, a frame decomposer 22, a convolution decoder 23, a frame generator 24A, a transmitter 25, and an error detector 26. In short, each of the base stations 2A-1 to 2A-3 shown in FIG. 2 is additionally provided with an error detector 26 which is in parallel with the line between the convolution decoder 23 and the frame generator 24 and which receives the output from the convolution decoder 23.

The error detector 26 is intended to detect (judge) error presence/absence information as to whether or not the signal transmitted from the terminal station 1A includes an error, on the basis of the error detection information added to the terminal station 1A. To this end, the frame generator 24A inserts into the frame format designated beforehand in agreement with the exchange 3A the convolution-decoded signal produced by the convolution decoder 23 and the error presence/absence information obtained by the error detector 26. In this case, a frame number is simultaneously assigned to the decoded data.

As described above, the signal sent from the terminal station 1A is received by the base stations 2A-1 to 2A-3 via the wireless line 8, and is subjected to convolution decoding processing performed by the convolution decoder 23 and then to error detection performed by the error detector 26. The base stations 2A-1 to 2A-3 send the signal subjected to the convolution decoding processing and the error presence/absence information to the exchange 3A via the wire circuit 9.

The exchange 3A according to the present embodiment is configured so as to receive the signals convolution-decoded by the base stations 2A-1 to 2A-3, as well as the error presence/absence information obtained as a result of detection of errors by the base stations 2A-1 to 2A-3.

More specifically, as shown in FIG. 14, the exchange 3A comprises receivers 31, frame decomposers 32A, delay devices 33A, convolution encoders 34, a composite device 35, a convolution decoder 36, an error determinant device 37, a delay device 38, a selector 39, and a control section 60.

The frame decomposer 32A extracts the decoded data from the frame format received by the receiver 31. The frame decomposer 32A has an error extraction section 322, along with a data extraction section 320 and a frame number extraction section 321. The error extraction section 322 extracts the error presence/absence information sent from the base stations 2A-1 to 2A-3. In the present embodiment, the delay device 33A receives the data output from the data extraction section 320 and the error detection information.

The delay device 33A corrects a delay in the signal received from each of the base stations 2A-1 to 2A-3, by delaying the decoded data received from the data extraction section 320 for a given period of time so that the decoded data to be sent to each convolution encoder 34 is assigned the same frame number. The delay time of each delay device 33A is controlled by a control section 60 on the basis of the frame number.

Upon receipt of the error presence/absence information from each of the base stations 2A-1 to 2A-3, the error determination device (or an error determination section) 37 performs error determination operation. The delay device 38 delays for a given period of time the convolution-decoded signals,—which are received from the respective base stations 2A-1 to 2A-3 and are output from the delay devices 33A.

The selector (i.e., a gate section) 39 outputs the signal output from the convolution decoder 36 as a received signal in a case where the error determination device 37 judges that the error presence information is sent from all of the base stations 2A-1 to 2A-3. More specifically, in a case where the error determination device 37 judges that the error presence information is sent from all of the base stations 2A-1 to 2A-3, the selector 39 selects an output from the convolution decoder 36. In contrast, in a case where the error determination device 37 judges that the error presence information is not sent from all of the base stations 2A-1 to 2A-3, the selector 39 functions as a selection section which selects the convolution-decoded signals from the base stations 2A-1 to 2A-3.

More specifically, on the basis of the output (i.e., the result of error determination) from the error determination device 37, the selector 39 selects either the convolution-decoded signals output from the base stations 2A-1 to 2A-3 or the convolution-decoded signal output from the convolution decoder 36. Accordingly, the decoded signals are subjected to re-encoding/composing processing only when errors are detected from all of the base stations 2A-1 to 2A-3.

In short, in the mobile communications system according to the second embodiment, the exchange 3A is designed so as to be able to perform processing corresponding to the result of error detection performed on the data by addition of the error presence/absence information to the signal transmitted from the terminal station 1A. Accordingly, data having few errors can be selected, which in turn makes it possible to improve the quality of the data output from the exchange 3A.

In a case where it is determined from the result of error detection result received from each of the base stations 2A-1 to 2A-3 that the error presence information is sent from all the base stations 2A-1 to 2A-3, the exchange 3A subjects the signals output from the respective base stations 2A-1 to 2A-3 to convolution encoding processing and, subsequently, to composing processing, whereby the signals output from the base stations 2A-1 to 2A-3 are convolution-decoded.

As shown in FIG. 13, in the mobile communications system employing the site diversity receiving method according to the second embodiment of the present invention with the foregoing configuration, the data generator 10 of the terminal station 1A outputs data, and the data are subjected to convolution encoding processing, whereby the data are provided with information (i.e., information used for the purpose of error detection) which enables the base stations 2A-1 to 2A-3 to determine whether or not the data include errors.

Subsequently, after the frame generator 12 inserts the convolution-encoded data into a predetermined frame format, the transmitter 13 sends the data to the base stations 2A-1 to 2A-3 via the wireless line 8.

In each of the base stations 2A-1 to 2A-3, the receiver 21 receives the format from the terminal stations 1A, and the frame decomposer 22 extracts the encoded data from the frame format. The extracted data are convolution-decoded by the convolution decoder 23.

At this time, the error detector 26 detects the error presence/absence information on the basis of the error detection information added to the encoded data by the terminal station 1A. The frame generator 24A inserts the convolution-decoded signal and the error presence/absence information into the frame format designated beforehand in agreement with the exchange 3A. The thus-inserted signal and information are sent to the exchange 3A by the transmitter 25.

As shown in FIG. 14, upon receipt of the decoded data from each of the base stations 2A-1 to 2A-3, the receiver 31 of the exchange 3A receives the decoded data. The frame decomposer 32A carries out the extraction of the encoded data, the detection of the error presence/absence information, and the extraction of the frame number. The delay device 33A corrects a delay in the signal of each set of decoded data, through use of the frame number.

At this time, the error presence/absence information extracted by the error extraction section 322 is sent to the error determination device 37. In a case where the error determination device 37 determines that error information is sent from all the base stations 2A-1 to 2A-3, the error determination device 37 sends the output from the delay device 33A to the convolution encoder 34.

The convolution encoder 34 subjects each set of encoded data to convolution encoding processing again. The composite device 35 subjects the convolution-encoded signal to composing processing, and the convolution decoder 36 subjects the composed data to the convolution-decoding processing again. The thus-processed data are output from the selector 39.

In contrast, in a case where the error determination device 37 determines that the error information is not sent from all of the base stations 2A-1 to 2A-3; i.e., in a case where an error absence signal is sent from any one of the base stations 2A-1 to 2A-3, an output from the delay device 33A is sent to the delay device 38 and is output via the selector 39.

As mentioned previously, the second embodiment yields the same advantageous result as that yielded by the first embodiment, by addition of error presence/absence information to the transmission signal from the terminal station 1A, and enables execution of processing according to the state of error-detection of data. Accordingly, data having fewer errors can be selected. Even in this case, there is a contribution to an improvement in the transmission processing of the mobile communications system.

(c) Description of a Third Embodiment

Figure 15:
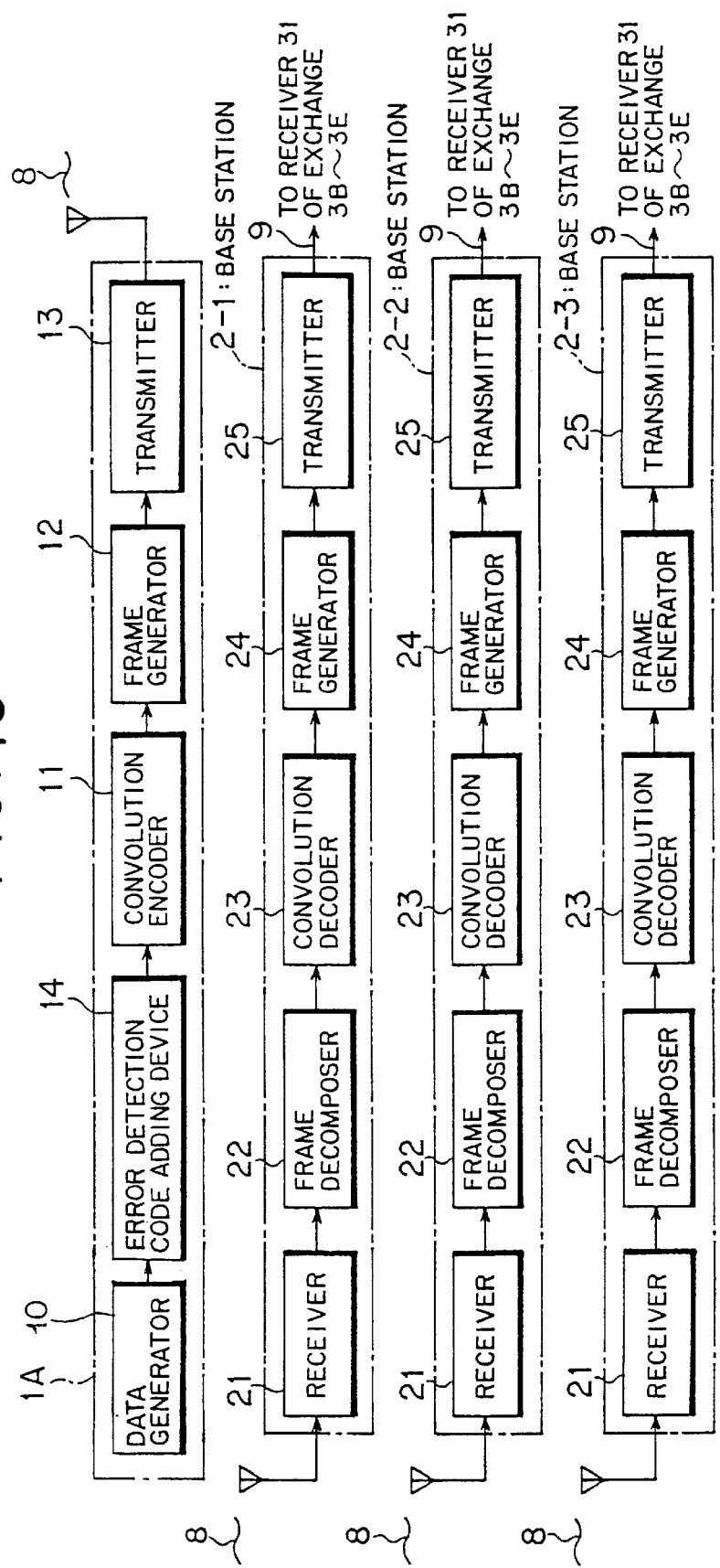
FIG. 15 is a block diagram showing the configuration of a mobile terminal and a plurality of base stations of a mobile communications system according to a third embodiment of the present invention.
Figure 16:
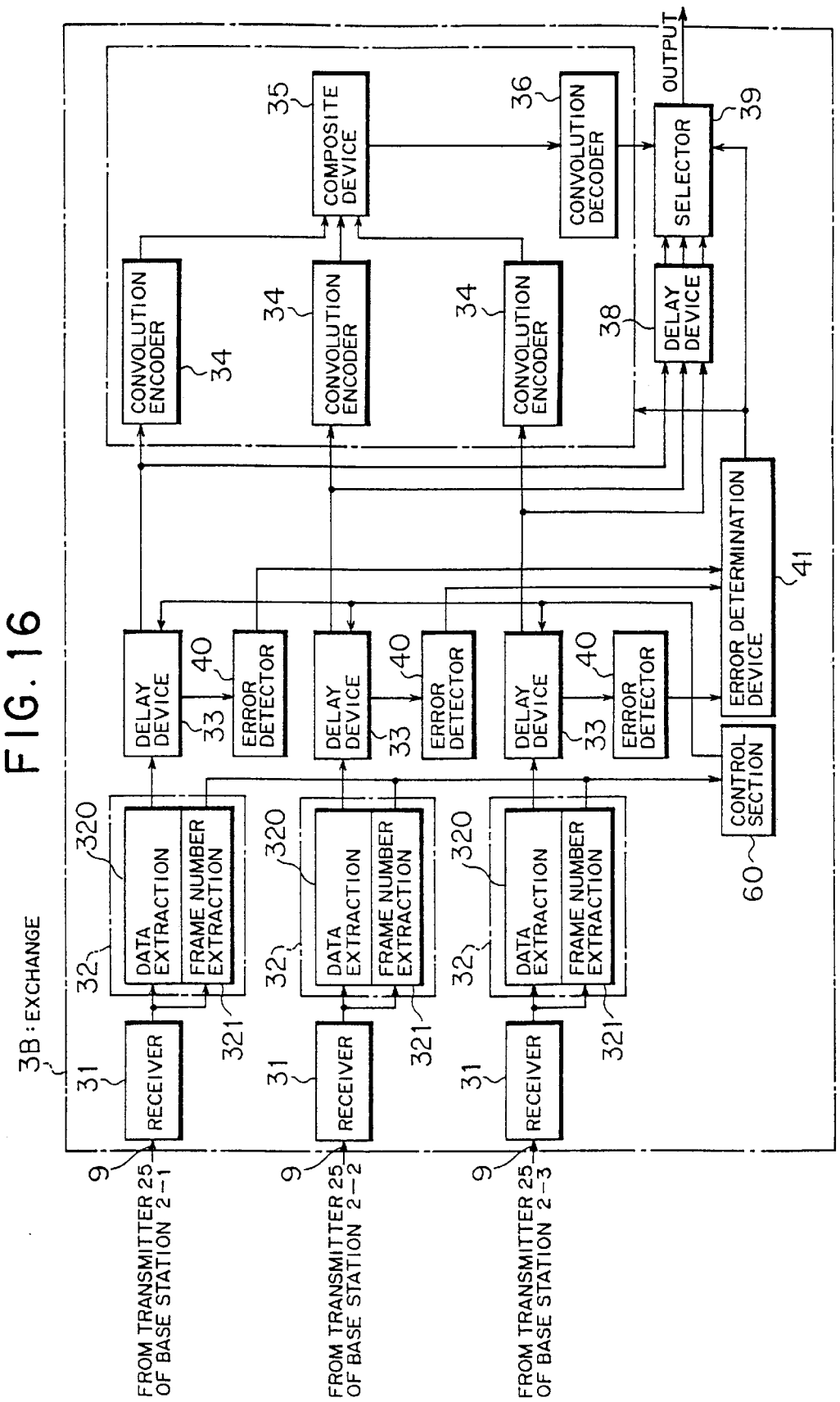
FIG. 16 is a block diagram showing the configuration of an exchange used in the mobile communications system employing a site diversity receiving method according to the third embodiment of the present invention.

FIG. 15 is a block diagram showing the configuration of a mobile terminal station and a plurality of base stations of a mobile communications system according to a third embodiment of the present invention. FIG. 16 is a block diagram illustrating the configuration of an exchange of the mobile communications system that adopts a site diversity receiving method according to the third embodiment. As shown in FIGS. 15 and 16, the mobile communications system according to the third embodiment comprises the terminal station 1A, three base stations 2-1 to 2-3 (see FIG. 15), and the exchange 3B (see FIG. 16). The terminal station 1A shown in FIG. 15 is identical to that of the second embodiment, and the base stations 2-1 to 2-3 are identical to those of the first embodiment. Hence, their detailed descriptions will be omitted here for clarity.

Further, the convolution-encoded signal transmitted from the mobile terminal station 1A is subjected to convolution-decoding processing performed by each of the plurality of base stations 2-1 to 2-3. These convolution-decoded signals are received by the exchange 3B shown in FIG. 16, as they are received by the foregoing exchange 3 (see FIG. 3). The exchange 3B comprises a receiver 31, a frame decomposer 32, a delay device 33, a convolution encoder 34, a composite device 35, a convolution decoder 36, a delay device 38, a selector 39, an error detector 40, an error determination device 41, and a control section 60.

The error detector 40 and the error determination device 41 shown in FIG. 16 are designed in substantially the same manner as are the error detector 26 (see FIG. 13) and the error determination device 37 (see FIG. 14).

In short, the error detector (i.e., an error detecting section) 40 detects an error in the convolution-decoded signal output from each of the base stations 2-1 to 2-3. In the second embodiment, the error detection performed by the base stations 2A-1 to 2A-3 (see FIG. 13) is performed only by the exchange 3B in the third embodiment.

Consequently, in addition to errors in the wireless line 8 established between the terminal station 1A and the base stations 2-1 to 2-3, the exchange 3B in the third embodiment can detect an error in the wire circuit (wired line) 9 provided between the base stations 2-1 to 2-3 and the exchange 3B by means of the error detector 40 provided in the stage subsequent to the delay device 33. The error determination device (i.e., an error determination section) 41 performs an error determination operation when receiving error presence/absence information from the error detector 40.

In short, in the third embodiment, the exchange 3B detects an error in the signal received from each of the base stations 2-1 to 2-3. If it is judged from the result of error detection that error presence information is transmitted from all of the base stations 2-1 to 2-3, the signals received from the base stations 2-1 to 2-3 are subjected to convolution encoding processing. The thus-convolution-encoded signals are composed into one signal, and the signal is then subjected to convolution decoding processing.

With the foregoing configuration, in the mobile communications system according to the third embodiment, when the data subjected to required processing performed by the terminal station 1A and the base stations 2-1 to 2-n are input to the exchange 3B in the manner as shown in FIG. 15, the receiver 31 in the exchange 3B receives the data in the manner as shown in FIG. 16. Further, the frame decomposer 32 extracts the data, and the delay device 33 corrects a delay in the signal, through use of the frame number.

Subsequently, on the basis of the output from the delay device 33, the error detector 40 detects errors in the convolution-decoded signals received from the base stations 2-1 to 2-3 and outputs error presence/absence information to the error determination device 41.

In a case where the error determination device 41 judges that error presence information is transmitted from all the base stations 2-1 to 2-3, the output received from the delay device 33 is sent to the convolution encoder 34, where input data are subjected to convolution encoding processing. Subsequently, the composite device 35 composes the convolution-encoded signals into one signal, and the convolution decoder 36 subjects the composed signal to convolution decoding processing. The convolution-decoded signal is output from the exchange 3B via the selector 39.

In contrast, if the error determination device 41 judges that the error presence information is not sent from all of the base stations 2-1 to 2-3; namely, in a case where an error-free signal is transmitted from any one of the base stations 2-1 to 2-3, the output received from the delay device 33 is output to the delay device 38. The signal is further output from the exchange 3B via the selector 39.

As mentioned previously, according to the third embodiment, there are obtained advantageous results similar to those obtained in the first embodiment. In addition, since the exchange 3B can detect (or determine) errors in the input data, there can be detected an error in the wire circuit (wired line) 9 provided between the base stations 2-1 to 2-3 and the exchange 3B, as well as an error in the wireless line 8 established between the terminal station 1A and the base stations 2-1 to 2-3. Therefore, the exchange 3B can output a more accurate signal. Thus, the third embodiment has the advantage of the exchange 3B being able to improve the quality of a received signal.

(d) Description of a Fourth Embodiment

Figure 17:
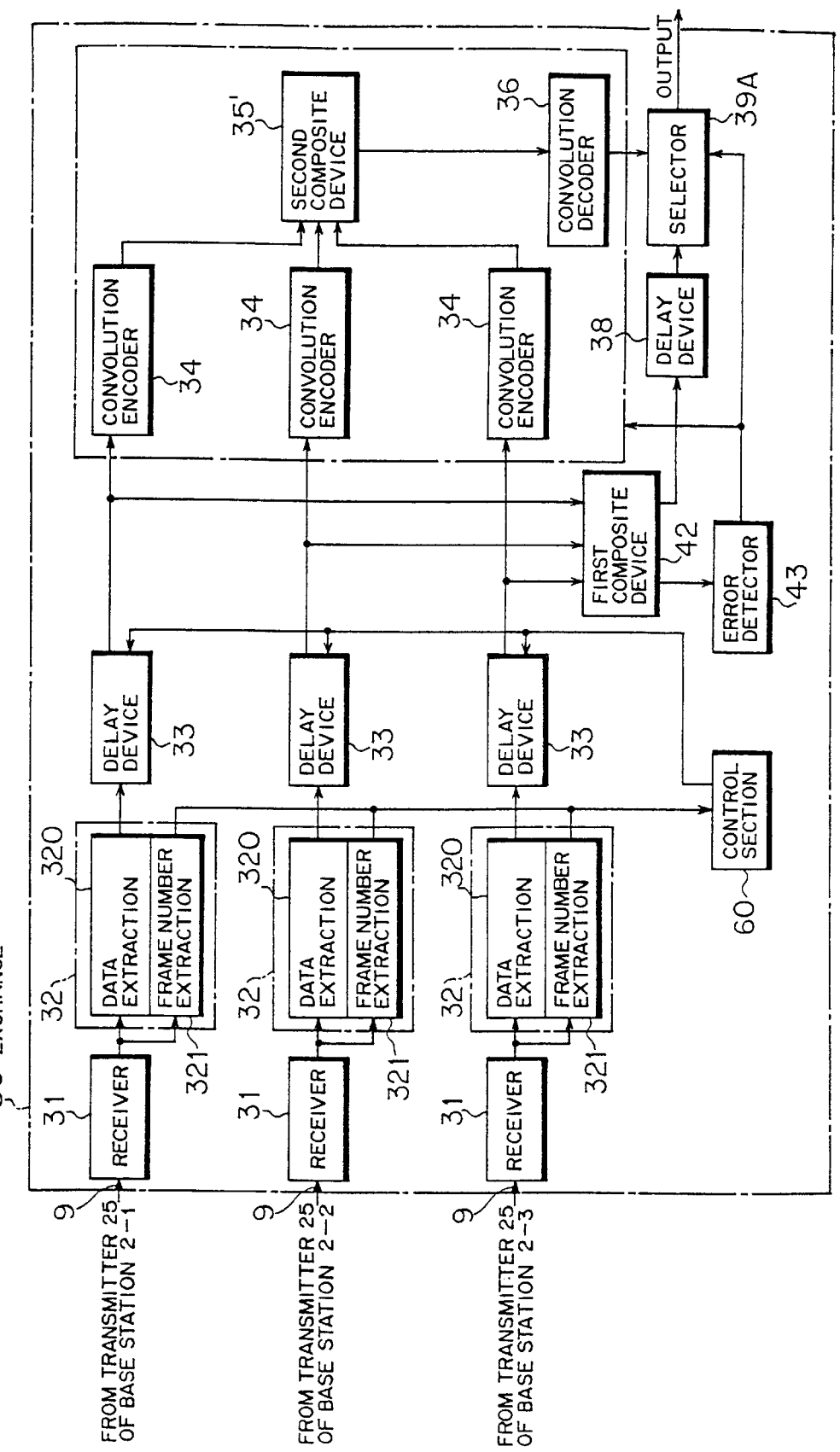
FIG. 17 is a block diagram showing the configuration of an exchange used in a mobile communications system employing a site diversity receiving method according to a fourth embodiment of the present invention.

FIG. 17 is a block diagram showing the configuration of an exchange used in a mobile communications system according to a fourth embodiment of the present invention. An exchange 3C shown in FIG. 17 is arranged so as to receive the data processed by the terminal station 1A and the base stations 2-1 to 2-3 shown in FIG. 15.

The convolution-encoded signal transmitted from the mobile terminal station 1A is subjected to convolution-decoding processing performed by each of the plurality of base stations 2-1 to 2-3. These convolution-decoded signals are received by the exchange 3C shown in FIG. 17, as they are received by the foregoing exchange 3B (see FIG. 16). The exchange 3C comprises the receivers 31, the frame decomposers 32, the delay devices 33, the convolution encoders 34, a second composite device 35', the convolution decoder 36, the delay device 38, a selector 39A, a first composite device 42, an error detector 43, and the control section 60. In short, the exchange according to the fourth embodiment is arranged so as to have the error detector 43 connected to a stage subsequent to the delay device 33 via the first composite device 42.

The composite device (i.e., the first composing section) 42 composes into one signal the convolution-decoded signals which are output from the base stations 2-1 to 2-3 via the respective delay devices 33. The error detector (i.e., error detecting section) 43 detects an error in the signal composed by the first composite device 42. The second composite device 35' functions in the same manner as does the foregoing composite device 35.

More specifically, the error detector 43 according to the fourth embodiment is not provided so as to correspond to each of the base stations 2-1 to 2-3, as is the error detector 40 (see FIG. 16). The error detector 43 detects an error in the signal into which the data signals output from the base stations 2-1 to 2-3 are composed by the first composite device 42. As a result, since it is not necessary to provide the error detector 43 for each of the base stations 2-1 to 2-3, the circuit configuration of the exchange can be simplified.

The selector 39A is intended to output the signal output from the convolution decoder 36 as a received signal output when the error detector 43 detects an error in the composed signal. More specifically, in a case where the error detector 43 detects an error in the composed signal, the selector 39A selects the signal output from the convolution decoder 36. In contrast, in a case where the error detector 43 does not detect any error in the composed signal, the selector 39A selects the composed signal output from the first composite device 42.

In short, on the basis of the error presence information received from the error detector 43, the selector 39A selects either the signal—into which the convolution-decoded signals output from the base stations 2-1 to 2-3 are composed by the first composite device 42—or the convolution-decoded signal output from the convolution decoder 36.

In the fourth embodiment, since there is selected the result of composing of the convolution-decoded signals output from the base stations 2-1 to 2-3 being composed by the first composite device 42 or the signal output from the convolution decoder 36, a signal having superior quality can be obtained.

As shown in FIG. 17, in the exchange 3C used in the mobile communications system that employs the site diversity receiving method according to the fourth embodiment, when the data signals are received from the base stations 2-1 to 2-3, the receiver 31 receives these data signals. The frame decomposer 32 extracts data from the signals. Further, the delay device 33 corrects a delay in the signal through use of the frame number.

Subsequently, the first composite device 42 composes into one signal the signals output from the delay devices 33, and the error detector 43 corrects an error in the composed signal. In a case where the error detector 43 detects an error in the composed signal, the selector 39A selects the signal output from the convolution decoder 36. In contrast, if the error detector 43 does not detect any error in the composed signal, the signals output from the delay devices 38 (i.e., the composed signal output from the composite device 42) are selected and output.

As mentioned previously, the fourth embodiment yields advantageous results similar to those yielded by the first embodiment. The error detector 43 of the exchange 3C collectively detects an error in the data into which the signals output from the base stations 2-1 to 2-3 are composed, whereby a signal having superior quality can be obtained. Since the received data can be processed according to the state of detection of errors in the data, data having fewer errors can be selected. Even in this case, the transmission processing performed in the mobile communications system can be improved.

Further, there is no need to provide the error detector 43 for each of the base stations 2-1 to 2-3, and the error detector 43 can be shared between the base stations 2-1 to 2-3, thereby miniaturizing the circuit configuration of the exchange 3C. Accordingly, the costs required for the error detector can be reduced, which in turn contributes to cutting of the cost of the overall mobile communications system.

(e) Description of a Fifth Embodiment

Figure 18:
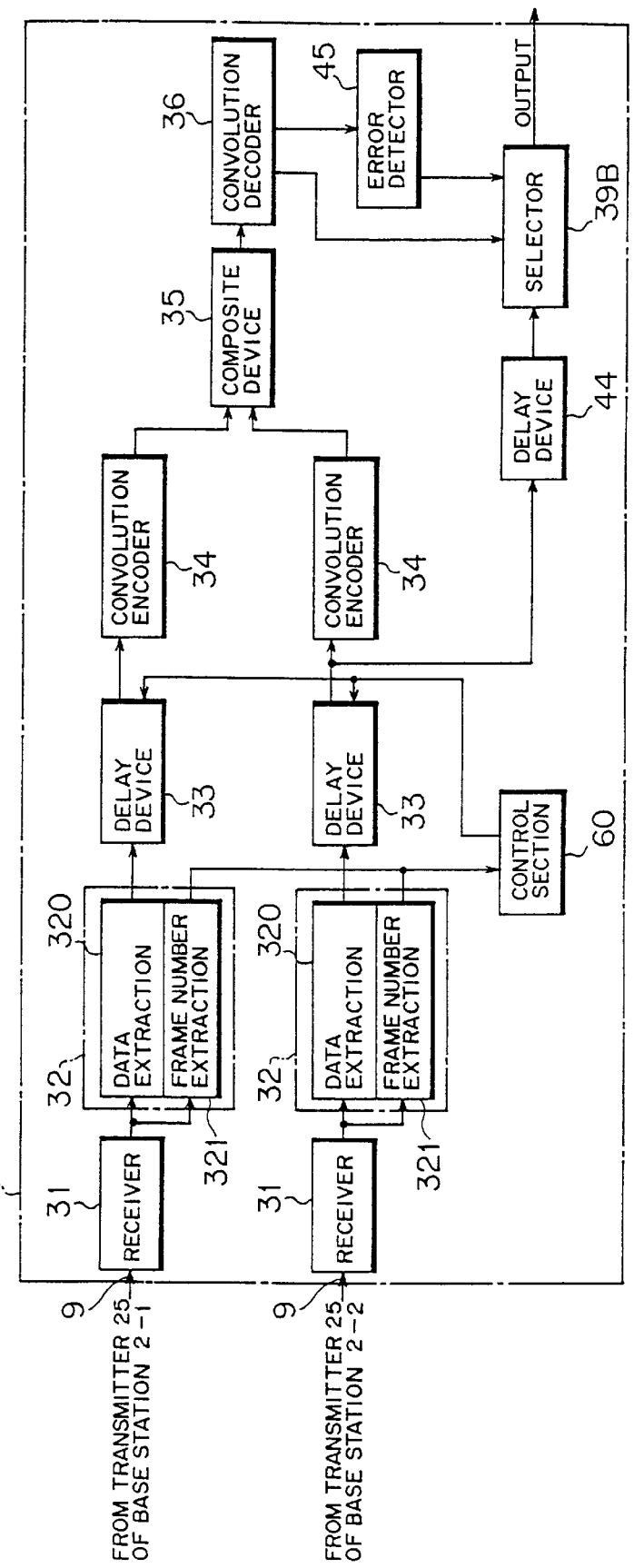
FIG. 18 is a block diagram showing the configuration of an exchange used in a mobile communications system employing a site diversity receiving method according to a fifth embodiment of the present invention.

FIG. 18 is a block diagram showing the configuration of an exchange used in a mobile communications system according to a fifth embodiment of the present invention. An exchange 3D shown in FIG. 18 is arranged so as to receive the data processed by the terminal station 1A and the base stations 2-1 to 2-3 shown in FIG. 15. The exchange 3D is arranged so as to receive data from two base stations 2-1 and 2-2.

The convolution-encoded signal transmitted from the mobile terminal station 1A is subjected to convolution-decoding processing performed by each of the plurality of base stations 2-1 and 2-2. These convolution-decoded signals are received by the exchange 3D, as they are received by the foregoing exchange 3B (see FIG. 16). The exchange 3D comprises the receivers 31, the frame decomposers 32, the delay devices 33, the convolution encoders 34, the composite device 35, the convolution decoder 36, a selector 39B, a delay device 44, an error detector 45, and the control section 60.

In the exchange 3B according to the third embodiment shown in FIG. 16, the error detecting section 40 which detects an error in a signal is provided on a stage prior to the convolution encoder 34 (i.e., an error detection processing is performed before a re-encoding-and-composing processing is performed). In the exchange 3D according to the fifth embodiment, the error detector 45 is provided a stage subsequent to the convolution decoder 36 (i.e., the signal subjected to re-encoding-and-composing processing is subjected to error detection).

In a case where the error detector 45 does not detect any error in a convolution-decoded signal, the selector 39B outputs the signal received from the convolution decoder 36 as a received signal. More specifically, the error detector 45 does not detect any error in the convolution-decoded signal, the selector 39B selects a signal output from the convolution decoder 36. In contrast, if the error detector 45 detects an error in the convolution-decoded signal, the selector 39B selects a convolution-decoded signal output from any one of the base stations 2-1 and 2-2.

In short, if there is an error in the convolution-decoded signal produced by subjecting the data signals received from the base stations 2-1 and 2-2 to re-encoding-and composing processing, the selector 39B selects and outputs any one of the data signals (or both of the data signals) output from the base stations 2-1 and 2-2. In the exchange 3D shown in FIG. 18, the signal received from the base station 2-2 is selected. The delay device 44 delays the signal received from the base station 2-2 for a given period of time.

As mentioned previously, in the exchange 3D, the signals received from the base stations 2-1 and 2-2 are subjected to convolution-encoding processing. The thus convolution-encoded signals are composed into one signal, and the thus-composed signal is subjected to convolution-decoding processing. The convolution-decoded signal is subjected to error detection. If no errors are found in the convolution-decoded signal, this signal is output as a received signal.

In the exchange 3D employed in the mobile communications system according to the fifth embodiment of the present invention, when the data are received from the base stations 2-1 and 2-2, the receiver 31 receives the data, and the frame decomposer 32 extracts the data. The delay device 33 corrects a delay in each of the data signals through use of a frame number.

Subsequently, the convolution encoder 34 encodes the data to convolution encoding processing, and the convolution-encoded signals are composed into one signal by the composite device 35. The thus-composed signal is subjected to convolution decoding processing by the convolution decoder 36. In the error detector 45, the convolution-decoded signal is subjected to error detection processing.

If the error detector 45 does not detect any error, the signal output from the convolution decoder 36 is output as a received signal from the selector 39B. In contrast, if the error detector 45 detects an error in the signal, the convolution-decoded signal output from the base station 2-2 is output from the selector 39B.

As mentioned previously, the fifth embodiment yields advantageous results similar to those yielded by the first embodiment. The error detector 45 of the exchange 3D detects an error in the convolution-decoded signal output from the convolution decoder 36, whereby an error in a data signal having an improved error rate can be detected. Even in this case, there is no need to provide the error detector 45 for each of the base stations, and the error detector 45 can be shared between the base stations, thereby reducing the costs required for the error detector and contributing to cutting of the cost of the overall mobile communications system.

(f) Description of a Sixth Embodiment

Figure 19:
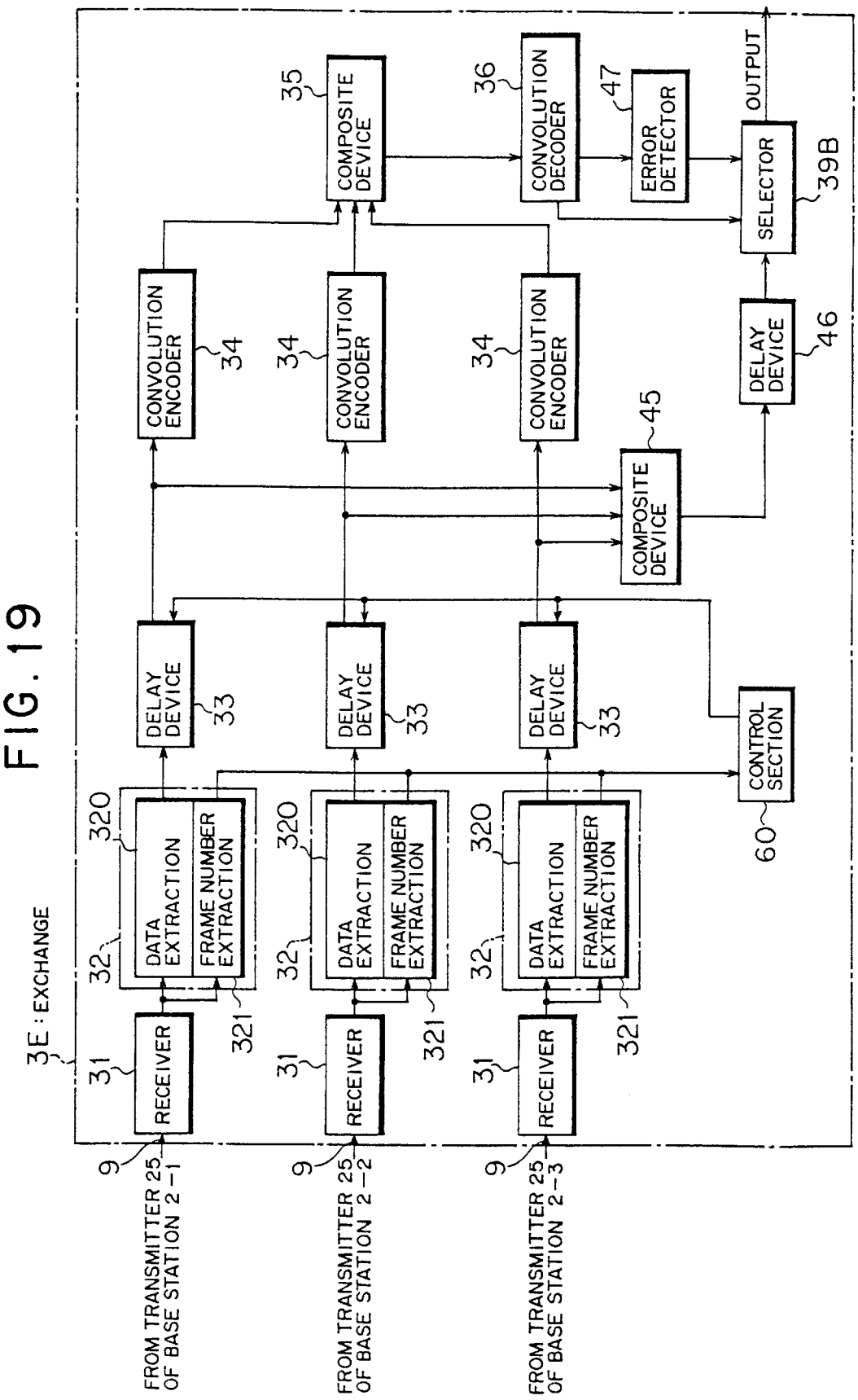
FIG. 19 is a block diagram showing the configuration of an exchange used in a mobile communications system employing a site diversity receiving method according to a sixth embodiment of the present invention.

FIG. 19 is a block diagram showing the configuration of an exchange used in a mobile communications system according to a sixth embodiment of the present invention. An exchange 3E shown in FIG. 19 is arranged so as to receive the data processed by the terminal station 1A and the base stations 2-1 to 2-3 shown in FIG. 15.

In the fifth embodiment shown in FIG. 18, the delay device 44 is provided so as to receive a signal output from any one of the base stations (e.g., the base station 2-2 shown in FIG. 18). In contrast, in a sixth embodiment shown in FIG. 19, the composite device 45 composes into one signal the convolution-decoded signals received from all of the base stations 2-1 to 2-3, and a delay device 46 provided in the exchange 3E receives the thus-composed signal output from the composite device 45.

In this case, if an error detector 47 detects an error in the convolution-decoded signal, the signal data received from the base stations 2-1 to 2-3 via the foregoing delay device 46 are selectively output from the selector 39B. In contrast, if the error detector 47 does not detect any error in the signal, the signal output from the convolution decoder 36 is selectively output from the selector 39B.

In short, the exchange 3E can select either a signal after it has been subjected to re-encoding-and-composing processing or a signal before it is subjected to re-encoding-and-composing processing by detection of an error in the signal that has been subjected to re-encoding-and-composing processing. Superior data can be output according to the result of detection of an error in the data signals received from the base stations 2-1 to 2-3.

In the exchange 3E used in the mobile communications system that employs the site diversity receiving method according to the sixth embodiment of the present invention, when the data signals are received from the base stations 2-1 to 2-3, the receiver 31 receives the data signals. The frame decomposer 32 extracts data from the signals, and the delay device 33 corrects a delay in the data signal through use of a frame number.

Subsequently, the convolution encoder 34 subjects the data signal to convolution encoding processing, and the convolution-encoded signals are composed into one signal by the composite device 35. The composed signal is subjected to convolution decoding processing by the convolution decoder 36, and the error detector 47 detects an error in the convolution-decoded signal.

If the error detector 47 does not detect any error in the signal, the signal output from the convolution decoder 36 is output as a received signal from the selector 39B. In contrast, if the error detector 47 detects an error in the signal, the signal—into which the convolution-decoded signals received from the base stations 2-1 to 2-3 are composed—is output as a received signal from the selector 39B.

As mentioned previously, according to the sixth embodiment of the present invention, the error detector 47 of the exchange 3E detects an error in the convolution-decoded signal output from the convolution decoder 36, and hence advantageous results similar to those yielded in the fifth embodiment can be yielded. Further, the composite device 45 composes into one signal the convolution-decoded signals received from the base stations 2-1 to 2-3, and hence the sixth embodiment has the advantage of being able to output the data improved further than the data produced by use of the convolution-decoded signals received from any one of the base stations 2-1 to 2-3.

(g) Description of a Seventh Embodiment

Figure 20:
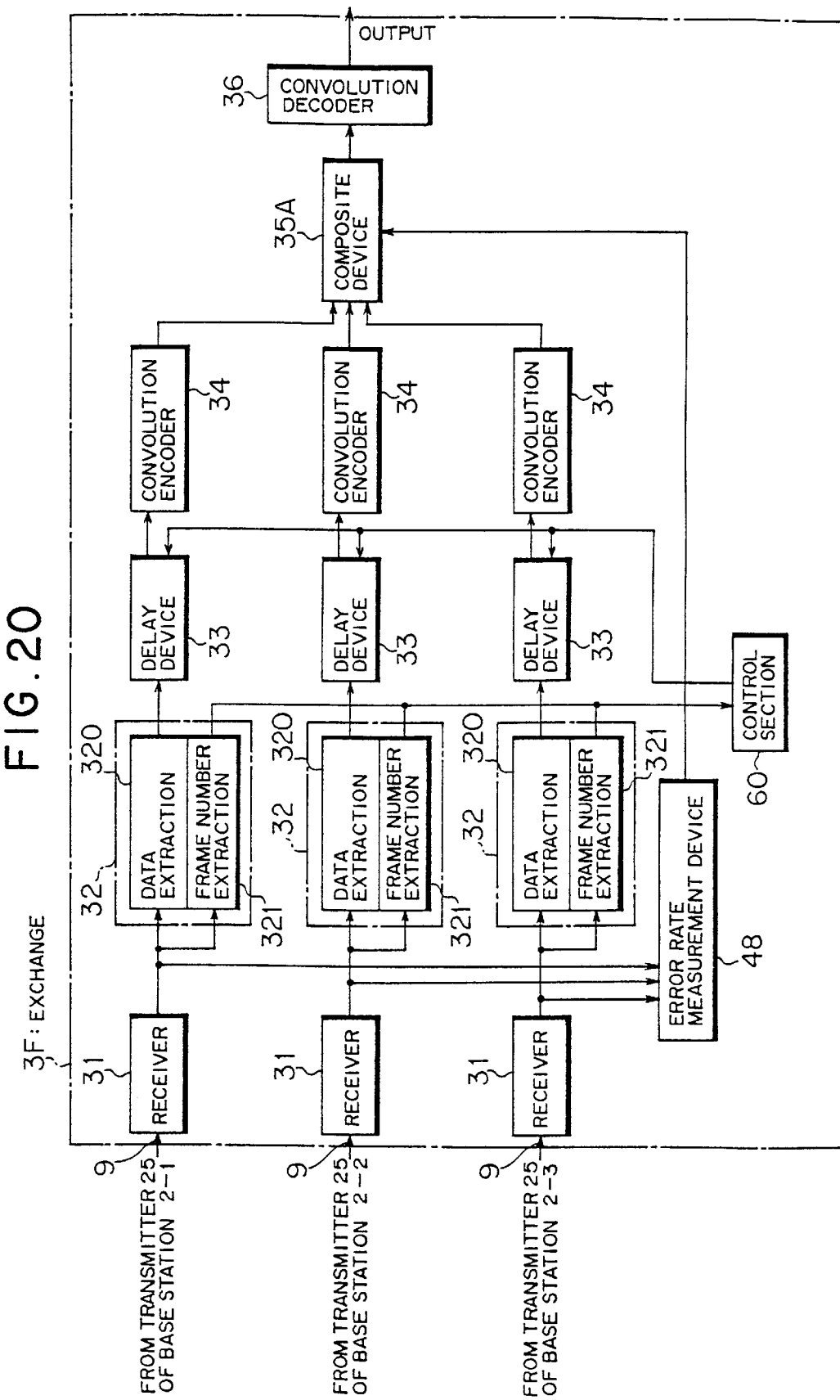
FIG. 20 is a block diagram showing the configuration of an exchange used in a mobile communications system employing a site diversity receiving method according to a seventh embodiment of the present invention.

FIG. 20 is a block diagram showing the configuration of an exchange used in a mobile communications system according to a seventh embodiment of the present invention. An exchange 3F shown in FIG. 20 is arranged so as to receive the data processed by the terminal station 1 and the base stations 2-1 to 2-3 shown in FIG. 2.

The exchange 3F is configured in substantially the same manner as is the exchange 3 (see FIG. 3) employed in the first embodiment. The exchange 3F comprises the receivers 31, the frame decomposers 32, the delay devices 33, the convolution encoders 34, a composite device 35A, the convolution decoder 36, an error rate measurement device 48, and the control section 60. In short, the exchange 3F employed in the seventh embodiment is different from that employed in the first embodiment in that the error rate measurement device 48 is connected to the output terminals of the receivers 31.

The error rate measurement device (i.e., an error rate measuring section) 48 measures an error rate of each of the convolution-decoded signals output from the base stations 2-1 to 2-3.

More specifically, bits of the signals received from the base stations 2-1 and 2-2 are compared with each other. If there is a difference in bit between the signals, an error counter is incremented by one. Further, the number of compared bits is also counted. As a result, a mean error rate between the base stations 2-1 and 2-2 is obtained by dividing the value of the error counter by the number of compared bits, and by further dividing the result of such division by 2.

Similarly, a mean error rate between the base stations 2-1 and 2-3 and a mean error rate between the base stations 2-2 and 2-3 are calculated. As a result, the error rate of the base station 2-1 can be obtained by subtraction of the mean error rate between the base stations 2-2 and 2-3 from the sum of the mean error rate between the base stations 2-1 and 2-2 and the mean error rate between the base stations 2-1 and 2-3.

Further, similarly, the error rate of the base station 2-2 can be obtained by subtraction of the mean error rate between the base stations 2-1 and 2-3 from the sum of the mean error rate between the base stations 2-1 and 2-2 and the mean error rate between the base stations 2-2 and 2-3. The error rate of the base station 2-3 can be obtained by subtraction of the mean error rate between the base stations 2-1 and 2-2 from the sum of the mean error rate between the base stations 2-1 and 2-3 and the mean error rate between the base stations 2-2 and 2-3.

The composite device (or composing section) 35A composes into one signal the convolution-encoded signals output from the convolution encoders 34 so as to reflect the error rates measured by the error rate measurement device 48. More specifically, the composite device 35A composes the signals into one signal while assigning the previously-measured error rates as weights to the signals.

The exchange 3F may be provided with a selector which selects the convolution-encoded signal output from the convolution encoder 34 in addition to the composite device 35A. In this case, the selector can selectively output only a data signal having a superior error rate.

In short, the exchange 3F is designed so as to subject the signals received from the base stations 2-1 to 2-3 to convolution encoding processing and to merge the convolution-encoded signals into one signal so as to reflect the error rates calculated from the signals received from the base stations 2-1 to 2-3. The composed signal is then subjected to convolution decoding processing.

As shown in FIG. 20, in the exchange 3F used in the mobile communications system according to the seventh embodiment of the present invention, the receiver 31 receives the data from the base stations 2-1 to 2-3, and the frame decomposer 32 extracts data from the data signals. Error rates of the data are measured, and the delay device 33 corrects a delay in the signal, through use of a frame number. The thus-corrected signal is output to the convolution encoder 34.

Subsequently, the convolution encoder 34 subjects the signal to convolution encoding processing, and the composite device 35A composes the convolution-encoded signals into one signal while weighting the convolution-encoded signals in accordance with the previously-measured error rates. The convolution decoder 36 subjects the signal output from the composite device 35A to convolution decoding processing.

In this way, the seventh embodiment yields advantageous results similar to those yielded by the first embodiment. Since the signals received from the base stations 2-1 to 2-3 can be composed into one signal while weighting the signals according to the error rates, more accurate data can be obtained. Even in this case, the performance of the mobile communications system can be improved.

(h) Description of an Eighth Embodiment

Figure 21:
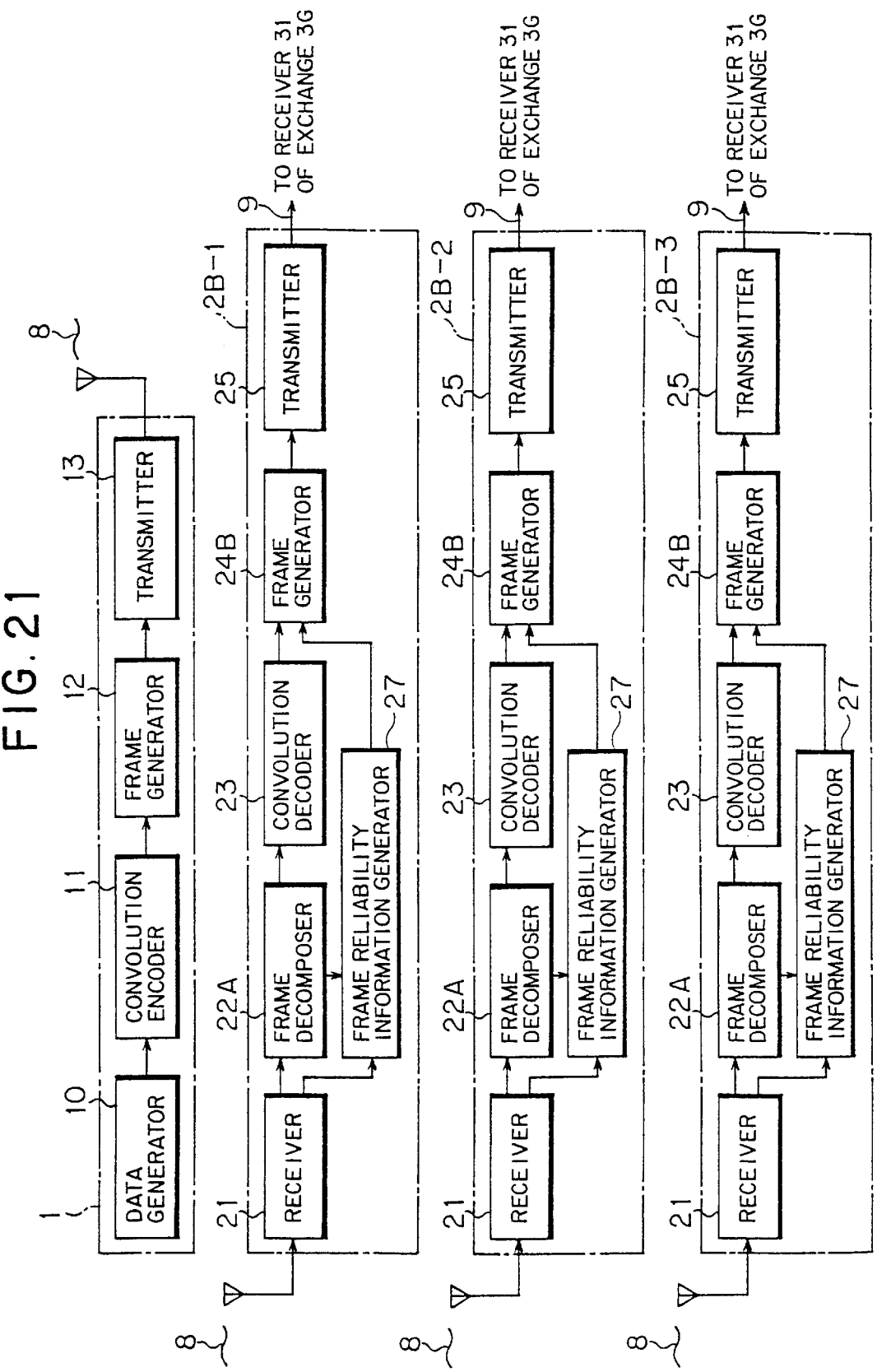
FIG. 21 is a block diagram showing the configuration of a mobile terminal and a base station of a mobile communications system employing a site diversity receiving method according to an eighth embodiment of the present invention.
Figure 22:
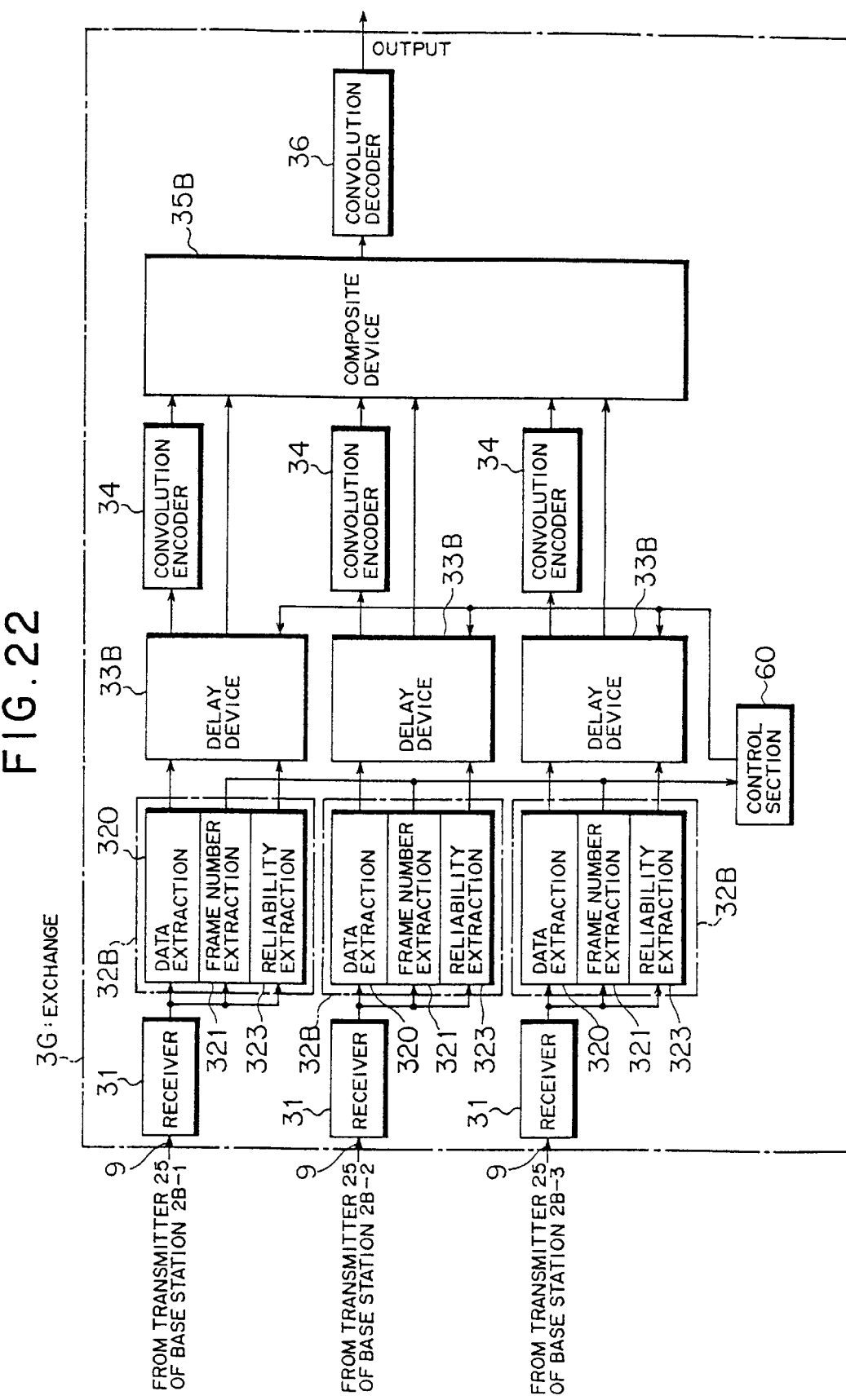
FIG. 22 is a block diagram showing the configuration of an exchange used in the mobile communications system employing a site diversity receiving method according to the eighth embodiment of the present invention.

FIGS. 21 and 22 are block diagrams showing a mobile communications system according to an eighth embodiment of the present invention. The radio communications system shown in FIGS. 21 and 22 comprises the terminal station 1, a plurality of base stations 2B-1 to 2B-3 (see FIG. 21), and an exchange 3G (see FIG. 22).

In the eighth embodiment, a frame reliability information generator 27 is connected to the output terminal of the receiver 21 in parallel with the frame decomposer 22A in each of the base stations 2B-1 to 2B-3.

The frame reliability information generator 27 measures the frame reliability of the data received from the terminal station 1. More specifically, the reliability of each frame is measured by detection of a receiving level and a correlation value. The frame decomposer 22A extracts data from the frame of the received data and outputs the data to the convolution decoder 23 when receiving frame reliability information from the frame reliability information generator 27.

The frame generator 24B inserts the convolution-decoded signal received from the convolution decoder 23 and the frame reliability information received from the frame reliability information generator 27 into a data format designated beforehand in agreement with the exchange 3G. The signal is transmitted to the exchange 3G. Even this signal is assigned a frame number.

As mentioned previously, the base stations 2B-1 to 2B-3 receive the signal transmitted from the terminal station 1 via the wireless line 8 and detects the frame reliability of the received signals. The signals are subjected to convolution decoding processing, and the convolution-decoded signals are transmitted to the exchange 3G via the wired circuit 9 together with the result of detection of frame reliability.

The exchange 3G shown in FIG. 22 is configured in substantially the same manner as is the exchange 3 (see FIG. 3) employed in the first embodiment. More specifically, the exchange 3G receives the frame reliability information which are detected by the plurality of base stations 2-1 to 2-3 with regard to the signal convolution-encoded signal received from the terminal station 1. Further, the exchange 3G receives convolution-decoded signals which are obtained from the signal transmitted from the terminal station through convolution decoding.

The exchange 3G is provided with the receivers 31, frame decomposers 32B, delay devices 33B, the convolution encoders 34, the composite device 35, the convolution decoder 36, and the control section 60.

The frame decomposer 32B extracts data from the frame of the data received by the receiver 31 in substantially the same manner as does the aforementioned frame decomposer 32A. The frame decomposer 32B has a reliability extraction section 323, along with a data extraction section 320 and a frame number extraction section 321.

The reliability extraction section (i.e., frame reliability information receiving section) 323 extracts the frame reliability information received from the base stations 2B-1 to 2B-3. The data received from the data extraction section 320 and the reliability information are output to the delay device 33B, which will be described later.

The delay device 33B delays the data received from the data extraction section 320 and the frame reliability information received from the reliability extraction section 323 for a given period of time (i.e., corrects a delay in the signals) in such a way that the data and the frame reliability information agree with the frame number extracted by the frame number extraction section 321. The delay device 33B outputs the data and the frame reliability information. The delay device 33 is also controlled by the control section 60.

The composite device (or composing section) 35B composes the convolution-encoded signals output from the convolution encoders 34 into one signal so as to reflect the frame reliability information received by the reliability extraction section 323. The composite device 35B composes the signals while assigning weights to the signals according to the extracted reliability information. More specifically, the reliability information output from the delay device 33B is obtained for each frame, and hence the overall convolution-encoded signals output from the convolution encoders 34 can be weighted.

In short, the exchange 3G subjects the signals received from the base stations 2B-1 to 2B-3 to convolution encoding processing. The convolution encoded signals are composed into one signal so as to reflect the frame reliability information received from each of the base stations 2B-1 to 2B-3. The thus-composed signal is subjected to convolution decoding processing.

As shown in FIG. 21, in the mobile communications system according to the eighth embodiment of the present invention, when the data processed by the terminal station 1 are input to the base stations 2B-1 to 2B-3, the receiver 21 receives the data. The frame decomposer 22A extracts data from the frame of the received data. The frame reliability information generator 27 measures the reliability of each frame, and the convolution decomposer 23 subjects the data to convolution decoding processing designated beforehand in agreement with the terminal station 1.

The frame generator 24B inserts the convolution-decoded signal output from the convolution decoder 23 into the data format designated beforehand in agreement with the exchange 3G, along with the frame reliability information received from the frame reliability information generator 27. The signal output from the frame generator 24B is transmitted to the exchange 3G.

Subsequently, as shown in FIG. 22, when the data signals are received from the base stations 2B-1 to 2B-3, the receiver 31 of the exchange 3G receives the signals. The frame decomposer 32B extracts data and frame reliability information from the data format designated beforehand in agreement with the base stations 2B-1 to 2B-3. The delay device 33B corrects a delay in the signal through use of a frame number.

The convolution decoder 34 subjects the signal to convolution encoding processing, and the composite device 35B composes the convolution-encoded signals into one signal so as to reflect the sets of frame reliability information received by the reliability extraction sections 323. The composed signal is subjected to convolution decoding processing in the convolution decoder 36.

As mentioned previously, the eighth embodiment of the present invention yields advantageous results similar to those yielded by the first embodiment. In addition, the reliability extraction section 323 is capable of re-encoding-and-composing the received signal, through use of the reliability information and on a per frame basis. Consequently, accurate data having an improved error rate can be obtained.

(i) Description of a Ninth Embodiment

Figure 23:
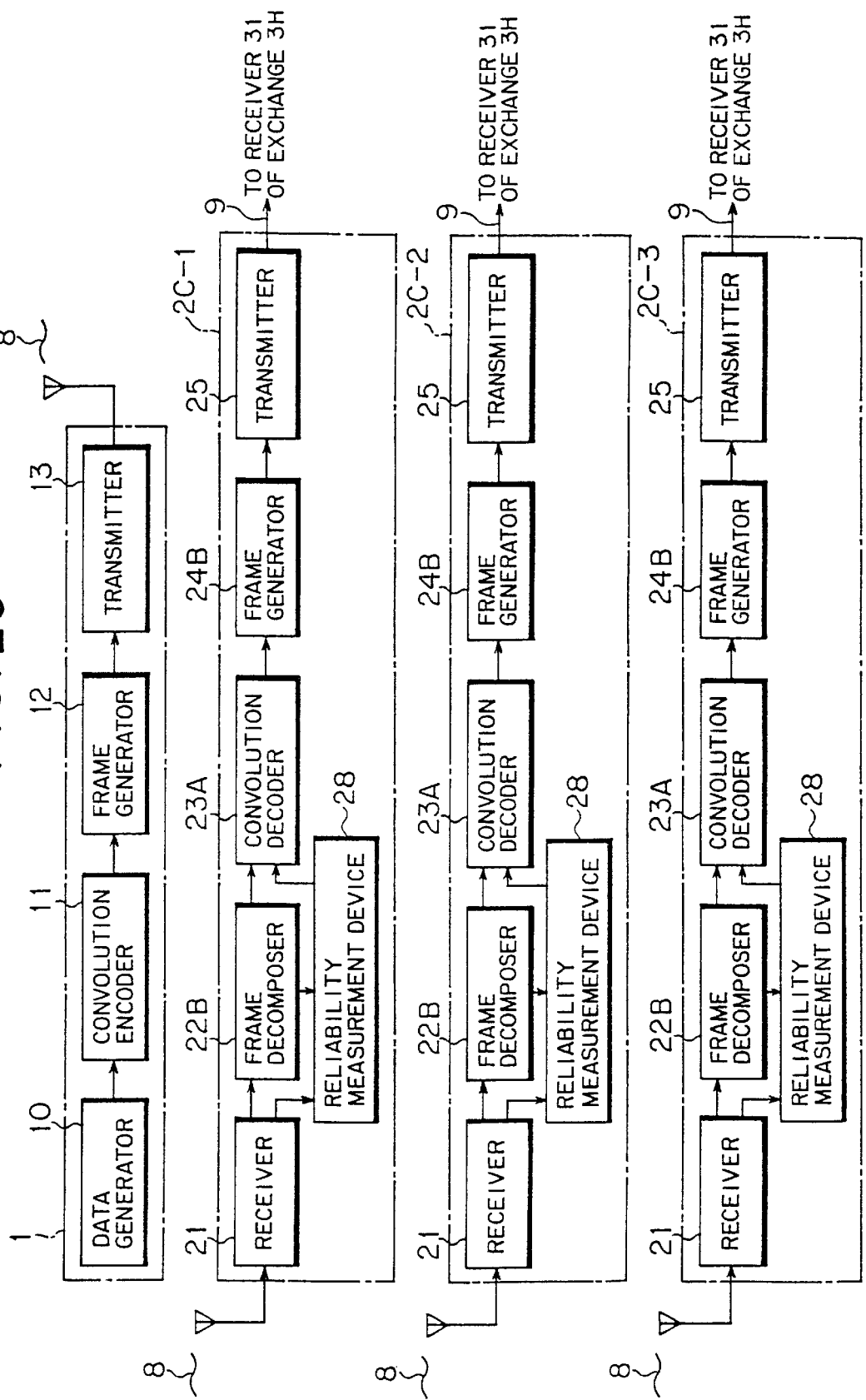
FIG. 23 is a block diagram showing the configuration of a mobile terminal and a base station of a mobile communications system employing a site diversity receiving method according to a ninth embodiment of the present invention.
Figure 24:
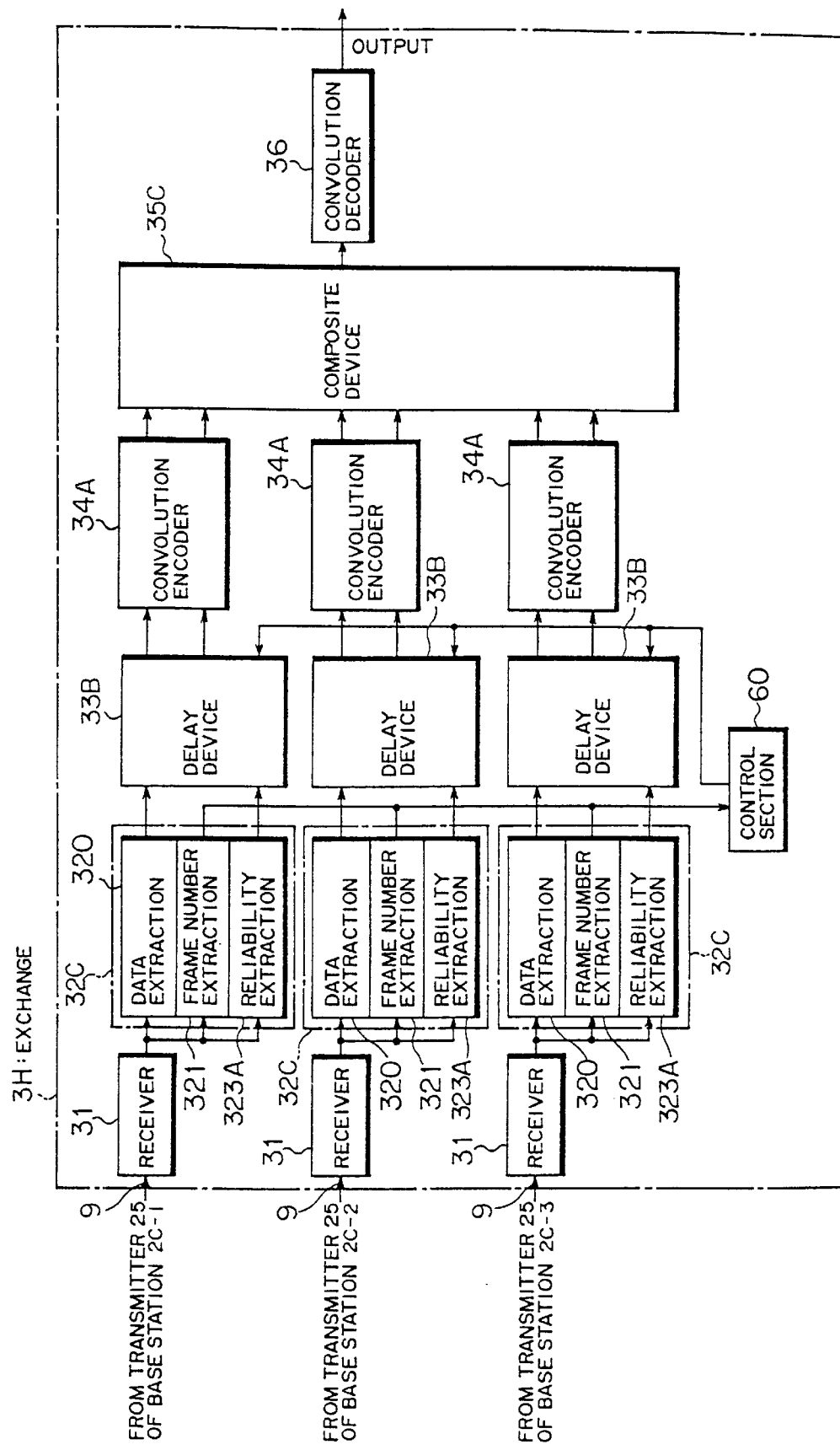
FIG. 24 is a block diagram showing the configuration of an exchange used in the mobile communications system employing a site diversity receiving method according to the ninth embodiment of the present invention.

FIG. 23 is a block diagram showing the configuration of a mobile terminal station and a base station of a mobile communications system according to a ninth embodiment of the present invention. FIG. 24 is a block diagram showing the configuration of an exchange used in the mobile communications system that employs the site diversity receiving method according to the ninth embodiment. As shown in FIGS. 23 and 24, the mobile communications system according to the ninth embodiment comprises the terminal station 1, three base stations 2C-1 to 2C-3 (see FIG. 23), and an exchange 3H (see FIG. 24).

More specifically, in the ninth embodiment, a reliability measurement device 28 is connected to the output terminal of the receiver 21 in parallel with the frame decomposer 22B in each of the base stations 2-1 to 2-3 according to the first embodiment.

The reliability measurement device 28 measures the reliability of the data received from the terminal station 1 on a per bit basis. More specifically, the reliability measurement device 28 detects soft determination information regarding the data received from the terminal station 1. The reliability measurement device 28 outputs to the convolution decoder 23A the reliability information regarding position known from a frame decomposer 22B, which will be described later.

The frame decomposer 22B extracts data from the frame of the received data and notifies the reliability measurement device 28 of the position where the data are extracted. Further, the frame decomposer 22B outputs the extracted data to the convolution decoder 23A.

The convolution decoder 23A subjects the data to convolution decoding processing in the manner designated beforehand in agreement with the terminal station 1. Further, the convolution decoder 23A subjects the data to soft determination decoding processing through use of reliability information. Consequently, soft determination information obtained as a result of the soft determination decoding processing is also output.

The frame generator 24B inserts the decoded data received from the convolution decoder 23A into a given frame format designated beforehand in agreement with the exchange 3H. The convolution-decoded signal having soft determination information is inserted into the frame format. Therefore, even in this case, the signal is assigned a frame number.

More specifically, the base stations 2C-1 to 2C-3 receive the signal transmitted from the terminal station 1 via the wireless line 8. The base stations 2C-1 to 2C-3 detect the reliability of the signal and subject the signals to decoding processing associated with an output of soft determination, through use of the result of reliability detection. The signal that is subjected to convolution decoding processing associated with an output of soft determination is transmitted to the exchange 3H via the wire circuit.

The exchange 3H is configured in substantially the same manner as is the exchange 3G (see FIG. 22) employed in the eighth embodiment. More specifically, with regard to the convolution-encoded signal transmitted from the terminal station 1, the plurality of base stations 2C-1 to 2C-3 subject the received signals to convolution decoding processing associated with an output of soft determination. The thus-convolution decoded signals are received by the exchange 3H.

The exchange 3H has the receivers 31, frame decomposers 32C, delay devices 33B, convolution encoders 34A, composite devices 35C, the convolution decoder 36, and the control section 60.

The frame decomposer 32C is configured in substantially the same way as is the frame decomposer 32B employed in the eighth embodiment. In the eighth embodiment, the reliability extraction section 323 extracts reliability information on a per frame basis. In contrast, in the ninth embodiment, the exchange is provided with reliability extraction sections 323A so as to extract reliability information on a per bit basis.

The convolution encoders 34A subject the convolution-decoded signals received from the base stations 2C-1 to 2C-3 to convolution encoding processing associated with an output of soft determination through use of soft determination information. The convolution-encoded signals are output from the convolution encoders 34A. More specifically, the convolution encoders 34A perform a convolution encoding processing along with the per-bit reliability information received from the reliability extraction section. The composite device 35C composes the signals into one signal by utilization of the soft determination signal output at the time of convolution encoding processing while assigning a weight to the signals on a per bit basis.

More specifically, in the exchange 3H, the signals received from the base stations 2C-1 to 2C-3 are subjected to convolution encoding processing associated with an output of soft determination by utilization of the soft determination output information. The convolution-encoded signals are composed into one signal by utilization of the soft determination signals output at the time of convolution encoding processing. The thus-composed signal is subjected to convolution decoding processing.

In the mobile communications system according to the ninth embodiment of the present invention, as shown in FIG. 23, the data processed by the terminal station 1 are input to the base stations 2C-1 to 2C-3, and the data are received by the receivers 21. The frame decomposer 22B extracts the data from the frame of the received data.

At this time, the reliability measurement device 28 measures the reliability of the data on a per bit basis. The convolution decoder 23A performs soft determination decoding processing, through use of the per-bit reliability information received from the reliability measurement device 28. The convolution decoder 23A outputs the convolution-encoded signal and the soft determination information subjected to soft determination decoding processing.

The frame generator 24B inserts the convolution-decoded signal and the soft determination information received from the convolution decoder 23A into the data format designated beforehand in agreement with the exchange 3H. The frame signal is transmitted to the exchange 3H.

Subsequently, as shown in FIG. 24, when the data signals received from the base stations 2C-1 to 2C-3, the receivers 31 of the exchange 3H receive the data. The frame decomposer 32C extracts the data and the per-bit reliability information from the data format designated beforehand in agreement with the base stations 2C-1 to 2C-3. The delay device 33B corrects a delay in the signal through use of a frame number.

The convolution encoder 34A subjects the signal to convolution encoding processing, through use of the soft determination output information. The composite device 35C composes into one signal the signals subjected to convolution encoding processing associated with the output of soft determination, and the convolution decoder 36 subjects the subjects the composed signal to convolution decoding processing.

As mentioned previously, even the ninth embodiment yields advantageous results similar to those yielded by the first embodiment. In addition, the reliability extraction section 323A can perform a re-encoding-and-composing processing through use of per-bit reliability information, whereby high-accuracy data having an improved error rate can be obtained.

(j) Description of a Tenth Embodiment

Figure 25:
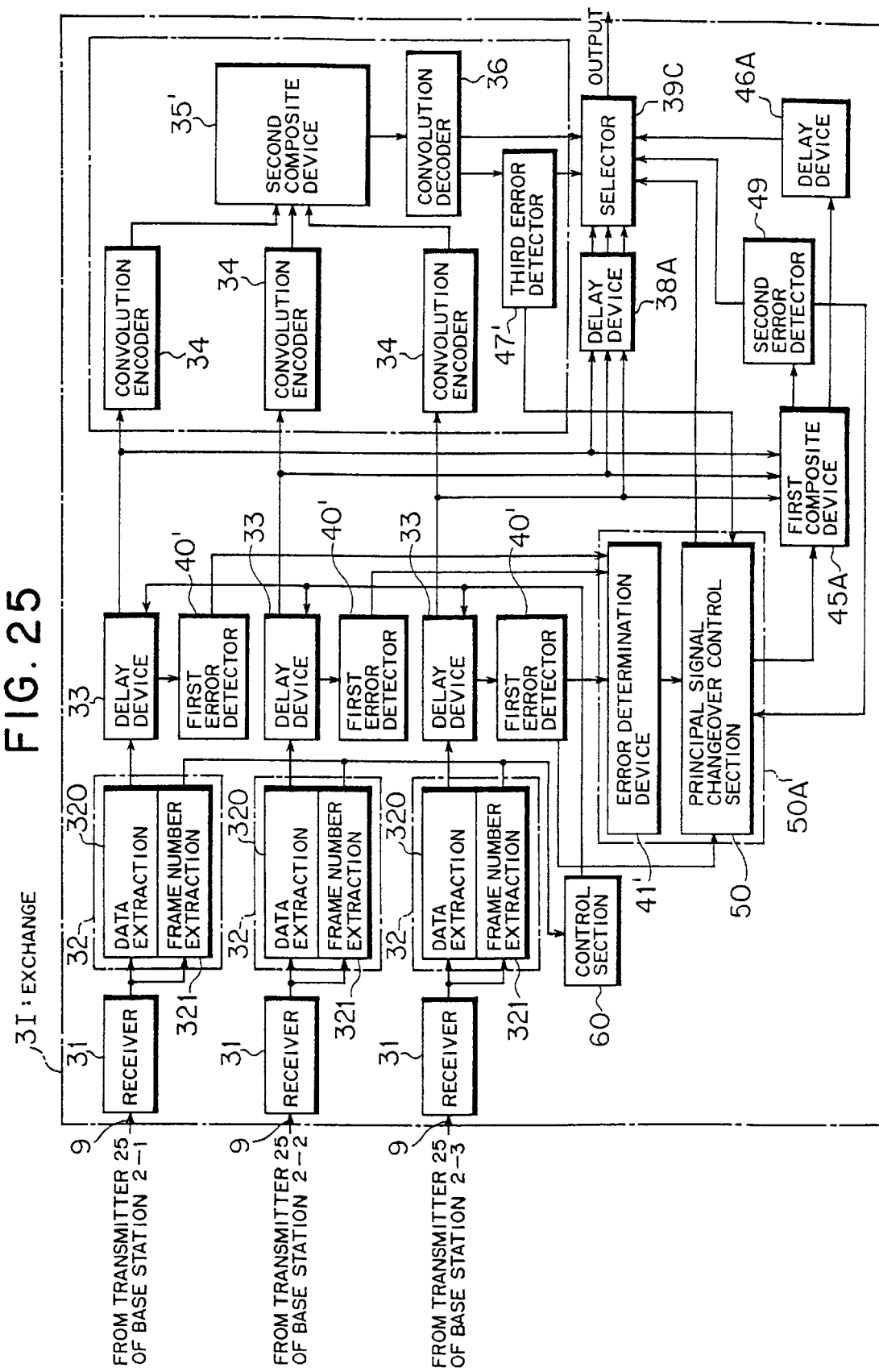
FIG. 25 is a block diagram showing the configuration of an exchange used in a mobile communications system employing a site diversity receiving method according to a tenth embodiment of the present invention.
Figure 26:
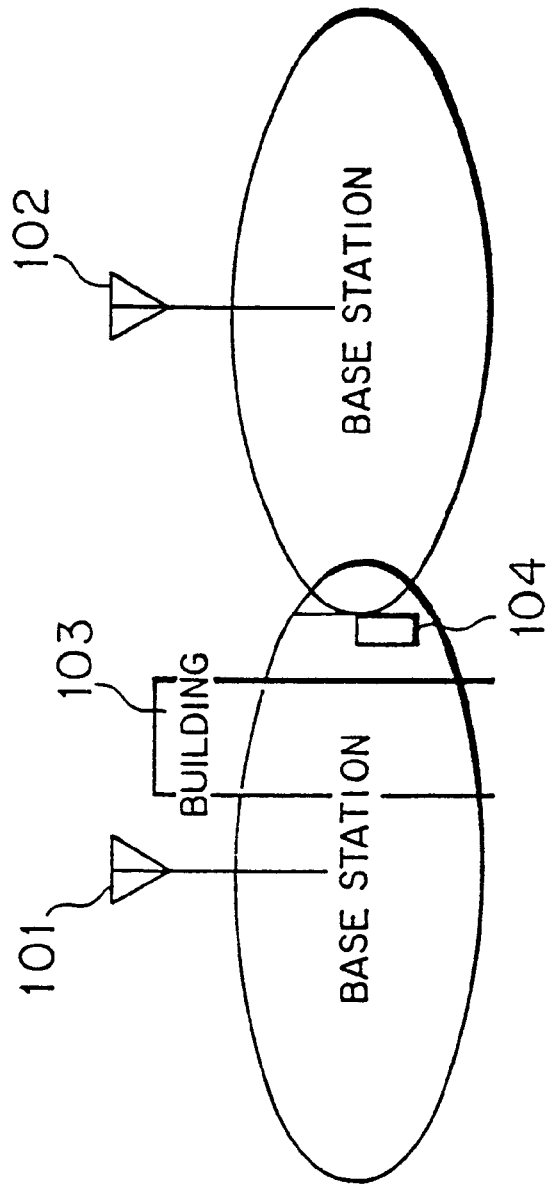
FIG. 26 is a diagrammatic representation showing the concept of the communication that is established between a terminal station and base stations and that employs a site diversity method.
Figure 27:
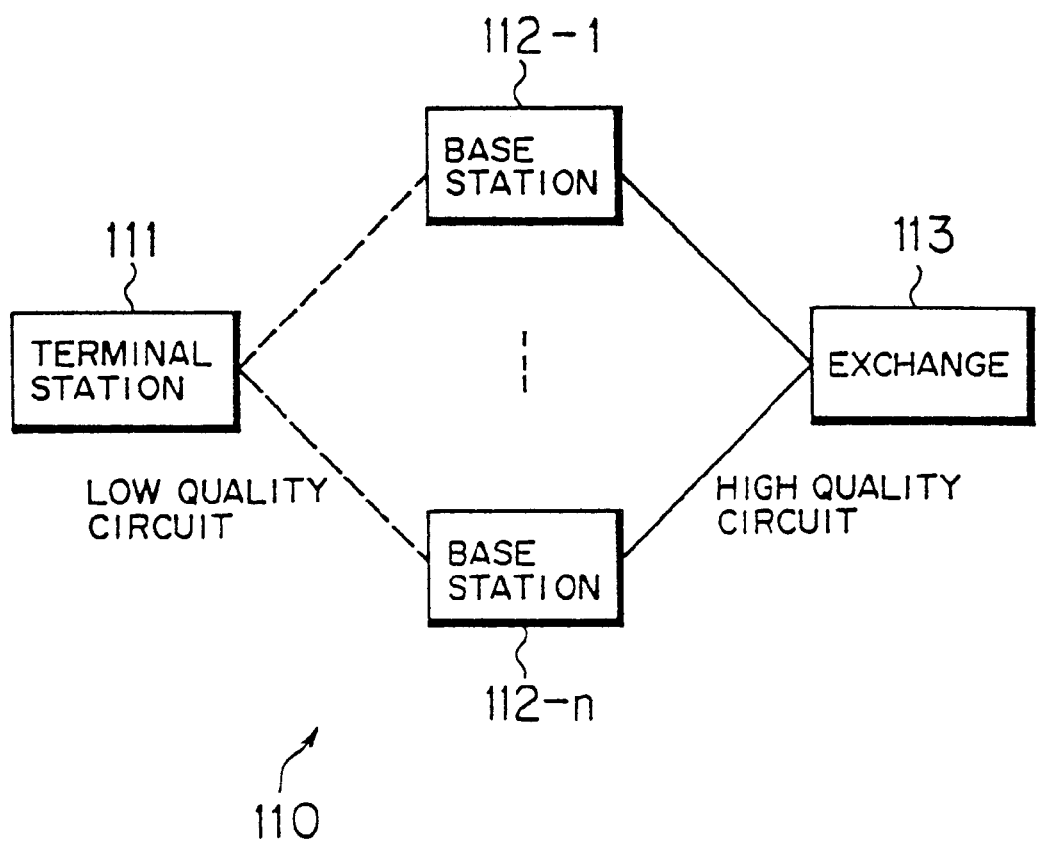
FIG. 27 is a block diagram showing one example of a mobile communications system to which a CDMA method and a site diversity method are applied.

FIG. 25 is a block diagram showing the configuration of an exchange used in a mobile communications system according to a tenth embodiment of the present invention. An exchange 3I shown in FIG. 25 is designed so as to receive the data processed by the terminal station 1A and the base stations 2-1 to 2-3 shown in FIG. 15.

In short, the exchange 3I employed in the tenth embodiment is formed by combination of the exchanges described in the first, third, fourth, and sixth embodiments.

The convolution-encoded signal transmitted from the mobile terminal station 1A is subjected to convolution-decoding processing performed by each of the plurality of base stations 2-1 to 2-3. These convolution-decoded signals are received by the exchange 3I, as they are received by the foregoing exchange 3B (see FIG. 16). The data are subjected to error detection processing at a plurality of locations (e.g., three locations in the circuit configuration shown in FIG. 25).

More specifically, the exchange 3I comprises the receivers 31, the frame decomposers 32, the delay devices 33, the convolution encoders 34, a second composite device 35', the convolution decoder 36, a delay device 38A, a selector 39C, a first error detector 40', an error determination device 41',a first composite device 45A, a delay device 46A, a third error detector 47', a second error detector 49, a principal signal changeover control section 50, and the control section 60.

A first composite device (or first composing section) 45A composes into one signal the convolution-decoded signals received from the base stations 2-1 to 2-3. A second composite device (or second composing section) 35' composes into one signal the signals output from the convolution encoders 34.

The selector (or signal selection section) 39C selects any signal from the signals received from the base stations 2-1 to 2-3, the composed signal output from the composite device 45A, and the signal output from the convolution decoder 36. The selection of a signal is accomplished on the basis of a signal output from the principal signal changeover control circuit 50, which will be described later.

A first error detector (or first error detecting section) 40' detects an error in each of the convolution-decoded signals output from the base stations 2-1 to 2-3. A second error detector (or second error detecting section) 49 detects an error in the composed signal output from the first composite device 45A, and the third error detector 47' detects an error in the signal output from the convolution decoder 36.

The delay devices 38A, 46A function in substantially the same way as do the foregoing delay device 38 (see FIGS. 14, 16, and 17) and the delay device 46 (see FIG. 19). The error determination device 41' functions in substantially the same way as does the foregoing error determination device 41 (see FIG. 16).

The principal signal changeover control section 50 controls the changing of a signal performed by the selector 39C according to the error presence/absence information received from the first error detector 40', the second error detector 49 and the third error detector 47'. The error determination device 41' and the principal signal changeover control section 50 are formed into a signal changeover control section 50A.

More specifically, the signal changeover control section 50A receives detection results from the first, second, and third error detectors 40', 49, and 47' and makes a determination as to whether or not an error is detected from the signals received from the base stations 2-1 to 2-3, through use of the detection result received from the first error detector 40'. If no error is detected from the signals received from the base stations 2-1 to 2-3, an error-free signal of the signals received from the base stations 2-1 to 2-3 is output as a received signal from the selector 39C. If errors are detected from all the signals received from the base stations 2-1 to 2-3, the signal changeover control section 50A makes a determination as to whether or not an error is detected from the composed signal, through use of the detection result received from the second error detector 49. If no errors are detected from the composed signal, the composed signal is output as a received signal from the selector 39C. In contrast, if an error is detected from the composed signal, the signal changeover control section 50A makes a determination as to whether or not an error is detected from the signal received from the convolution decoder 36, through use of the detection result received from the third error detector 47'. If no errors are detected from the convolution-decoded signal, the changeover control section 50A controls the switching operation of the selector 39C in such a way that the convolution-decoded signal is output as a received signal from the selector 39C.

If an error is detected from the convolution-decoded signal (i.e., the third error detecting section detects an error), the exchange 3I outputs the composed signal or the signals received from the base stations 2-1 to 2-3 as a received signal.

In short, if the third error detector 47' detects an error, the exchange 3I according to the tenth embodiment selectively outputs the data processed on the preceding stage (i.e., the composed signal output from the first composite device 45A) or the data processed on the stage one before the preceding stage (i.e., the convolution-decoded signals which are received from the base stations 2-1 to 2-3 and are processed in the delay devices 33).

The exchange 3I is provided with error detectors (i.e., the first error detector 40', the second error detector 49, and the third error detector 47') disposed in a plurality of areas where the error detectors are required. As a result, the data to be output can be quickly processed according to the state of detection of an error in the signal.

In the mobile communications system according to the tenth embodiment having the foregoing configuration, when the exchange 3I receives the data signals subjected to required processing performed by the terminal station 1A and the base stations 2-1 to 2-3, the receivers 31 of the exchange 3I receives the data signals as shown in FIG. 25. The frame decomposer 32 extracts data from the data signal, and the delay device 33 corrects a delay in the signal through use of a frame number.

Subsequently, on the basis of the signals output from the delay devices 33 (i.e., the convolution-decoded signals received from the base stations 2-1 to 2-3), the first error detectors 40' detect an error in the convolution-decoded signals received from the base stations 2-1 to 2-3. Error presence/absence information signal regarding the result of error detection is output to the error determination device 41'.

Further, on the basis of the signals output from the delay devices 33, the second error detector 49 detects an error in the signal composed by the first composite device 45A. Error presence/absence information regarding the result of error detection is output to the error determination device 41'.

Further, on the basis of the signals output from the delay devices 33, the third error detector 47' detects an error in the convolution-decoded signal output from the convolution decoder 36. Error presence/absence information regarding the result of error detection is output to the error determination device 41'.

Upon receipt of the error presence/absence information signals from the first, second, and third error detectors 40', 49, and 47', the error determination device 41' makes a determination as to whether or not an error is detected from the signals received from the base stations 2-1 to 2-3, through use of the result of detection of the first error detector 40'.

Subsequently, if no errors are detected from the signals received from the base stations 2-1 to 2-3, an error-free signal of the signals received from the base stations 2-1 to 2-3 is output as a received signal from the selector 39C (i.e., along the path represented by the delay device 33→the delay device 38A→the selector 39C shown in FIG. 25). In contrast, if errors are detected from all of the signals received from the base stations 2-1 to 2-3, a determination is made as to whether or not an error is detected from the composed signal, through use of the detection result signal received from the second error detector 49 (i.e., along the path represented by the first composite device 45A→the second error detector 49 shown in FIG. 25).

Subsequently, if the second error detector 49 does not detect any error in the composed signal output from the first composite device 45A, the composed signal is output as a received signal from the selector 39C (i.e., along the path represented by the first composite device 45A→the delay device 46A→the selector 39C). In contrast, if an error is detected from the composed signal, a determination is made as to whether or not an error is detected from the signal received from the convolution decoder 36, through use of the detection result signal received from the third error detector 47' (along the path represented by the convolution decoder 36→the third error detector 47').

Further, if no error is detected from the convolution-decoded signal, this convolution-decoded signal is output as a received signal from the selector 39C (i.e., along the path represented by the convolution decoder 36→the selector 39C).

As mentioned previously, according to the tenth embodiment, the exchange 3I is provided with the error detectors (i.e., the first, second, and third error detectors 40', 49, and 47') positioned at a plurality of locations where the error detectors are required. Therefore, the data to be output can be quickly processed according to the state of detection of errors in the received signal. Further, best data can be efficiently selected, and hence the tenth embodiment has the advantage of being able to significantly improve the processing capability of the overall mobile communications system.

(k) Others

The method of detecting an error in a convolution-decoded signal within an exchange described in the previous embodiments is not limited to the foregoing embodiments. It is only essential that the error detector be provided in at least a position where an error in a received signal can be detected. As a result, the mobile communications system can be constructed through use of required circuits according to the state of a circuit, thereby resulting in a great contribution to the flexibility of construction of the system.

The foregoing embodiments have been described in detail with reference to the cases where two or three base stations exist within the system. However, the same present invention can also be applied to a case where four or more base stations exist in the system. Further, although the exchange has been used as an example of the base-station host apparatus in the foregoing embodiments, the present invention is not limited to these embodiments. Any apparatus may be used as the base-station host apparatus, so long as the apparatus is connected to at least base stations through the wire circuit 9.

What is claimed is:

1. A site diversity receiving method for use in a mobile communications system that includes a mobile terminal station, a plurality of base stations connected to the mobile terminal station via a wireless line, and a base-station host apparatus connected to the base stations via a wired line, comprising the steps of at the mobile terminal station:
(a) transmitting a first signal subjected to a first error-correction encoding processing;

at each of the plurality of base stations:
(b) receiving the first signal transmitted from the mobile terminal station via the wireless line;
(c) performing a first error correction decoding processing for the received first signal;
(d) transmitting a second signal including a first error-correction decoded signal and an information data signal to the base-station host apparatus via the wired line; and at the base-station host apparatus:
(e) performing a second error-correction encoding processing for each of the second signals received from the base stations;

(f) composing the second error correction encoded signals into a third signal; and (g) performing a second error-correction decoding processing for the composed third signal.

2. A site diversity receiving method for use in a mobile communications system that includes a mobile terminal station, a plurality of base stations connected to the mobile terminal station via a wireless line, and a base-station host apparatus connected to the base stations via a wired line, comprising the steps of at the mobile terminal station:

(a) transmitting a first signal which has been subjected to an error-detection encoding processing and a first error-correction encoding processing;

at each of the plurality of base stations:

(b) receiving the first signal transmitted from the mobile terminal station via the wireless line (c) performing a first error-correction decoding processing and an error detection processing for the thus-received first signals (d) transmitting a second signal including a first error-correction decoded signal that has been subjected to the first error-correction decoding processing and an information data signal to the base-station host apparatus via the wired line; and at the base-station host apparatus:

(e) operating based on the results of error detection received from the base stations such that if it is determined that error presence information is transmitted from all of the base stations;

(f) performing a second error-correction encoding processing for each of second signals received from the base stations;

(g) composing the second error-correction encoded signals into a third signal, and subjects the composed third signal to a second error-correction decoding processing.

3. A site diversity receiving method for use in a mobile communications system that includes a mobile terminal station, a plurality of base stations connected to the mobile terminal station via a wireless line, and a base-station host apparatus connected to the base stations via a wired line, comprising the steps of at the mobile terminal station:

(a) transmitting a first signal which has been subjected to an error-detection encoding processing and a first error-correction encoding processing;

at each of the plurality of base stations:

(b) receiving the first signal transmitted from the mobile terminal station via the wireless line, (c) performing a first error-correction decoding processing for the thus-received signals, and (d) transmitting a second signal including a first error-correction decoded signal that has been subjected to the first error-correction decoding processing and an information data signal to the base-station host apparatus via the wired line; and at the base-station host apparatus:

(e) performing error detection for the second signal received from each of the base stations, (f) operating based on results of the error detection such that if it is determined that error presence information is transmitted from all of the base stations, the base-station host apparatus performs a second error-correction encoding processing for each of the second signals received from the base stations, (g) composing the second error-correction encoded signals into a third signal, and (h) subjecting the composed third signal to a second error-correction decoding processing.

4. A site diversity receiving method for use in a mobile communications system that includes a mobile terminal station, a plurality of base stations connected to the mobile terminal station via a wireless line, and a base-station host apparatus connected to the base stations via a wired line, comprising the steps of at the mobile terminal station:

(a) transmitting a first signal which has been subjected to an error-detection encoding processing and a first error correction encoding processing via the wired line;

at each of the plurality of base stations:

(b) receiving the first signal transmitted from the mobile terminal station via the wireless line, (c) performing a first error correction decoding processing for the thus-received signal, (d) transmitting a second signal including a first error-correction decoded signal that has been subjected to the first error-correction decoding processing and an information data signal to the base-station host apparatus via the wired line; and at the base-station host apparatus:

(e) performing a second error-correction encoding processing for the second signal received from each of the base stations, (f) composing the second error-correction encoded signals into a third signal, (g) performing a second error-correction decoding processing for the thus-composed third signal to obtain a second error-correction decoded signal, (h) performing error-detection for the error-correction decoded signal, and (i) outputting the error-correction decoded signal as a received signal in a case where no errors are detected from the results of error detection.

5. A site diversity receiving method for use in a mobile communications system that includes a mobile terminal station, a plurality of base stations connected to the mobile terminal station via a wireless line and a base-station host apparatus connected to the base stations via a wired line, comprising the steps of at the mobile terminal station:

(a) transmitting a first signal which has been subjected to a first error-correction encoding processing;

at each of the plurality of base stations:

(b) receiving the first signal transmitted from the mobile terminal station via the wireless line, (c) performing a first error correction decoding processing for the thus-received signals, and (d) transmitting a second signal including a first error-correction decoded signal that has been subjected to the first error-correction decoding processing and an information data signal to the base-station host apparatus via the wired line; and at the base-station host apparatus:

(e) performing a second error-correction encoding processing for the second signal received from each of the base stations, (f) composing the second error-correction encoded signals into a third signal in such a way as to reflect an error rate obtained from the signals outputted from the base stations, and (g) performing a second error-correction decoding processing for the thus-composed third signal.

6. A site diversity receiving method for use in a mobile communications system that includes a mobile terminal station, a plurality of base stations connected to the mobile terminal station via a wireless line, and a base-station host apparatus connected to the base stations via a wired line, comprising the steps of at the mobile terminal station:
(a) transmitting a first signal which has been subjected to a first error-correction encoding processing;

at each of the plurality of base stations:
(b) receiving the first signal transmitted from the mobile terminal station via the wireless line,
(c) performing a frame reliability detection processing,
(d) performing a first error-correction decoding processing for the thus-received signal, and
(e) transmitting a second signal including a first error-correction decoded signal that has been subjected to the frame reliability detecting processing and the first error-correction decoding processing and an information data signal to the base-station host apparatus via the wired line; and at the base-station host apparatus:
(f) performing a second error correction encoding processing for the second signal received from each of the base stations,
(g) composing the second error-correction encoded signals into a third signal in such a way as to reflect the frame reliability information received from the respective base stations, and
(h) performing a second error-correction decoding processing for the thus-composed third signal.

7. A site diversity receiving method for use in a mobile communications system that includes a mobile terminal station, a plurality of base stations connected to the mobile terminal station via a wireless line, and a base-station host apparatus connected to the base stations via a wired line, comprising the steps of at the mobile terminal station:
(a) transmitting a first signal which has been subjected to a first error-correction encoding processing;

at each of the plurality of base stations:
(b) receiving the first signal transmitted from the mobile terminal station via the wireless line,
(c) performing a frame reliability detecting processing for the thus-received signals,
(d) performing a first error-correction decoding processing for the signal through use of the result of detection of reliability in order to produce an error-correction decoded signal and a soft determination output, and
(e) transmitting a second signal including a first error-correction decoded signal and an information data signal to the base-station host apparatus via the wired line; and at the base-station host apparatus:
(f) performing a second error-correction encoding processing for the signals received from the base stations through use of the soft determination output information in order to produce error-correction encoded signals with soft determination outputs,
(g) composing the second error-correction encoded signals into a third signal by utilization of the soft determination outputs produced by the error-correction encoding processing, and
(h) performing a second error-correction decoding processing for the thus-composed third signal.

8. A site diversity receiving method for use in a mobile communications system that includes a mobile terminal station, a plurality of base stations connected to the mobile terminal station via a wireless line and a base-station host apparatus connected to the base stations via a wired line, comprising the steps of at the mobile terminal station:
(a) transmitting a first signal which has been subjected to an error-detection encoding processing and a first error-correction encoding processing;

at each of the plurality of base stations:
(b) receiving the first signal transmitted from the mobile terminal station via the wireless line,
(c) performing a first error-correction decoding processing for the thus-received signals, and
(d) transmitting a second signal including a first error-correction decoded signal that has been subjected to the first error-correction decoding processing and an information data signal to the base-station host apparatus via the wired line; and at the base-station host apparatus:
(e) performing an error detection processing for the second signal received from each of the base stations, and
(f) operating such that if there is not found a first error in the signals received from all of the base stations, the base-station host apparatus outputs the signals received from the respective base stations as received signals, and if there is found the first error in the signals received from the base stations, the base-station host apparatus composes the signals received from the base stations into one signal and detects a second error in the composed signal, that if there is not found the second error in the composed third signal, the base-station host apparatus outputs the composed third signal as a received signal, and if there is found an error in the composed third signal, the base-station host apparatus performs a second error-correction encoding processing for the signals received from the base station, composes the second error-correction encoded signals into a third signal, performs a second error-correction decoding processing for the composed third signal, and detects a third error in the error-correction decoded signal, and that if there is not found the third error in the second error-correction decoded signal, the base-station host apparatus outputs the second error-correction decoded signal as a received signal.

9. The site diversity receiving method for use in the mobile communications system according to claim 8,
said operating step (f) at the base station host-apparatus is performed such that if a third error in the second error-correction decoded signal is detected by the base-station host apparatus, the signals received from the base stations or the composed third signal is output as a received signal.

10. A base station host apparatus for use in a mobile communications system which employs a site diversity receiving method, for use in a mobile communications system that includes a mobile terminal station, a plurality of base stations connected to the mobile terminal station via wireless lines, and said base-station host apparatus connected to the base stations via wired lines, wherein a first signal subjected to a first error-correction encoding processing and transmitted from the mobile terminal station is received by said plurality of base stations where the first signals are further subjected to a first error-correction decoding processing, and wherein second signals including the first error-correction decoded signals and information data signals are received via the wired lines by the base-station host apparatus, the base-station host apparatus comprising:

- a second error-correction encoding section which performs a second error-correction encoding processing for the error-correction decoded second signals outputted from the respective base stations and outputs the second error-correction encoded signals;
- a composing section which composes the second error-correction encoded signals into a third signal; and
- a second error-correction decoding section which performs a second error-correction decoding processing for the composed third signal outputted from the composing section.

11. The base station host apparatus for use in a mobile communications system which employs a site diversity receiving method according to claim 10, wherein the composing section is arranged so as to output results of soft determination along with the composed signal; and the second error-correction decoding section is arranged so as to subject the composed third signal to a soft determination decoding processing through use of the composed third signal and the results of soft determination from the composing section.

12. A base-station host apparatus for use in a mobile communications system which employs a site diversity receiving method, for use in a mobile communications system that includes a mobile terminal station, a plurality of base stations connected to the mobile terminal station via wireless lines, and a base-station host apparatus connected to the base stations via wired lines, wherein a signal subjected to an error detection processing and a first error-correction encoding processing and transmitted from the mobile terminal station is received by said plurality of base stations, where the first signals are further subjected to a first error-correction decoding processing and an error detection processing, and wherein the base-station host apparatus receives second signals, said second signals including the first error-correction decoded signal and an information signal, via the wired lines error presence/absence information obtained as a result of the error detection processings performed by the plurality of base-stations, the base-station host apparatus comprising:

- an error determination section which performs an error determination processing upon receipt of the error presence/absence information from each of the base stations;
- a second error-correction encoding section which performs second error-correction encoding processing for the second signals outputted from the respective base stations and outputs thus obtained second error-correction encoded signals;
- a composing section which composes the second error-correction encoded signals received from the second error-correction encoding section into a third signal;
- a second error-correction decoding section which performs second error-correction decoding processing for the composed third signal outputted from the composing section; and
- a gate section which outputs the third signal received from the second error-correction decoding section as a received output if the error determination section determines that error presence information is sent from all of the base stations.

13. The base station host apparatus for use in a mobile communications system which employs a site diversity receiving method according to claim 12, wherein the gate section is configured as a selection section such that if the error determination section determines that error presence information is sent from all of the base stations, the gate section selects an outputted from the second error-correction decoding section, and if the error determination section determines that error presence information is not sent from all of the base stations, the gate section selects the error-correction decoded signal outputted from each of the base stations.

14. A base-station host apparatus for use in a mobile communications system which employs a site diversity receiving method, for use in a mobile communications system that includes a mobile terminal station, a plurality of base stations connected to the mobile terminal station via a wireless lines, and a base-station host apparatus connected to the base stations via a wired lines, wherein a first signal, said first signal including a signal that has been subjected to error-correction decoding processing, subjected to an error-detection encoding processing and a first error-correction encoding processing and transmitted from the mobile terminal station is received by said plurality of base stations, where the first signals are further subjected to the first error-correction decoding processing, and wherein the base-station host apparatus receives second signals, said second signals including the first error-correction decoded signal and an information signal, via the wired lines from the plurality of base stations, the base-station host apparatus comprising:

- an error detection section which subjects to detect the second signal received from each of the base stations and outputs error presence/absence information;
- an error determination section which performs an error determination operation upon receipt of the error presence/absence information from the error detection section;
- a second error-correction encoding section which performs a second error-correction encoding processing for the second signal outputted from the respective base stations and outputs thus obtained second error-correction encoded signals;
- a composing section which composes the second error-correction encoded signals received from the second error-correction encoding section into a third signal;
- a second error-correction decoding section which performs a second error-correction decoding processing for the composed third signal outputted from the composing section; and
- a gate section which outputs the signal received from the second error-correction decoding section as a received output if the error determination section determines that error presence information is sent from all of the base stations.

15. A base-station host apparatus for use in a mobile communications system which employs a site diversity receiving method according to claim 14, the gate section is configured as a selection section such that if the error determination section determines that error presence information is sent from all of the base stations, the gate section selects an outputted from the second error-correction decoding section, and if the error determination section determines that error presence information is not sent from all of the base stations the gate section selects the second error-correction decoded signal outputted from each of the base stations.

16. A base-station host apparatus for use in a mobile communications system which employs a site diversity receiving method, for use in a mobile communications system that includes a mobile terminal station, a plurality of base stations connected to the mobile terminal station via wireless lines, and said base-station host apparatus connected to the base stations via wired lines, wherein a first signal, said first signal including a signal that has been subjected to first error-correction decoding processing, subjected to an error-detection encoding processing and a first error-correction encoding processing and transmitted from the mobile terminal station is received by a plurality of base stations, where the first signals are further subjected to a first error-correction decoding processing, and wherein the base-station host apparatus receives second signals, said second signals including the first error-correction decoded signal and an information signal, via the wired lines from the plurality of base stations, the base-station host apparatus comprising:

a first composing section which composes into one signal the second signals received from the base stations;

an error detection section which performs error detection for the thus-composed signal;

a second error-correction encoding section which performs a second error-correction encoding processing for the error-correction decoded signals outputted from the respective base stations and outputs thus obtained second error-correction encoded signals;

a second composing section which composes the second error-correction encoded signals received from the second error-correction encoding section into a third signal;

a second error-correction decoding section which performs a second error-correction decoding processing for the composed third signal outputted from the second composing section; and a gate section which outputs the signal received from the second error-correction decoding section as a received output if the error detection section determines that the composed third signal includes error presence information.

17. The base-station host apparatus for use in communications system which employs a site diversity receiving method according to claim 16, wherein, the gate section is configured as a selection section such that if the error detection section detects that the composed third signal includes error presence information, the gate section selects an outputted from the second error-correction decoding section, and if the error detection section does not detect that the composed third signal includes error presence information, the gate section selects the first error-correction decoded signal outputted from each of the base stations.

18. A base-station host apparatus for use in a mobile communications system which employs a site diversity receiving method, for use in a mobile communications system that includes a mobile terminal station, a plurality of base stations connected to the mobile terminal station via wireless lines, and a base-station host apparatus connected to the base stations via wired lines, wherein a first signal, said first signal including a signal that has been subjected to error-correction decoding processing, subjected to an error-detection processing and a first error-correction encoding processing and transmitted from the mobile terminal station is received by said plurality of base stations, where the first signals are further subjected to a first error-correction decoding processing, and wherein the base-station host apparatus receives second signals, said second signals including the first error-correction decoded signal and an information signal, via the wired lines from the plurality of base stations, the base-station host apparatus comprising:

a second error-correction encoding section which performs a second error-correction encoding processing for the first error-correction decoded signals received from the respective base stations;

a composing section which composes the second error-correction encoded signals into a third signal;

a second error-correction decoding section which performs a second error-correction decoding processing for the thus composed third signal;

an error detection section which performs error detection for the second error-correction decoded signal received from the second error-correction decoding section; and a gate section which outputs the signal received from the second error-correction decoding section as a received output if the error detection section detects no errors.

19. The base-station host apparatus for use in a mobile communications system which employs a site diversity receiving method according to claim 18, wherein the gate section is configured as a selection section such that if the error detection section detects no errors, the gate section selects an outputted from the second error-correction decoding section, and if the error detection section detects errors, the gate section selects the first error-correction decoded signal outputted from each of the base stations.

20. The base-station host apparatus for use in a mobile communications system which employs a site diversity receiving method according to claim 18, wherein the base-station host apparatus includes a second composing section which composes into one signal the first error-correction decoding signals received from the respective base stations; and the gate section is configured as a selection section such that if the error detection section detects no errors, the gate section selects an outputted from the second error-correction decoding section, and if the error detection section detects errors, the gate section selects the signal outputted from the second composite section.

21. A base-station host apparatus for use in a mobile communications system which employs a site diversity receiving method, for use in a mobile communications system that includes a mobile terminal station, a plurality of base stations connected to the mobile terminal station via wireless lines, and said base-station host apparatus connected to the base stations via wired lines, wherein a first signal, said first signal including a signal that has been subjected to error-correction decoding processing, subjected to a first error-correction encoding processing transmitted from the mobile terminal station is received by a plurality of base stations, where a first signals are further subjected to a first error-correction decoding processing, and wherein the base-station host apparatus receives second signals, said second signals including the first error-correction decoded signal and an information signal, via the wired lines from the plurality of base stations, the base-station host apparatus comprising:

an error rate measurement section which measures the error rate of the error-correction decoded signal outputted from each of the base stations;

a second error-correction encoding section which performs a second error-correction encoding processing for the first error-correction decoded signals received from the respective base stations;

a composing section which composes the second error-correction encoded signals into a third signal in such a way as to reflect the error rate measured by the error rate measurement section; and a second error-correction decoding section which performs a second error-correction decoding processing for the thus composed third signal.

22. A base-station host apparatus for use in a mobile communications system which employs a site diversity receiving method, for use in a mobile communications system that includes a mobile terminal station, a plurality of base stations connected to the mobile terminal station via wireless lines, and said base-station host apparatus connected to the base stations via wired lines, wherein a first signal, said first signal including a signal that has been subjected to error-correction decoding processing, subjected to a first error-correction encoding processing, and transmitted from the mobile terminal station is received by said plurality of base stations, where frame reliability information regarding the received first signal is detected and the received first signal is subjected to a first error-correction decoding processing, and wherein the base-station host apparatus receives second signals, said second signals including the first error-correction decoded signal and an information signal having the frame reliability information from the plurality of base stations, via the wired lines the base-station host apparatus comprising:

a frame reliability information receiving section which receives frame reliability information from each of the base stations;

a second error-correction encoding section which performs a second error-correction encoding processing for the first error-correction decoded signals received from the respective base stations;

a composing section which composes the second error-correction encoded signals outputted from the error-correction encoding section into a third signal in such a way as to reflect the frame reliability information received by the frame reliability information receiving section; and a second error-correction decoding section which performs a second error-correction decoding processing for the thus composed third signal.

23. A base-station host apparatus for use in a mobile communications system which employs a site diversity receiving method, for use in a mobile communications system that includes a mobile terminal station, a plurality of base stations connected to the mobile terminal station via wireless line, and said base-station host apparatus connected to the base stations via wired lines, wherein a first signal, said first signal including a signal that has been subjected to a first error-correction encoding processing and transmitted from the mobile terminal station is received by said plurality of base stations, where the first signals are further subjected to a first error-correction decoding processing in order to output first error-correction decoded signals with soft determination outputs, and wherein the base-station host apparatus receives second signals, said second signals including the first error-correction decoded signals and an information signals, having the soft determination via the wired lines, outputted from the plurality of base stations, the base-station host apparatus comprising:

a second error-correction encoding section which performs a second error-correction encoding processing for the first error-correction decoded signals received from the respective base stations through use of the soft determination output information in order to output thus obtained second error-correction encoded signals with soft determination outputs;

a composing section which composes the second error-correction encoded signals outputted from the second error-correction encoding section into a third signal by utilization of the soft determination outputs produced by the second error-correction encoding processing; and a second error-correction decoding section which performs a second error-correction decoding processing for the thus-composed third signal.

24. A base-station host apparatus for use in a mobile communications system which employs a site diversity receiving method, for use in a mobile communications system that includes a mobile terminal station, a plurality of base stations connected to the mobile terminal station via wireless lines, and said base-station host apparatus connected to the base stations via wired lines, wherein a first signal, said first signal including a signal that has been subjected to a first error-correction encoding processing and transmitted from the mobile terminal station is received by said plurality of base stations, where the first signals are further subjected to a first error-correction decoding processing, and wherein the base-station host apparatus receives second signals, said second signals including the first error-correction decoded signals and information signals, via the wired lines from the plurality of base stations, the base-station host apparatus comprising:

a first composing section which composes into one signal the first error-correction decoded signals received from the base stations;

a second error correction encoding section which performs a second error-correction encoding processing for the first error-correction decoded signals received from the base stations to thereby output second error-correction encoded signals;

a second composing section which composes the second error-correction encoded signals from the second error-correction encoding section into a third signal;

a second error-correction decoding section which performs a second error-correction decoding processing for the composed third signal outputted from the second composing section;

a signal selection section which selects any one from the signals received from the base stations, the composed third signal outputted from the first composing section, and the signal outputted from the second error-correction decoding section;

a first error detection section which detects a first error in the error-correction decoded signal received from each of the base stations;

a second error detection section which detects a second error in the signal outputted from the first composing section;

a third error detection section which detects a third error in the third signal outputted from the second error-correction decoding section; and a signal selection control section which receives the results of detection from the first, second, and third error detection sections, wherein the control section makes a determination as to whether or not there is found an error in the signal received from each of the base stations, through use of the detection result received from the first error detection section, and causes the signal selection section to output the signals received from the base stations as received signals if no errors are detected from the second signals received from the base stations;

if there are found errors in all the second signals received from the base stations the control section makes a determination as to whether or not there is found an error in the second signal output, through use of the detection result received from the second error detection section, and causes the signal selection section to output the composed signal as a received signal if no errors are detected from the composed signal;

if there is found an error in the composed signal, the control section makes a determination as to whether or not there is found an error in the signal outputted from the error-correction decoding section, through use of the detection result received from the third error detection section; and if no errors are detected from the signal outputted from the error-correction decoding section, the control section causes the signal selection section to output the error-correction decoded signal as a received signal.

25. The base-station host apparatus for use in a mobile communications system which employs a site diversity receiving method according to claim 24, wherein the third error detection section comprises a control section which controls the signal selection section in such a way that the signal selection section outputs the composed third signal composed signal or the signals received from the base stations as a received signal if an error is detected from the error-correction decoded signal.

26. A reception signal processing method performed in a base-station host apparatus of a mobile communication system employing a site diversity receiving method, said reception signal processing method comprising:

a receiving step for receiving a first error-correction decoded signal from each of a plurality of base stations which receive a transmission signal from a mobile terminal station, said mobile terminal transmitting a first signal, said first signal including a signal that has been subjected to a first error-correction encoding processing as the transmission signal, and each of said base stations performing a first error-correction decoding processing for the transmission signal to obtain the first error-correction decoded signal;

a second error-correction encoding processing step for performing second error correction encoding processing for each of the second signals received via wired lines from the respective base stations in said receiving step;

a composing step for composing the second signals subjected to the second error-correction encoding processing to obtain a composed third signal; and second error-correction decoding processing for performing second error-correction decoding processing for the composed third signal.

27. A reception signal processing method performed in a base-station host apparatus of a mobile communication system employing a site diversity receiving method, said reception signal processing method comprising:

a receiving step for receiving a first error-correction decoded signal and error presence information from each of a plurality of base stations which receive a transmission signal from a mobile terminal station, said mobile terminal transmitting a first signal, said first signal including a signal that is subjected to a first error-correction encoding processing as the transmission signal, and each of said base stations performing a first error-correction decoding processing for the transmission signal to obtain the first error-correction decoded signal and also performing an error detection processing to output error presence/absence information when an error is detected;

a judging step for making judgment as to whether or not the base stations output error presence information from the result of error detection;

a second error-correction encoding processing step for performing a second error correction encoding processing for each of the second signals received via wired lines from the respective base stations when it is judged in the judging step that all of the respective base stations output the error presence information;

a composing step for composing the signals subjected to the second error-correction encoding processing to obtain a composed third signal; and a second error-correction decoding processing for performing a second error-correction decoding processing for the composed third signal.

28. A reception signal processing method performed in a base-station host apparatus of a mobile communication system employing a site diversity receiving method, said reception signal processing method comprising:

a receiving step for receiving a second signal, said second signal including a first error-correction decoded signal and an information data signal via wired lines from each of a plurality of base stations which receive a first signal transmitted from a mobile terminal station, said mobile terminal transmitting the first signal, said first signal including a signal that is subjected to a first error-correction encoding processing as the transmission signal, and each of said base stations performing a first error-correction decoding processing for the transmission signal to obtain the first error-correction decoded signal;

an error detecting step for performing an error detection processing for each of the second signals received from the respective base stations in said receiving step;

a judging step for making judgment as to whether or not the base stations output error presence information from the result of error detection in the error detecting step;

a second error-correction encoding processing step for performing a second error correction encoding processing for each of the second signals received from the respective base stations when it is judged in the judging step that each of the second signals received from the respective base stations contains an error;

a composing step for composing the second signals subjected to the second error-correction encoding processing to obtain a composed third signal; and a second error-correction decoding processing for performing a second error-correction decoding processing for the composed third signal.

29. A reception signal processing method performed in a base-station host apparatus of a mobile communication system employing a site diversity receiving method, said reception signal processing method comprising:

a receiving step for receiving a second signal, said second signal including a first error-correction decoded signal and an information data signal, via wired lines from each of a plurality of base stations which receive a first signal transmitted from a mobile terminal station, said mobile terminal transmitting the first signal subjected to a first error-correction encoding processing as the transmission signal, and each of said base stations performing a first error-correction decoding processing for the transmission signal to obtain the first error-correction decoded signal;

a second error-correction encoding processing step for performing a second error correction encoding processing for each of the second signals received from the respective base stations in said receiving step;

a composing step for composing the second signals subjected to the second error-correction encoding processing to obtain a composed third signal;

a second error-correction decoding processing step for performing a second error correction decoding processing for the composed third signal;

a second error detecting step for performing a second error detection processing for the signal subjected to the second error-correction decoding processing; and an outputting step for outputting the signal subjected to the second error-correction decoding processing as a received signal when it is judged in the second error detection step that the signal subjected to the second error-correction decoding processing contains no error.

30. A reception signal processing method performed in a base-station host apparatus of a mobile communication system employing a site diversity receiving method, said reception signal processing method comprising:

a receiving step for receiving a second signal, said second signal including a first error-correction decoded signal and an information data signal, via wired lines from each of a plurality of base stations which receive a first signal transmitted from a mobile terminal station, said mobile terminal transmitting the first signal subjected to a first error-correction encoding processing as the transmission signal, and each of said base stations performing a first error-correction decoding processing for the transmission signal to obtain the first error-correction decoded signal;

a second error-correction encoding processing step for performing a second error correction encoding processing for each of the second signals received from the respective base stations in said receiving step;

a composing step for composing the second signals subjected to the second error-correction encoding processing, while reflecting an error rate obtained from the second signals from the respective base stations, in order to obtain a composed third signal; and a second error-correction decoding processing for performing a second error-correction decoding processing for the composed third signal.

31. A reception signal processing method performed in a base-station host apparatus of a mobile communication system employing a site diversity receiving method, said reception signal processing method comprising:

a receiving step for receiving frame reliability information and a second signal, said second signal including a first error-correction decoded signal and an information data signal, via wired lines from each of a plurality of base stations which receive a first signal transmitted from a mobile terminal station, said mobile terminal transmitting a signal subjected to a first error-correction encoding processing as the transmission signal, and each of said base stations performing a first error-correction decoding processing for the transmission signal to obtain the first error-correction decoded signal and also detecting frame reliability to output the frame reliability information;

a second error-correction encoding processing step for performing a second error correction encoding processing for each of the second signals received from the respective base stations in said receiving step;

a composing step for composing the second signals subjected to the second error-correction encoding processing, while reflecting the frame reliability information received from the respective base stations, in order to obtain a composed third signal; and a second error-correction decoding processing for performing a second error-correction decoding processing for the composed third signal.

32. A reception signal processing method performed in a base-station host apparatus of a mobile communication system employing a site diversity receiving method, said reception signal processing method comprising:

a receiving step for receiving a second signal, said second signal including a first error-correction decoded signal and an information data signal, via wired lines accompanied by soft determination output information, from each of a plurality of base stations which receive a first signal transmitted from a mobile terminal station, said mobile terminal transmitting the first signal subjected to a first error-correction encoding processing as the transmission signal, and each of said base stations performing a first error-correction decoding processing, accompanied by soft determination output, for the transmission signal to obtain the first error-correction decoded signal;

a second error-correction encoding processing step for performing a second error correction encoding processing, accompanied by soft determination output, for each of the second signals received from the respective base stations in said receiving step through use of the soft determination output information;

a composing step for composing the second signals subjected to the second error-correction encoding processing, while utilizing the soft determination output outputted during the second error correction encoding processing, in order to obtain a composed third signal; and a second error-correction decoding processing for performing a second error-correction decoding processing for the composed third signal.

33. A reception signal processing method performed in a base-station host apparatus of a mobile communication system employing a site diversity receiving method, said reception signal processing method comprising:

a receiving step for receiving a second signal, said second signal including a first error-correction decoded signal and an information data signal which have error presence information, via wired lines from each of a plurality of base stations which receive a first transmitted from a mobile terminal station, said mobile terminal transmitting the first signal subjected to a first error-correction encoding processing as the transmission signal, and each of said base stations performing a first error-correction decoding processing for the transmission signal to obtain the first error-correction decoded signal;

a first error detecting step for detecting an error from the second signals received from the respective base stations in the receiving step;

a first outputting step for outputting, as a received signal, the signal received from the respective base stations when no error is detected, in the first error detecting step, from any one of the second signals received from the respective base stations;

a first composing step for obtaining a composed third signal by composing second signals received from the respective base stations when an error is detected, in the first error detecting step, from each of the second signals received from the respective base stations;

a second error detecting step for detecting an error from the composed third signal obtained in the first composing step;

a second outputting step for outputting, as a received signal, the composed third signal when no error is detected, in the second error detecting step, from the composed third signal;

a second error-correction encoding processing step for performing a second error correction encoding processing for each of the second signals received from the respective base stations when an error is detected, in the second error detecting step, from the composed third signal;

a second composing step for obtaining a composed fourth signal by composing the signals subjected to the second error correction encoding processing;

a second error-correction decoding processing step for performing a second error-correction decoding processing for the composed fourth signal obtained in the second composing step;

a third error detecting step for detecting an error from the signal subjected to the second error-correction decoding processing; and a third outputting step for outputting, as a received signal, the fourth signal subjected to the second error-correction decoding processing when no error is detected, in the second error detecting step, from the fourth signal subjected to the second error-correction decoding processing.

34. The reception signal processing method performed in said base-station host apparatus according to claim 33, wherein the composed third signal obtained in the first composing step or the second signal received from the base station is outputted as said received signal when said error is detected from the fourth signal subjected to the second error-correction decoding processing in the third error detecting step.

* * * * *